(12) United States Patent
Iwai et al.

(10) Patent No.: US 7,255,220 B2
(45) Date of Patent: Aug. 14, 2007

(54) CONVEYANCE SYSTEM

(75) Inventors: Yoshiharu Iwai, Aichi-ken (JP);
Masanori Nonaka, Aichi-ken (JP)

(73) Assignees: Honda Motor Co., Ltd., Tokyo (JP);
Iwata Koki Ltd., Aichi-ken (JP)

( * ) Notice: Subject to any disclaimer, the term of this patent is extended or adjusted under 35 U.S.C. 154(b) by 155 days.

(21) Appl. No.: 10/538,146

(22) PCT Filed: Dec. 19, 2003

(86) PCT No.: PCT/JP03/16346

§ 371 (c)(1),
(2), (4) Date: Jun. 8, 2005

(87) PCT Pub. No.: WO2004/056681

PCT Pub. Date: Jul. 8, 2004

(65) Prior Publication Data

US 2006/0060450 A1 Mar. 23, 2006

(30) Foreign Application Priority Data

Dec. 20, 2002 (JP) ............................. 2002-370635
Dec. 20, 2002 (JP) ............................. 2002-370642
Dec. 20, 2002 (JP) ............................. 2002-370657
Dec. 20, 2002 (JP) ............................. 2002-370669
Dec. 20, 2002 (JP) ............................. 2002-370685

(51) Int. Cl.
*B65G 47/00* (2006.01)

(52) U.S. Cl. ........................ 198/465.3; 198/465.4; 104/172.1; 104/172.4

(58) Field of Classification Search ............ 198/465.3, 198/465.4, 466.1, 795; 104/172.1, 172.4
See application file for complete search history.

(56) References Cited

U.S. PATENT DOCUMENTS

| 3,874,304 | A | * | 4/1975 | Robert | 104/172.4 |
| 3,948,186 | A | * | 4/1976 | McCaul | 104/172.4 |
| 4,131,068 | A | * | 12/1978 | Kuwertz | 104/172.4 |
| 4,256,221 | A | * | 3/1981 | Lain | 198/345.3 |
| 4,354,435 | A | * | 10/1982 | Wakabayashi | 104/172.4 |
| 4,424,749 | A | * | 1/1984 | Wakabayashi | 104/172.4 |
| 4,711,343 | A | | 12/1987 | Dixon | |
| 4,771,700 | A | * | 9/1988 | Wakabayashi | 104/172.3 |
| 4,880,101 | A | * | 11/1989 | Wiggins | 198/403 |
| 4,934,515 | A | * | 6/1990 | Linden | 198/803.2 |

(Continued)

FOREIGN PATENT DOCUMENTS

JP 48-90387 10/1973

(Continued)

*Primary Examiner*—Joe Dillon, Jr.
(74) *Attorney, Agent, or Firm*—Carrier, Blackman, & Associates, P.C.; Joseph P. Carrier; William D. Blackman

(57) ABSTRACT

A conveyance system, wherein dividable horizontal conveyance units are connected to each other through joint plates and a support post and rails of the horizontal conveyance units are connected to each other without any step and clearance. A joint conveyance carnage assembly is conveyed by a force applied thereto from annular chains of the horizontal conveyance units through chain presser plates. When the rearmost one of the chain presser plates leaves the annular chain of the horizontal conveyance unit, the chain presser plate of the headmost first conveyance carriage reaches the annular chain of the horizontal conveyance unit and the joint conveyance carriage assembly is continuously conveyed.

26 Claims, 38 Drawing Sheets

U.S. PATENT DOCUMENTS

| | | | |
|---|---|---|---|
| 5,660,114 A * | 8/1997 | Gruber | 104/168 |
| 5,669,309 A * | 9/1997 | Carlton et al. | 104/162 |
| 5,884,746 A | 3/1999 | Leisner et al. | |
| 6,047,813 A * | 4/2000 | Herzog et al. | 198/803.2 |
| 6,070,534 A | 6/2000 | Lehrieder | |
| 6,382,396 B1 * | 5/2002 | Dana et al. | 198/465.4 |
| 6,464,066 B2 * | 10/2002 | Bethke et al. | 198/465.1 |
| 6,554,127 B1 * | 4/2003 | Kroll | 198/465.4 |
| 6,679,185 B2 * | 1/2004 | Sullivan et al. | 104/172.3 |
| 6,827,200 B1 * | 12/2004 | Rhodes | 198/680 |
| 7,137,769 B2 * | 11/2006 | Komatsu et al. | 414/222.01 |

FOREIGN PATENT DOCUMENTS

| | | |
|---|---|---|
| JP | 50-94687 | 7/1975 |
| JP | 50-98475 | 8/1975 |
| JP | 51-142288 | 11/1976 |
| JP | 52-63747 | 5/1977 |
| JP | 52-90886 | 7/1977 |
| JP | 54-367 | 1/1979 |
| JP | 55-066414 | 5/1980 |
| JP | 56-50860 | 5/1981 |
| JP | 56-141240 | 10/1981 |
| JP | 57-34333 | 2/1982 |
| JP | 58-73466 | 5/1983 |
| JP | 58-41250 | 9/1983 |
| JP | 60-219157 | 11/1985 |
| JP | 61-34518 | 3/1986 |
| JP | 61-109861 | 7/1986 |
| JP | 61-215158 | 9/1986 |
| JP | 62-38765 | 3/1987 |
| JP | 62-135668 | 8/1987 |
| JP | 2-83816 | 6/1990 |
| JP | 2-117252 | 9/1990 |
| JP | 03-232622 | 10/1991 |
| JP | 04-368273 | 12/1992 |
| JP | 05-262416 | 10/1993 |
| JP | 06-329233 | 11/1994 |
| JP | 06-345233 | 12/1994 |
| JP | 07-033243 | 2/1995 |
| JP | 08-126985 | 5/1996 |
| JP | 09-263238 | 10/1997 |
| JP | 9-323812 | 12/1997 |
| JP | 10-258928 | 9/1998 |
| JP | 11-059851 | 3/1999 |
| JP | 2002-193423 | 7/2002 |
| JP | 2002-358563 | 12/2002 |
| WO | WO 2003/055774 A1 | 7/2003 |

* cited by examiner

CONVEYANCE SYSTEM

CROSS-REFERENCE TO RELATED APPLICATIONS

The present application is the U.S. National phase of PCT International Application No. PCT/JP2003/016346, filed 19 Dec. 2003. The referenced PCT Application claimed priority under 35 U.S.C. §119 from each of the following priority documents: Japanese Patent Application No. 2002-370635, filed on 20 Dec. 2002; Japanese Patent Application No. 2002-370642, filed on 20 Dec. 2002; Japanese Patent Application No. 2002-370657, filed on 20 Dec. 2002; Japanese Patent Application No. 2002-370669, filed on 20 Dec. 2002; and Japanese Patent Application No. 2002-370685, filed on 20 Dec. 2002. The entire disclosure of the parent PCT Application, as well as the entire disclosure each of the above-referenced Japanese priority documents is hereby incorporated by reference.

TECHNICAL FIELD

Background Art

If a factory has a plurality of processes for machining workpieces, machining facilities corresponding to the respective processes are often arranged in line. Conveyance systems having linear conveyance paths extending along the machining facilities are used to transfer workpieces between the machining facilities.

One conveyance system for conveying workpieces along a linear path is a conveyor system, for example.

There has been proposed a technology for forming a conveyance path by interconnecting a plurality of conveyors (for example, see Japanese Laid-Open Patent Publication No. 55-66414). According to the proposed technology, the conveyance path is complex in structure as an overlap is required between adjacent ones of the conveyors, and it can convey workpieces only in one direction.

Conveyance systems are generally individually set up to the layout of machining facilities in factories that are to incorporate those conveyance systems. This is because the distance over which workpieces are conveyed by the conventional conveyance systems cannot flexibly be changed.

Therefore, when the layout of machining facilities is to be changed, for example, it is necessary to set up a new conveyance system or modify the existing conveyance system.

If workpieces are conveyed by a series array of conveyors, then the distance over which the workpieces are to be conveyed can freely be selected by increasing or reducing the number of conveyors used. However, other devices are needed to relay workpieces between the conveyors. The relaying devices limit the speed at which the workpieces are conveyed, and tend to damage the workpieces being conveyed.

There has also been proposed a technology for conveyance carriages under electromagnetic forces acting between linear motors that are successively arranged on a conveyance path and magnets mounted on the conveyance carriages (for example, see Japanese Patent No. 2536799).

People, forklifts, etc. are prevented from moving in directions transverse to conveyance systems because the conveyance systems present an obstacle to such movement. If people, forklifts, etc. are required to move over to the other side of a conveyance system, then they go to an end of the conveyance system, turn around the end of the conveyance system, and go to the desired destination. If the conveyance system has a large overall length, then they need to take a long detour, and hence the efficiency with which people, forklifts, etc. move in the factory is low. To allow people, forklifts, etc. to move smoothly, a portion of the conveyance system may be put in a higher position for them to pass therebelow.

For putting a portion of the conveyance system in a higher position, a special arrangement is required to transfer workpieces between the higher position and other lower positions. For example, a vertically conveying elevator structure is required to connect those higher and lower positions. The vertically conveying elevator structure makes the entire system complex and needs an additional auxiliary process of transferring workpieces, resulting in a reduction in the speed at which the workpieces are conveyed.

One solution is to connect higher and lower positions in a workpiece conveyance system with step-free gradient paths for continuously conveying workpieces between the higher and lower positions. A technology for continuously conveying workpieces between higher and lower positions is disclosed in Japanese Patent No. 2536799 referred to above, for example.

However, the technology disclosed in Japanese Patent No. 2536799 requires special actuators known as linear motors, making the conveyance system complicated and expensive. Since the linear motors are not in general use, parts thereof that are available in distribution are few, giving inconvenience to their maintenance.

In factories, it is general practice for conveyance carriages to return in the opposite direction after having conveyed workpieces and then to continue to convey workpieces. Therefore, two conveyance means are required to convey workpieces in the forward and reverse directions.

Usually, since those two conveyance means are given as individual independent conveyance means, a wide space is needed to install the two conveyance means therein. If one conveyance means is to convey workpieces bidirectionally in the forward and reverse directions, then a complex gear structure and a plurality of motors are required. No simple bidirectional actuating conveyors have been proposed in the art.

As shown in FIG. 38, a connecting rod 1 for use in internal combustion engines for automobiles or the like is an elongate piece having a first end 3 with a smaller through hole 2 defined therein, a second end 5 with a larger through hole 4 defined therein, and a shank 6 interconnecting the first end 3 and the second end 5. A pin for joining the connecting rod 1 to a piston is passed through the smaller through hole 2 in the first end 3, and a crankshaft is passed through the larger through hole 4 in the second end 5. Therefore, the crankshaft and the piston are connected to each other by the connecting rod 1.

When the automobile is driven, the crankshaft in the internal combustion engine is rotated to displace the connecting rod 1, causing the piston to be displaced in the cylinder bore.

The process of manufacturing the connecting rod 1 which performs the above action includes a compressing process for compressing and enlarging the ends thereof and a punching process for forming the smaller through hole 2 and the larger through hole 4 in the respective enlarged ends. Workpieces to be machined are directly placed on a belt conveyor and conveyed from a station where the compressing process is performed to a station where the punching process is performed.

If a workpiece to be machined is banged directly on the belt conveyor, then the workpiece is liable to become damaged due to the shock.

For performing the punching process on a workpiece, the workpiece that is placed on the belt conveyor is gripped by a transfer device and fed to a punching device. Since the workpiece is oriented randomly on the belt conveyor and one surface of the workpiece is held in abutment against the belt conveyor, the transfer device cannot easily grip the workpiece. If the transfer device fails to grip a desired portion of the workpiece, then it is difficult for the punching device to form the smaller through hole 2 and the larger through hole 4 in desired positions. Stated otherwise, if workpieces to be machined are conveyed by a belt conveyor, then the manufacturing process suffers such a shortcoming that the smaller through hole 2 and the larger through hole 4 cannot be formed with high accuracy.

According to another approach, a workpiece to be machined is placed on a jig, and the jig is erected and moved on a belt conveyor to convey the workpiece. However, the jig may possibly fall over.

There has been known no literature disclosing a technical idea for conveying an elongate workpiece in an upstanding posture along a conveyance line.

If a conveyance carriage that has moved at a high speed is abruptly stopped, then a workpiece on the conveyance carriage may be collapsed or damaged due to the shock applied to the conveyance carriage. To avoid those drawbacks, the conveyance carriage should desirably be stopped as slowly as possible.

In view of the above demand, there have been proposed various speed control mechanisms for controlling the speed of conveyance carriages and various stop control mechanisms. Documents disclosing speed control mechanisms include Japanese Laid-Open Patent Publication No. 56-50860 and Japanese Laid-Open Patent Publication No. 9-263238, for example, and documents disclosing stop control mechanisms include Japanese Patent Publication No. 58-41250, for example. These disclosed mechanisms are arranged to decelerate a conveyance carriage in order to stop the conveyance carriage slowly.

According to the technology disclosed in Japanese Laid-Open Patent Publication No. 9-263238, the conveyance carriage starts moving or stops moving with a roller mounted on a chain. Therefore, the conveyance carriage moves only in a linear direction and cannot change its direction. Furthermore, the conveyance carriage cannot be moved a distance greater than the distance provided by the chain.

Specifically, the conventional speed control mechanisms or stop control mechanisms for conveyance carriages serve to stop conveyance carriages that move within a limited range, and are unable to stop conveyance carriages that travel in a conveyance assembly which is capable of reversing its direction.

Moreover, since the conveyance carriage cannot quickly be set to travel again, it takes a long period of time to convey workpieces, and hence the efficiency with which to convey workpieces is low.

DISCLOSURE OF THE INVENTION

The present invention has been made in view of the above problems. It is a major object of the present invention to provide a conveyance system which is capable of changing settings for the conveyance distance depending on the layout of a site which incorporates the conveyance system, and of smoothly conveying a conveyance carriage and a workpiece carried by the conveyance carriage.

Another object of the present invention is to provide a conveyance system which allows a conveyance carriage to pass continuously between a horizontal conveyance unit and a gradient conveyance unit without transferring a workpiece therebetween, and which is of a simple structure.

Still another object of the present invention is to provide a conveyance system which is capable of conveying a conveyance carriage bidirectionally in forward and reverse directions with a single drive source and a simple power transmitting mechanism.

Yet another object of the present invention is to provide a conveyance carriage stopping mechanism which can be incorporated in a conveyance assembly that is arranged so as to be able to change the direction of travel of a conveyance carriage, and which is capable of decelerating and stopping a conveyance carriage without exerting shocks thereto.

Yet still another object of the present invention is to provide a conveyance carriage which is capable of reliably conveying a variety of types of workpieces without causing damage thereto, and which is small in size and simple in arrangement.

A conveyance system according to an illustrative embodiment of the present invention includes a conveyance carriage assembly for carrying a workpiece thereon, and conveyance units to which the conveyance carriage assembly is conveyed, wherein the conveyance carriage assembly has driven members, the conveyance units are separable into units, each of the units having a rail for guiding the conveyance carriage assembly, and a driver associated with the rail for driving the conveyance carriage assembly through the driven members. When the last one of the driven members is separated from a movable range of the driver, at least the foremost one of the driven members is relayed to the driver of the unit adjacent thereto, and the conveyance carriage assembly is continuously conveyed.

With the conveyance units being separable into units, the distance over which the conveyance carriage assembly is conveyed can be changed depending on the layout of a site which incorporates the conveyance system. The driven members of the conveyance carriage assembly are reliably relayed between drivers. By connecting rails with junctions free of steps and gaps, the conveyance carriage assembly and the workpiece can smoothly be passed through the junctions. Since the units can be separated and connected, the units can be managed for assembling and quality control in a factory that manufactures those units. Since the units are shipped after they have been tested for operability, it is possible to install units at a site within a reduced period of time.

Each of the units may include two the rails and the two drivers associated respectively with two the rails, wherein two the rails extend parallel to each other, and the two drivers convey the conveyance carriage assembly in opposite directions, respectively. With this arrangement, the conveyance system can convey the conveyance carriage assembly in forward and reverse directions, and is a space saver.

The units may comprise three units, including a horizontal conveyance unit for linearly conveying the conveyance carriage assembly, a gradient conveyance unit for conveying the conveyance carriage assembly on an upward grade and/or a downward grade, and a direction-changing unit for changing a conveyance direction of the conveyance carriage assembly, wherein a plurality of types of the units are combined with each other.

The distance over which the conveyance carriage assembly is conveyed can be adjusted by increasing or reducing the number of horizontal conveyance units. The direction-changing unit allows the conveyance carriage assembly to be conveyed circulatingly. The gradient conveyance unit allows a path for avoiding an obstacle or a transverse path to be set up.

If the driver comprises an annular chain which is circulatingly drivable through a sprocket, and the driven members comprise driven sprockets held in mesh with the annular chain or a presser plate for pressing rollers of the annular chain, then the conveyance system can be constructed of general-purpose parts.

The rail may be in the form of a plate which is elongate in a conveyance direction, and the conveyance carriage assembly moves laterally of the rail, and carries the workpiece on a side of the rail. With this arrangement, a workpiece can be transferred from a transverse side of the conveyance system.

The conveyance units may include a plurality of horizontal conveyance units for conveying the conveyance carriage assembly in a substantially horizontal direction, and a gradient conveyance unit interconnecting two of the horizontal conveyance units, wherein the gradient conveyance unit comprises a gradient conveyance drive sprocket disposed closely to an end of the gradient conveyance unit, the gradient conveyance drive sprocket being rotatable by the driver, a gradient conveyance driven sprocket disposed closely to an opposite end of the gradient conveyance unit, the gradient conveyance driven sprocket being rotatable, a gradient conveyance annular chain held in mesh with the gradient conveyance drive sprocket and the gradient conveyance driven sprocket, the gradient conveyance annular chain being circulatingly drivable, and a gradient guide for supporting, from below, an upper portion of the gradient conveyance annular chain which imparts drive power to the conveyance carriage assembly and a lower portion of the gradient conveyance annular chain which is guided in a direction opposite to the upper portion, making the gradient conveyance annular chain upwardly convex in shape, wherein the conveyance carriage assembly has a gradient conveyance driven sprocket positioned near a leading end of the conveyance carriage assembly in a conveyance direction and held in mesh with the gradient conveyance annular chain, and wherein after the conveyance carriage assembly is pushed out from the horizontal conveyance unit, the driven sprocket is brought into mesh with the gradient conveyance annular chain, and the conveyance carriage assembly is conveyed by the gradient conveyance annular chain along the shape of the gradient guide.

With the driven sprocket of the conveyance carriage assembly being held in mesh with the gradient conveyance chain supported by the gradient guide, the conveyance carriage assembly can pass continuously between the horizontal conveyance unit and the gradient conveyance unit without transferring the workpiece. The conveyance system can be of a simple structure. In the gradient conveyance unit, the conveyance carriage assembly is conveyed through an upwardly convex path along the gradient guide. A spaced defined below the gradient conveyance unit allows people, forklifts, etc. to pass therethrough.

The conveyance carriage assembly may comprise at least two conveyance carriages interconnected longitudinally by a vertically swingable or elastically deformable joint. With this arrangement, the number of workpieces that can be carried can be increased or reduced depending on the number of conveyance carriages. The conveyance carriage assembly can smoothly pass between the horizontal conveyance unit and the gradient conveyance unit and a region where the angle of inclination changes in the gradient conveyance unit.

Each of the horizontal conveyance units may have a horizontal conveyance drive sprocket disposed closely to an end of the horizontal conveyance unit, the horizontal conveyance drive sprocket being rotatable by the driver, a horizontal conveyance driven sprocket disposed closely to an opposite end of the horizontal conveyance unit, the horizontal conveyance driven sprocket being rotatable, and a horizontal conveyance annular chain held in mesh with the horizontal conveyance drive sprocket and the horizontal conveyance driven sprocket, the horizontal conveyance annular chain being circulatingly drivable and being disposed in a position different from the gradient conveyance annular chain in a transverse direction of the horizontal conveyance unit, wherein the conveyance carriage assembly has a push-out driven sprocket positioned closely to a rear end of the conveyance carriage assembly, the push-out driven sprocket being positioned above the horizontal conveyance annular chain when no external force is applied thereto, and wherein as the conveyance carriage assembly moves, the driven sprocket is lowered into mesh with the horizontal conveyance annular chain by a push-out cam plate in the horizontal conveyance unit. When the driven sprocket is brought into mesh with the horizontal conveyance annular chain, the conveyance carriage assembly can be pushed up an upgrade region of the gradient conveyance unit against gravity.

The driven sprocket may be lowered by a force-bearing member for directly bearing a pressing force from the push-out cam plate, and a resilient member compressible in interlinked relation to the force-bearing member.

With the driven sprocket being lowered by the bearing member and the resilient member, even if the driven sprocket and the horizontal conveyance annular chain are out of phase with each other, the teeth of the driven sprocket do not unduly press chain rollers of the horizontal conveyance annular chain, and they are prevented from being damaged.

The conveyance carriage assembly may have a lowering driven sprocket disposed closely to a rear end of the conveyance carriage assembly, the lowering driven sprocket being positioned above the gradient conveyance annular chain when no external force is applied thereto, wherein as the conveyance carriage assembly moves, the driven sprocket is lowered into mesh with the gradient conveyance annular chain by a lowering cam plate disposed in a downgrade region of the gradient conveyance unit. When the conveyance carriage assembly descends in the downgrade region of the gradient conveyance unit, the lowering sprocket is brought into mesh with the gradient conveyance annular chain. Even after the driven sprocket is released from the gradient conveyance annular chain, the conveyance carriage assembly is prevented from fall off due to gravity in the downgrade region of the gradient conveyance unit.

The driven sprocket may be lowered by a force-bearing member for directly bearing a pressing force from the lowering cam plate, and a resilient member compressible in interlinked relation to the force-bearing member. With the lowering sprocket being lowered by the bearing member and the resilient member, even if the lowering sprocket and the gradient conveyance annular chain are out of phase with each other, the teeth of the lowering sprocket do not unduly press chain rollers of the gradient conveyance annular chain, and they are prevented from being damaged.

The push-out sprocket and the lowering sprocket may be positioned near the rear end of a single conveyance carriage.

The conveyance system may further comprise a drive gear rotatable by a rotational drive source, a first driven gear held in mesh with the drive gear, the first driven gear being rotatable by rotation transmitted from the drive gear, a second driven gear held in mesh with the drive gear, the second driven gear being rotatable by rotation transmitted from the drive gear in a direction opposite to the first driven gear, a first rotational shaft as a rotational shaft of the first driven gear, a second rotational shaft as a rotational shaft of the second driven gear, a first circulative driver for being circulatively drivable in response to rotation of the first rotational shaft, and a second circulative driver for being circulatively drivable in a direction opposite to the first circulative driver in response to rotation of the second rotational shaft; wherein the conveyance carriage assembly is conveyed by the first circulative driver and/or the second circulative driver.

Since the first driven gear and the second driven gear can be rotated in respective opposite directions by the drive gear, the first circulative driver and the second circulative driver which are driven by the first driven gear and the second driven gear can be circulated in respective opposite directions for thereby conveying the conveyance carriage assembly in both forward and reverse directions. The arrangement is simple because the drive source is a single source and only the three gears including the drive gear, the first driven gear, and the second drive gears are sufficient.

Each of the drive gear, the first driven gear, and the second driven gear may comprise a bevel gear, and the first rotational shaft and the second rotational shaft may be coaxial with each other and perpendicular to the axis of the drive gear.

The bevel gears are capable of reliably transmitting large drive power. If the first rotational shaft and the second rotational shaft are coaxial with each other, then the first circulative driver and the second circulative driver may be disposed symmetrically.

The conveyance system may further comprise a first inner bearing by which an end of the first rotational shaft is rotatably supported, and a second inner bearing by which an end of the second rotational shaft is supported, the first inner bearing and the second inner bearing being disposed between the first driven gear and the second driven gear, and a first outer bearing by which an end of the first rotational shaft is rotatably supported, and a second outer bearing by which an end of the second rotational shaft is supported, the first outer bearing and the second outer bearing being disposed on sides of the first driven gear and the second driven gear which are opposite to confronting faces thereof.

The first inner bearing and the second inner bearing make it possible to effectively utilize a space between the first driven gear and the second driven gear. Since each of the first rotational shaft and the second rotational shaft has its opposite ends rotatably supported by the bearings, they can be rotated stably and smoothly and can withstand large loads.

The first circulative driver may be driven by a first drive sprocket mounted on the first rotational shaft, the second circulative driver may be driven by a second drive sprocket mounted on the second rotational shaft, and the first circulative driver and the second circulative driver may comprise annular chains, respectively, and are circulatingly drivable by rotatable driven sprockets. With this arrangement, the conveyance system can be constructed of inexpensive and general-purpose parts.

The conveyance carriage assembly may have a retaining mechanism for retaining the workpiece, a retaining member operating mechanism for operating a retaining member of the retaining mechanism, a resilient member for pressing the retaining member in a direction opposite to the direction in which the retaining member is operated by the retaining member operating mechanism, a main body supporting the retaining mechanism and the retaining member operating mechanism, and a roller mounted on the main body and engaging the rail, wherein the retaining member operating mechanism operates the retaining member through operation of a drive mechanism disposed closely to the rail, and is displaced while being guided along the rail.

The conveyance carriage assembly is conveyed while the workpiece is being retained thereon. Therefore, workpieces do not need to be placed on a belt conveyor or the like. Since workpieces do not impinge upon a belt conveyor, the workpieces are not damaged.

The conveyance system thus constructed conveys a workpiece which is being carried in a given position. In a next station, therefore, since a transfer device can reliably grip a predetermined portion of the workpiece, the transfer device may operate in the same pattern at all times. Since the transfer device does not need to be complex in structure, and hence facility investments can be reduced.

The retaining member operating mechanism for operating the retaining mechanism is driven by the drive mechanism that is installed on a conveyor line. Therefore, the drive mechanism is not required to be mounted on the conveyance carriage assembly. The conveyance carriage assembly is thus of a simple arrangement.

The workpiece may be retained under a relatively small force which is the resilient force of the resilient body. Therefore, the workpiece can easily be released from the conveyance carriage assembly, and hence can easily be taken from the conveyance carriage assembly.

The retaining mechanism may comprise a clamp mechanism having a clamp operated by the retaining member operating mechanism, and a holding mechanism having a set of plate members including at least one movable plate, for holding a portion of the workpiece which is different from the portion thereof which is gripped by the clamp mechanism, with the set of plate members, wherein the clamp and the movable plate are displaced by the retaining member operating mechanism to hold or release the workpiece.

Such two mechanisms as the retaining mechanism are capable of retaining the workpiece more reliably.

An engaging member engageable by a hook of a first lock mechanism disposed closely to the rail when the retaining member operating mechanism operates the retaining member through operation of the drive mechanism, may be mounted on the main body. Since the conveyance carriage assembly is positioned in place by the engaging member, the workpiece can reliably be placed in a given position on the conveyance carriage assembly.

The conveyance system may further comprise a pocket for supporting an end of the workpiece inserted therein. As the end of the workpiece is inserted in the pocket, the workpiece is reliably prevented from dropping off the conveyance carriage assembly.

The pocket, the clamp mechanism, and the holding mechanism may be mounted on the main body successively upwardly in the order named. Even if the workpiece is an elongate member, the workpiece can be conveyed in an upstanding state. Therefore, the conveyance carriage assembly can be reduced in the transverse direction or the longitudinal direction thereof, and hence reduced in size.

An elongate workpiece may comprise, for example, a connecting rod for an internal combustion engine. The connecting rod includes a workpiece to be machined finally into the shape of a connecting rod.

The conveyance system may further comprise a conveyance carriage assembly stopping mechanism for stopping the conveyance carriage assembly for carrying and conveying the workpiece, the conveyance carriage assembly stopping mechanism comprising a stopping engaging member mounted on the conveyance carriage assembly, a first arm and a second arm which extend in a conveyance direction of the conveyance carriage assembly and have respective shanks having pivotally supported ends, a displacing mechanism for displacing the first arm and the second arm toward and away from each other, and an entry path defined between the first arm and the second arm for the stopping engaging member to enter, the entry path having a narrower portion having a width which is progressively smaller in a direction of travel of the stopping engaging member, and a wider portion which is wider than the narrower portion, wherein the conveyance carriage assembly is decelerated when the first arm and the second arm slide against the stopping engaging member in the narrower portion, and the conveyance carriage assembly which has entered the wider portion after the narrower portion is spread by the stopping engaging member which presses the first arm and the second arm, is stopped by the first arm and the second arm which engage the stopping engaging member.

The stopping engaging member on the conveyance carriage assembly spreads the gap between the two arms. Since the kinetic energy of the conveyance carriage assembly which has traveled is reduced, the conveyance carriage assembly is decelerated. The stopping engaging member on the conveyance carriage assembly which is decelerated is finally engaged by the first arm and the second arm, stopping the conveyance carriage assembly.

Because the conveyance carriage assembly is stopped after its kinetic energy is reduced, shocks are prevented from being applied to the conveyance carriage assembly. Therefore, the workpiece is prevented from falling off the conveyance carriage assembly or from being damaged.

The conveyance carriage assembly stopping mechanism can easily be installed in a conveyance region which has a direction-changing unit for changing the direction of travel of the conveyance carriage assembly. Consequently, the conveyance carriage assembly stopping mechanism that is installed does not limit the direction of travel of the conveyance carriage assembly.

When the conveyance carriage assembly is stopped by the conveyance carriage assembly stopping mechanism, a propelling drive source of the conveyance carriage assembly does not need to be stopped. Accordingly, the conveyance carriage assembly can quickly be moved again for efficiently conveying the workpiece.

The first arm and the second arm may have a support which supports the stopping engaging member. The conveyance carriage assembly can thus reliably be stopped.

The conveyance system may further comprise a second lock mechanism for positioning and fixing the conveyance carriage assembly which is stopped. When the workpiece is transferred to or from the conveyance carriage assembly, since the conveyance carriage assembly does not wobble, the workpiece can reliably be loaded onto the conveyance carriage assembly, and can be prevented from falling off. The second lock mechanism may have a stopper engaging member for engaging a stopper mounted on the conveyance carriage assembly.

The stopping engaging member may comprise a rotatable cylinder. Since the stopping engaging member is brought into rolling contact with the first arm and the second arm while in rotation, the stopping engaging member is less subject to wear. The conveyance carriage assembly can reliably be decelerated and stopped over a long period of time.

The stopping engaging member may double as a guided member which is guided by a direction-changing unit which is interposed between a first conveyance section for conveying the conveyance carriage assembly in one direction and a second conveyance section for conveying the conveyance carriage assembly in a direction different from the one direction.

The first conveyance section should preferably be a forward path, for example, and the second conveyance section should preferably be a return path for guiding the conveyance carriage assembly in a direction opposite to the forward path. The stopping engaging member may double as a guided member which is guided by the direction-changing unit which interconnects the forward path and the return path. In this case, the conveyance carriage assembly is turned.

Each of conveyance carriages of the conveyance carriage assembly may have two stopping engaging members. Since the stopping engaging members can easily pass through the direction-changing unit, the conveyance carriage assembly is turned in the direction-changing unit.

DETAILED DESCRIPTION INCLUDING BEST MODE FOR CARRYING OUT THE INVENTION

A conveyance system according to a selected illustrative embodiment of the present invention will be described below with reference to FIGS. 1 through 37.

Figure 1:
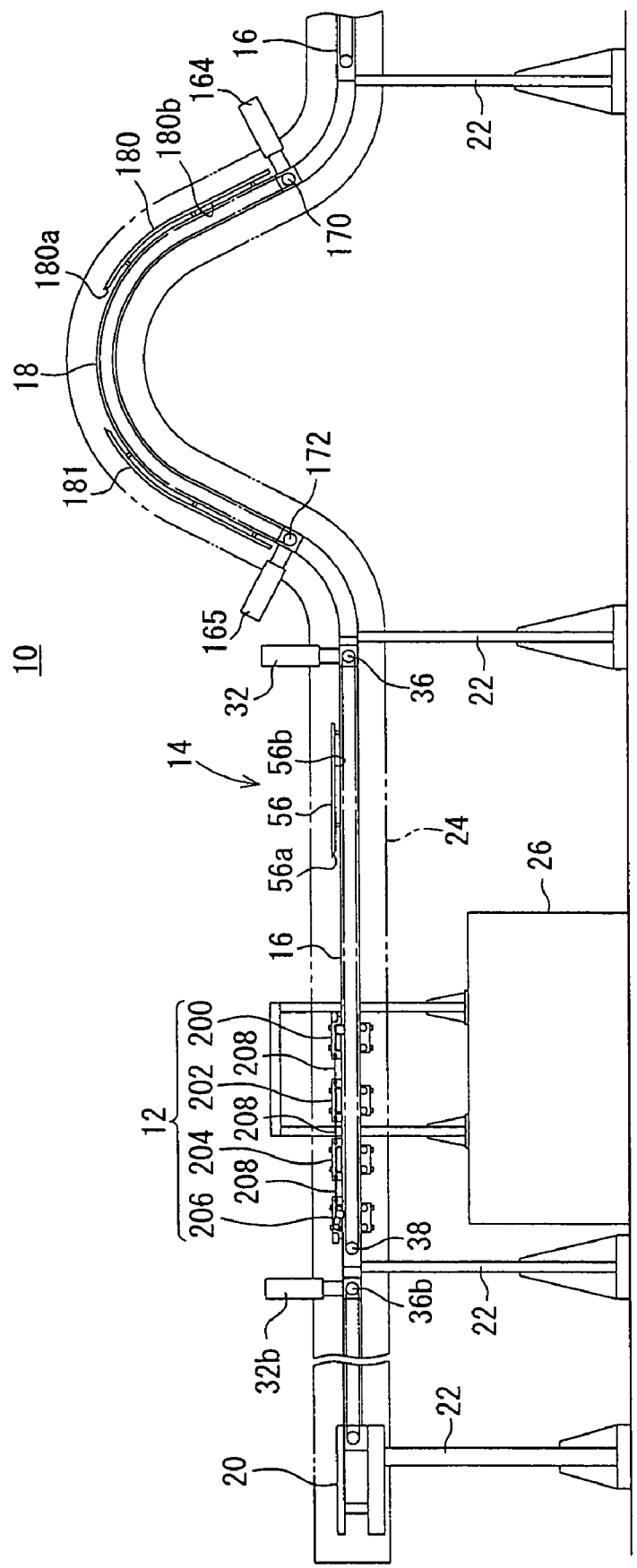
FIG. 1 is a side elevational view, partly omitted from illustration, of a conveyance system according to a selected illustrative embodiment of the present invention.

As shown in FIG. 1, a conveyance system 10 according to the present invention has a joint conveyance carriage assembly 12 capable of conveying a workpiece and a conveyance assembly 14 for conveying the joint conveyance carriage assembly 12, the conveyance assembly 14 providing a conveyance path for transferring workpieces between areas of a industrial plant.

First, the conveyance assembly 14 will be described below.

Figure 2:
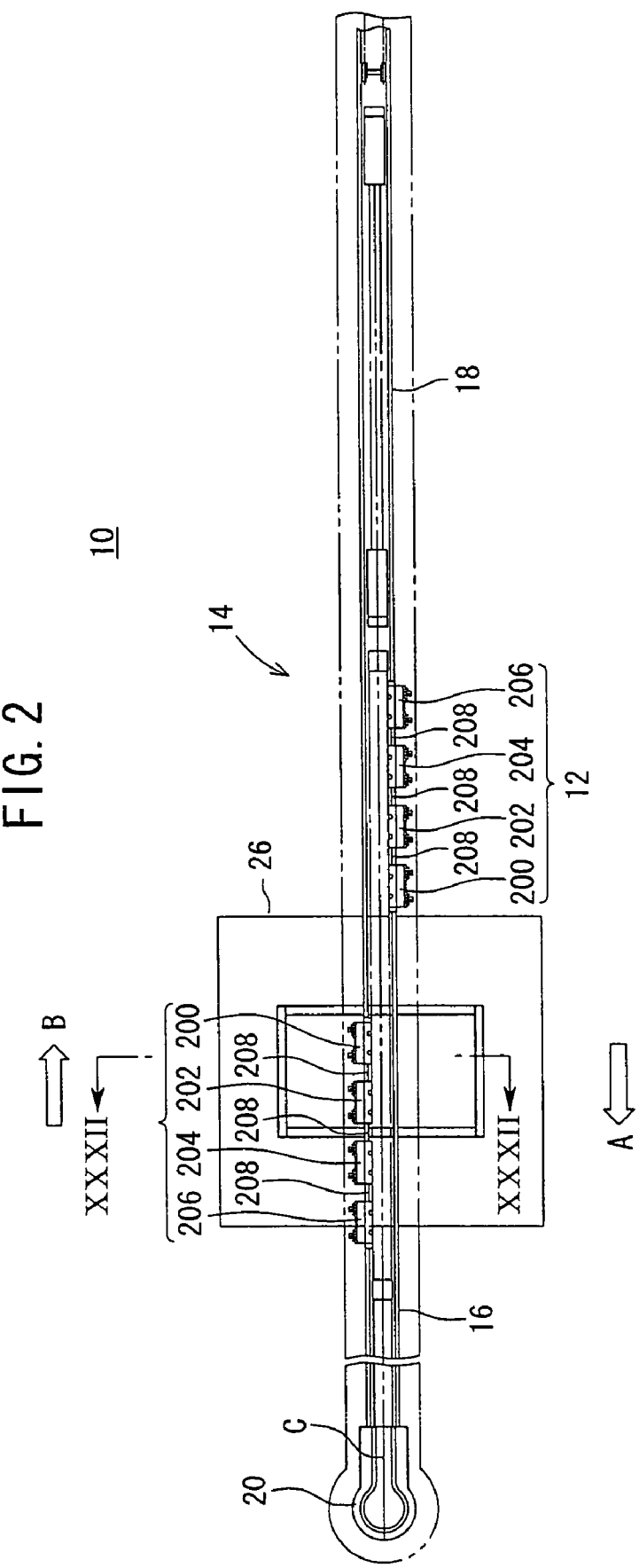
FIG. 2 is a top plan view, partly omitted from illustration, of the conveyance system according to the illustrative embodiment of the present invention.

As shown in FIG. 2, the conveyance assembly 14 has a function to convey the joint conveyance carriage assembly 12 to the right (in the direction indicated by the arrow B) in an upper region in FIG. 2, and to deliver the joint conveyance carriage assembly 12 to the left (in the direction indicated by the arrow A) in a lower region in FIG. 2. The conveyance assembly 14 also has a function to change the direction in which the joint conveyance carriage assembly 12 is delivered at the left and right ends. A plurality of joint conveyance carriage assemblies 12 can simultaneously be conveyed. In the description which follows, a section where the joint conveyance carriage assembly 12 is conveyed in the direction indicated by the arrow A in the lower region in FIG. 2 is referred to as a forward path, and a section where the joint conveyance carriage assembly 12 is conveyed in the direction indicated by the arrow B in the upper region in FIG. 2 is referred to as a return path.

In the conveyance assembly 14, a mechanism for conveying the joint conveyance carriage assembly 12 in the direction indicated by the arrow B and a mechanism for conveying the joint conveyance carriage assembly 12 in the direction indicated by the arrow A are basically identical to each other. Unless otherwise specified, the mechanism for conveying the joint conveyance carriage assembly 12 in the direction indicated by the arrow B will be described below, and the mechanism for conveying the joint conveyance carriage assembly 12 in the direction indicated by the arrow A will not be described below. In the description which follows, the vertical direction in FIG. 2 is a transverse direction, a region of the conveyance system 10 closer to a central line C thereof is referred to as an inner side, and a region of the conveyance system 10 remoter from the central line C thereof is referred to as an outer side.

Referring back to FIG. 1, the conveyance assembly 14 has a plurality of horizontal conveyance units 16 for conveying the joint conveyance carriage assembly 12 substantially horizontally in the direction indicated by the arrow B, a gradient conveyance unit 18 interconnecting the horizontal conveyance units 16, a direction-changing unit 20 for changing the direction in which the joint conveyance carriage assembly 12 is conveyed (hereinafter referred to simply as "conveyance direction"), a plurality of support posts 22 supporting the horizontal conveyance units 16, the gradient conveyance unit 18, and the direction-reversing unit (direction-changing unit) 20, and a cover 24 covering the horizontal conveyance units 16, the gradient conveyance unit 18, and the direction-reversing unit 20 substantially in their entirety. The horizontal conveyance units 16 and the gradient conveyance unit 18 are connected to each other by a joint plate 120 (see FIG. 3).

The conveyance assembly 14 also has a stopping mechanism 2010 (conveyance carriage stopping mechanism, see FIG. 32) for stopping the joint conveyance carriage assembly 12. A station 26 for transferring a workpiece to and from the joint conveyance carriage assembly 12 is disposed in the vicinity of the stopping mechanism 2010. The cover 24 has an opening defined therein in front of the station 26, and a workpiece is transferred between the joint conveyance carriage assembly 12 and the station 26 through the opening. The station 26 is linked to a machine tool (not shown) for machining a workpiece. The station 26 transfers an unmachined workpiece (or a workpiece to be machined) to the machine tool, and install a machined workpiece onto the joint conveyance carriage assembly 12.

The horizontal conveyance units 16 will be described below.

Figure 3:
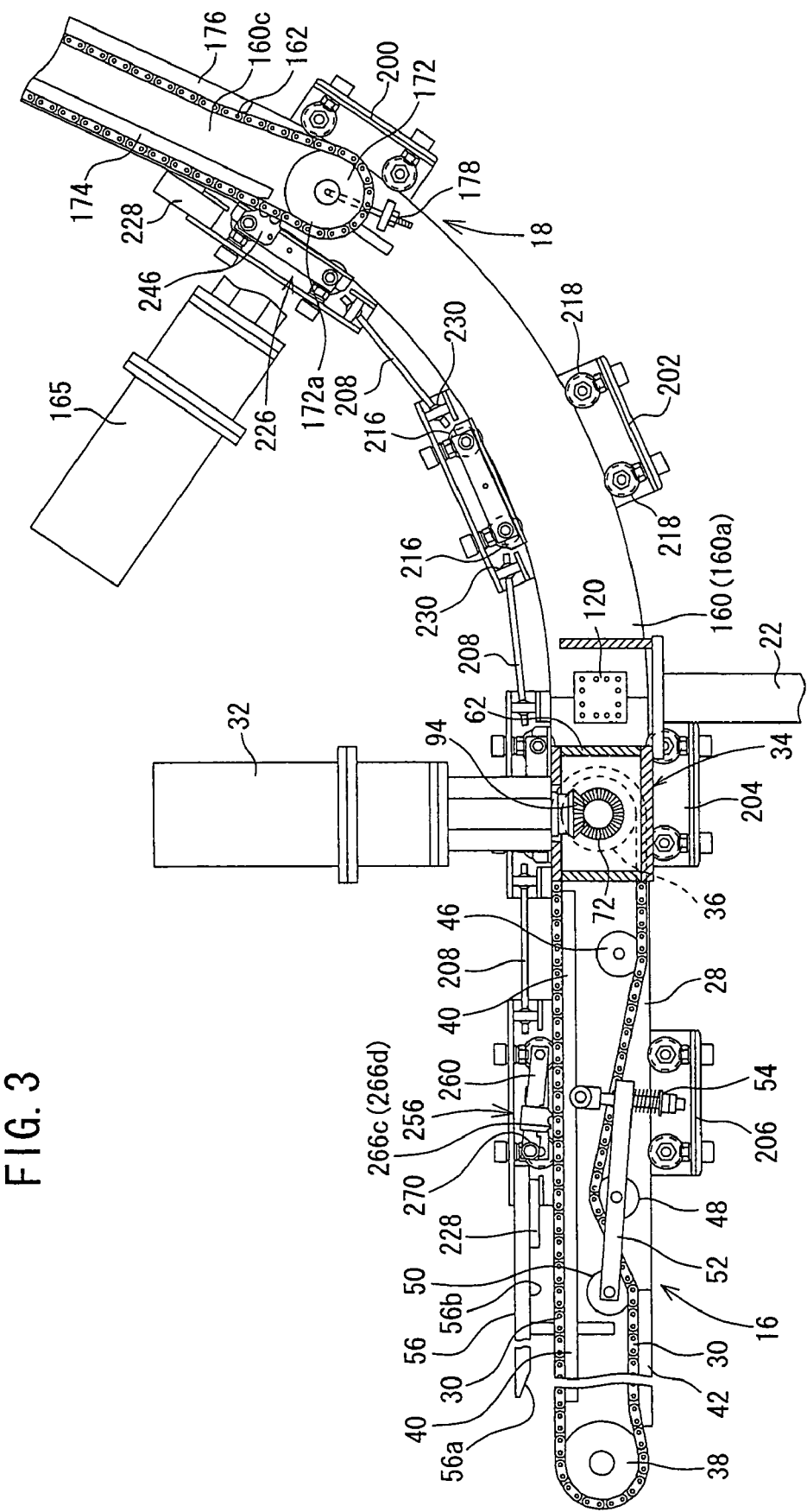
FIG. 3 is a sectional side elevational view of a junction between a horizontal conveyance unit and a gradient conveyance unit, as viewed from the central line of the conveyance system.

As shown in FIG. 3, each of the horizontal conveyance units 16 has rails 28 for supporting the joint conveyance carriage assembly 12 and guiding the joint conveyance carriage assembly 12 in the conveyance direction (the direction indicated by the arrow B), a horizontal conveyance annular chain (circulative driver) 30 for conveying the joint conveyance carriage assembly 12 in the direction indicated by the arrow B, and a motor 32 as a drive source for driving the annular chain 30. The motor 32 also doubles as a drive source for driving a horizontal conveyance annular chain (circulative driver) 33 for conveying the joint conveyance carriage assembly 12 in the direction indicated by the arrow A and a second drive sprocket 37 (see FIG. 7). The motor 32 and motors 164, 165 to be described later incorporate respective speed reducers for generating a sufficient torque.

In FIG. 3, the cover 24 is omitted from illustration. FIG. 3 is a side elevational view as viewed from the central line C in FIG. 2. FIGS. 9, 10, 17, 20, 21, 24, and 33 to be described later are also similar views.

Each of the rails 28 is in the form of an elongate plate having a width d (see FIG. 16) and a height h (see FIG. 17), and extends the entire length of the horizontal conveyance unit 16. The rail 28 has upper and lower surfaces lying horizontally.

The horizontal conveyance unit 16 has a bevel gear mechanism 34 having a drive bevel gear (drive gear) 94 (see FIG. 6) coupled to the motor 32, a first drive sprocket (horizontal conveyance drive sprocket) 36 for circulatingly driving the annular chain 30 in coaction with the drive bevel gear 94, and a driven sprocket (horizontal conveyance driven sprocket) 38 which is driven when the annular chain 30 is circulatingly driven. As viewed from the central line C (see FIG. 2), the first drive sprocket 36 rotates the annular chain 30 clockwise.

Figure 11:
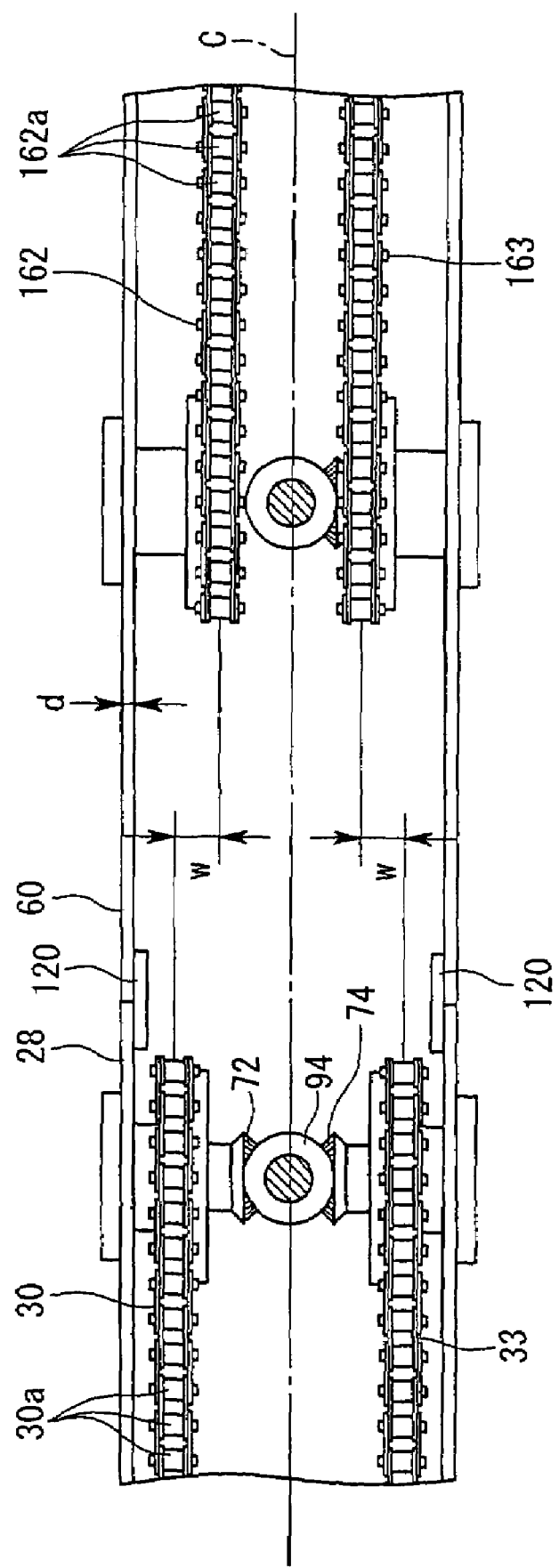
FIG. 11 is a sectional plan view of joints between the horizontal conveyance unit and the gradient conveyance unit.

The annular chain 30 is disposed slightly inwardly of the rail 28, and extends parallel to the rail 28 in the transverse direction (see FIG. 11).

The motor 32 has a vertical rotational shaft. The axis of rotation of the rotational shaft of the motor 32 is converted 900 by the bevel gear mechanism 34 into an axis of rotation on a vertical plane. Therefore, the first drive sprocket 36 and the driven sprocket 38 rotate on the vertical plane. The first drive sprocket 36 and the driven sprocket 38 are disposed at the same height.

The horizontal conveyance unit 16 also has a horizontal upper guide 40 for supporting, from below, chain rollers 30a (see FIG. 11) of an upper stretch of the annular chain 30 which applies drive power to the joint conveyance carriage assembly 12, and a horizontal lower guide 42 for supporting, from below, chain rollers 30a of a lower stretch of the annular chain 30. The horizontal upper guide 40 and the horizontal lower guide 42 are connected to the rail 28 by support members 44 (see FIG. 16).

The horizontal upper guide 40 supports the annular chain 30 over substantially the full length between the first drive sprocket 36 and the driven sprocket 38, and keeps the upper stretch of the annular chain 30 horizontal.

The horizontal lower guide 42 supports the annular chain 30 over substantially the full length, except a predetermined interval near the first drive sprocket 36, between the first drive sprocket 36 and the driven sprocket 38. A tension mechanism 55 comprising three small sprockets 46, 48, 50, a link 52, and a screw mechanism 54 is disposed between the first drive sprocket 36 and the horizontal lower guide 42. The tension mechanism is capable of adjusting the slack or tension of the annular chain 30 by adjusting the screw mechanism 54.

The chain 33 which is used to convey the joint conveyance carriage assembly 12 in the direction indicated by the arrow A is symmetrically identical in structure to the annular chain 30, and is supported by the horizontal upper guide 40 and the horizontal lower guide 42.

The plural horizontal conveyance units 16 are basically identical in structure. A cam plate (push-out cam plate) 56 is mounted on a portion of the horizontal conveyance unit 16 which is connected to the gradient conveyance unit 18, the cam plate 56 extending from the end of the horizontal conveyance unit 16 in a direction opposite to the conveyance direction. The cam plate 56 has a lower surface comprising a slanted surface 56a inclined obliquely downwardly along the conveyance direction and a parallel surface 56b contiguous to the slanted surface 56a and parallel to the rails 28.

Both ends of the horizontal conveyance unit 16 will be described in detail below with reference to FIGS. 4 through 9.

Figure 4:
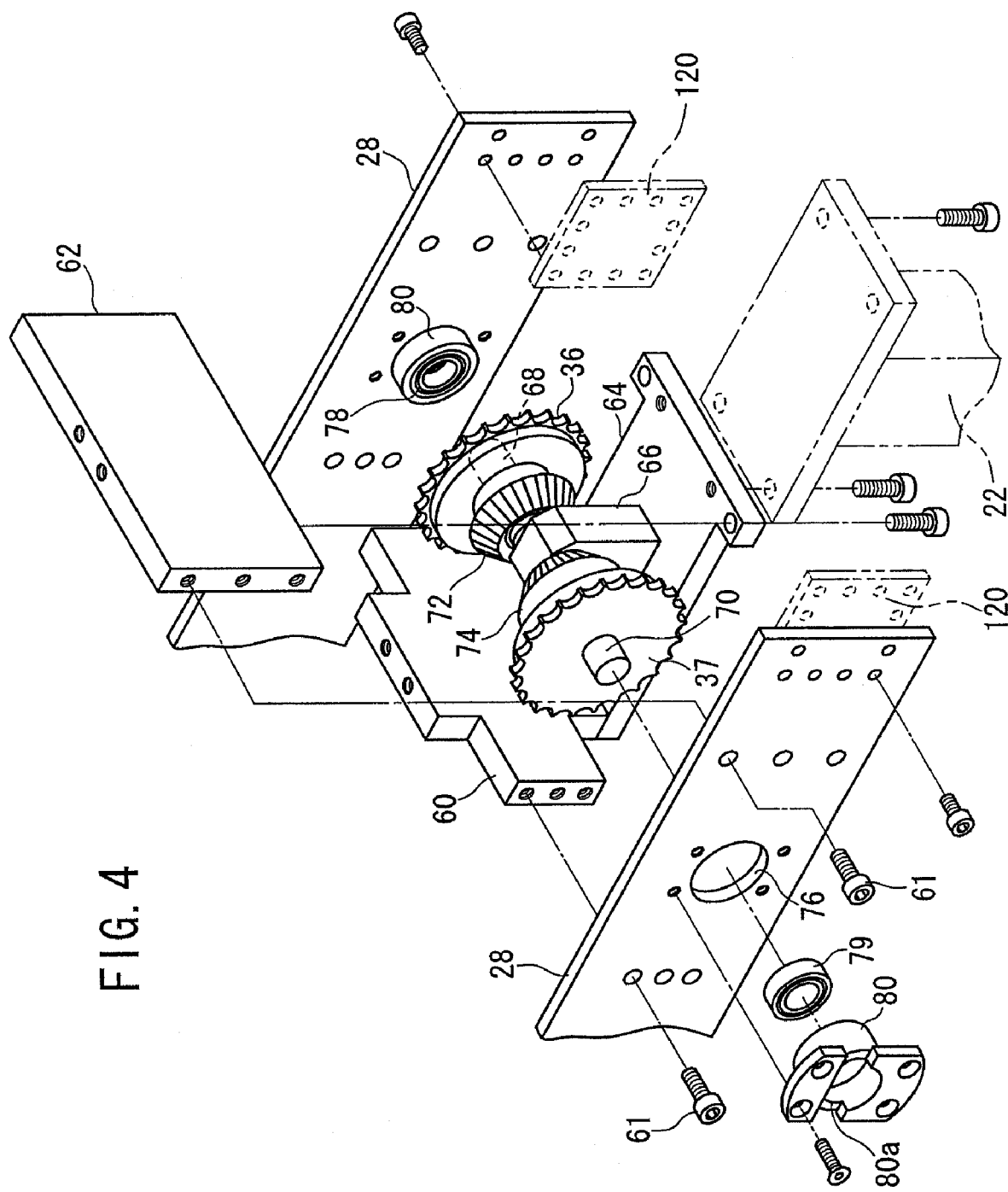
FIG. 4 is an exploded perspective view of an end portion of the horizontal conveyance unit.
Figure 5:
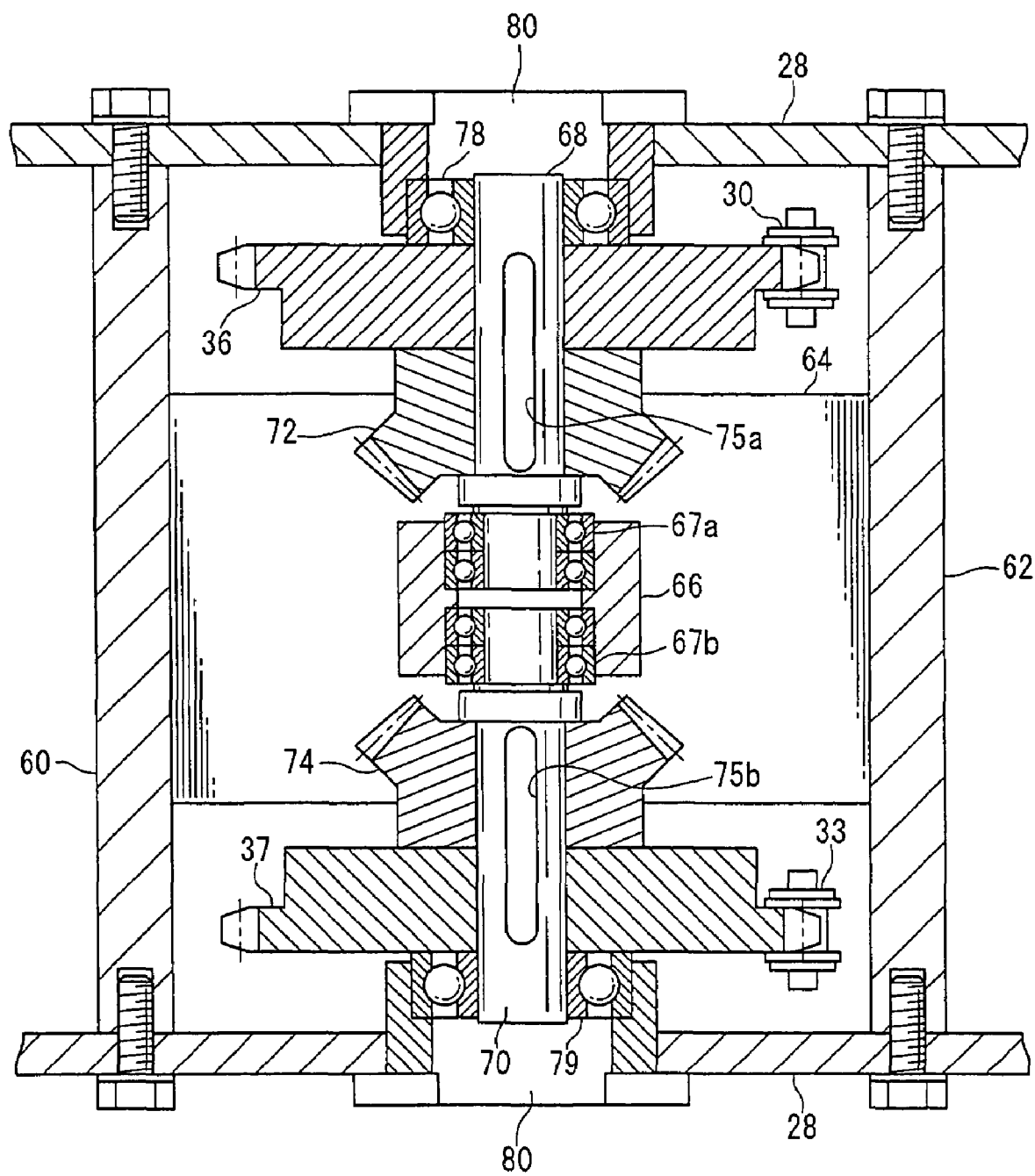
FIG. 5 is a sectional plan view of a bearing box, which is part of the end portion of FIG. 4, also showing driven bevel gears, driven sprockets, and nearby components.

At the end of the horizontal conveyance unit 16 where the first drive sprocket 36 and the second drive sprocket 37 are disposed, the rails 28 on both sides are connected to each other by two intermediate plates 60, 62, as shown in FIGS. 4 and 5. The intermediate plate 60 is of a crisscross shape that is convex in the vertical direction and the transverse direction, and has opposite sides fastened to the rails 28 by bolts 61. The intermediate plate 62 is in the form of a flat plate positioned closer to the end of the horizontal conveyance unit 16 than the intermediate plate 60. The intermediate plate 62 has opposite sides fastened to the rails 28 by bolts 61. The intermediate plates 60, 62 have lower surfaces interconnected by a cross plate 64. A bearing box 66 is welded to an upper surface of the cross plate 64. The bearing box 66 houses therein two bearings by which first and second rotational shafts 68, 70 are rotatably supported, respectively. The first and second rotational shafts 68, 70 are disposed coaxially with each other and extend to the left and right from the bearing box 66.

A first driven bevel gear (first driven gear) 72 and a second driven bevel gear (second driven gear) 74 which are disposed in confronting relation to each other across the bearing box 66 are mounted respectively on the first and second rotational shafts 68, 70. The first driven bevel gear 72 and the second driven bevel gear 74 are identical in shape to each other, and have toothed sides facing inwardly. The first drive sprocket 36 and the second drive sprocket 37 are respectively mounted on the first and second rotational shafts 68, 70 on respective outer portions of the first and second driven bevel gears 72, 74. A grease nipple (not shown) is disposed on a lower surface of the cross plate 64 in communication with the interior of the bearing box 66. The first drive sprocket 36 and the first driven bevel gear 72 are fixed to the first rotational shaft 68 by a key 75a.

Similarly, the second drive sprocket 37 and the second driven bevel gear 74 are fixed to the second rotational shaft 70 by a key 75*b*.

The left and right rails 28 have respective holes 76 defined therein. The first rotational shaft 68 and the second rotational shaft 70 have respective ends rotatably supported by a gearing (first outer bearing) 78 and a bearing (second outer bearing) 79, respectively, which are inserted in the respective holes 76. The bearings 78, 79 have outer sides fixed to the rails 28 by fixing members 80. The fixing members 80 have grooves 80*a* defined therein for passage of stoppers 238, to be described later, therethrough.

Figure 8:
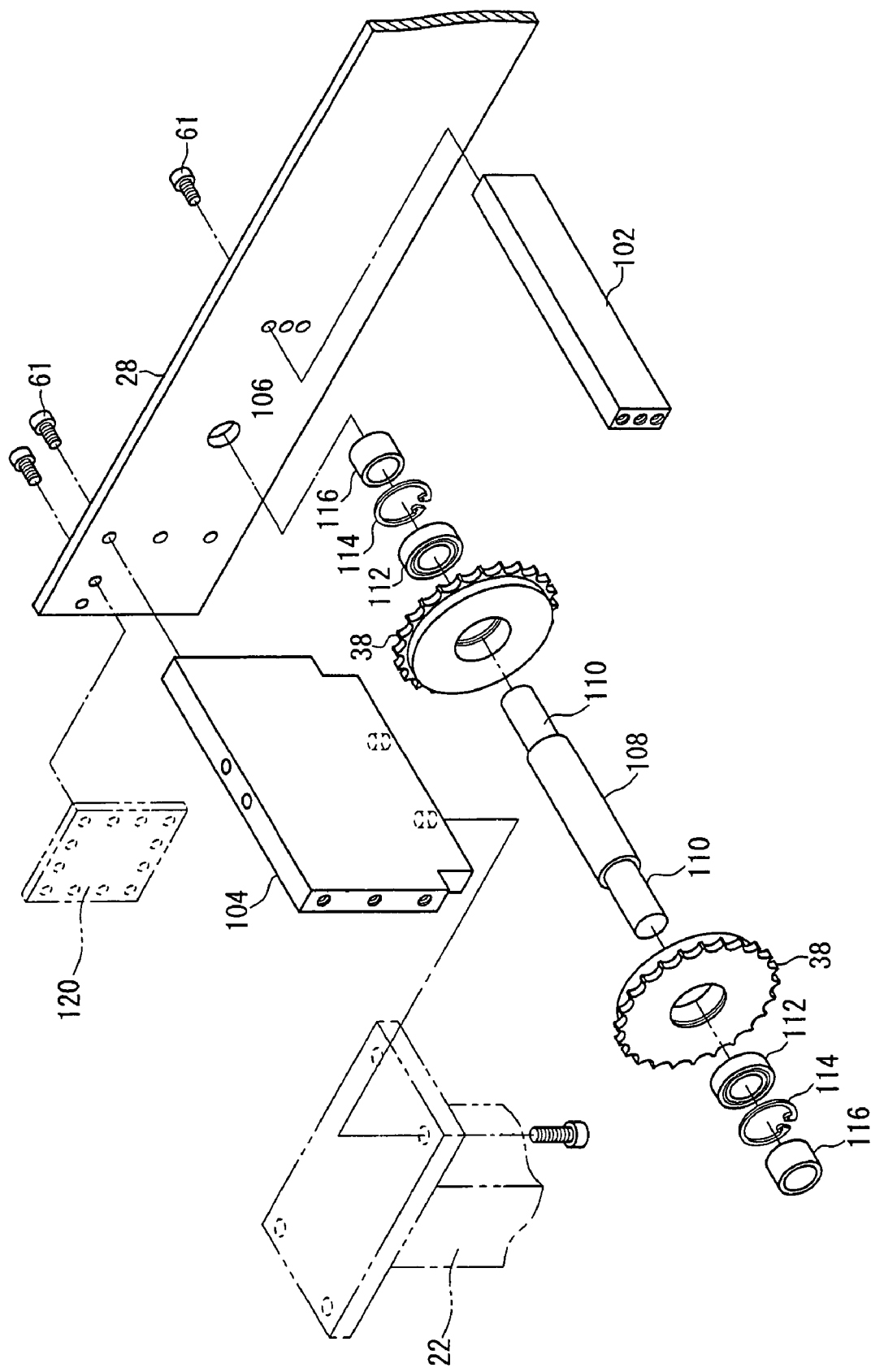
FIG. 8 is an exploded perspective view of another end of the horizontal conveyance unit which is opposite to the end shown in FIG. 4.

The intermediate plates 60, 62 have respective upper surfaces on which a motor unit 82 (see FIG. 6) is mounted. In FIG. 4 and FIG. 8 to be described later, the annular chains 30, 33, the horizontal upper guide 40, and the horizontal lower guide 42 are omitted from illustration.

The end of the direction-reversing unit 20 (see FIGS. 1 and 2) is of a structure identical to the structure shown in FIG. 4.

Figure 6:
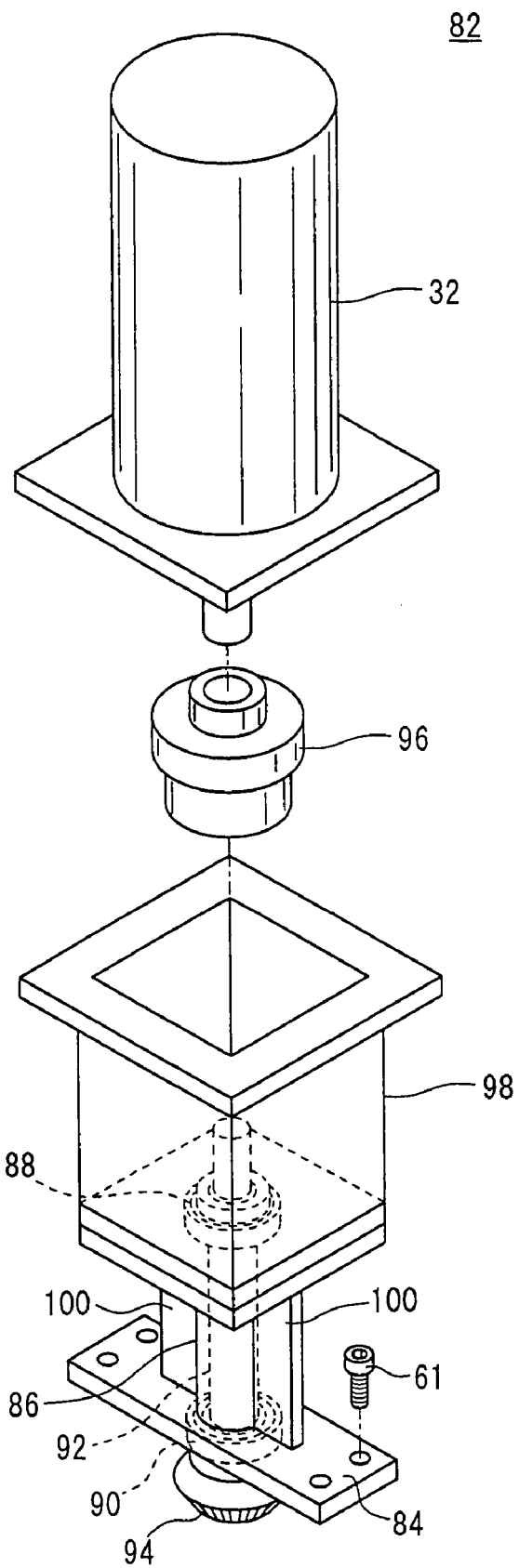
FIG. 6 is an exploded perspective view of a motor unit, which is also shown in FIG. 3.

As shown in FIG. 6, the motor unit 82 is a unit, including the motor 32, for transmitting rotational drive power from the motor 32 to the first driven bevel gear 72 and the second driven bevel gear 74.

The motor unit 82 has a lower connection plate 84 connected to the upper surfaces of the intermediate plates 60, 62 (see FIG. 4). The connection plate 84 supports an upwardly extending cylindrical cover 86 disposed centrally thereon. Bearings 88, 90 are mounted respectively on upper and lower ends of the cylindrical cover 86.

An extension shaft 92 is rotatably supported by the two bearings 88, 90. The drive bevel gear 94 is mounted on the lower end of the extension shaft 92 below the connection plate 84. The drive bevel gear 94 has a toothed side facing downwardly.

The upper end of the extension shaft 92 is connected to the rotational shaft of the motor 32 by a coupling 96. The coupling 96 is covered with a box-shaped cover 98 which supports the motor 32 thereon. The upper surface of the connection plate 84, the side surface of the cylindrical cover 86, and the lower surface of the box-shaped cover 98 are reinforced by two reinforcing plates 100.

The motor 32 and the drive bevel gear 94 are connected to each other by the extension shaft 92, so that the box-shaped cover 98 and the motor 32 are positioned slightly above the upper surfaces of the rails 28 so as not to obstruct the passage of the joint conveyance carriage assembly 12.

Figure 7:
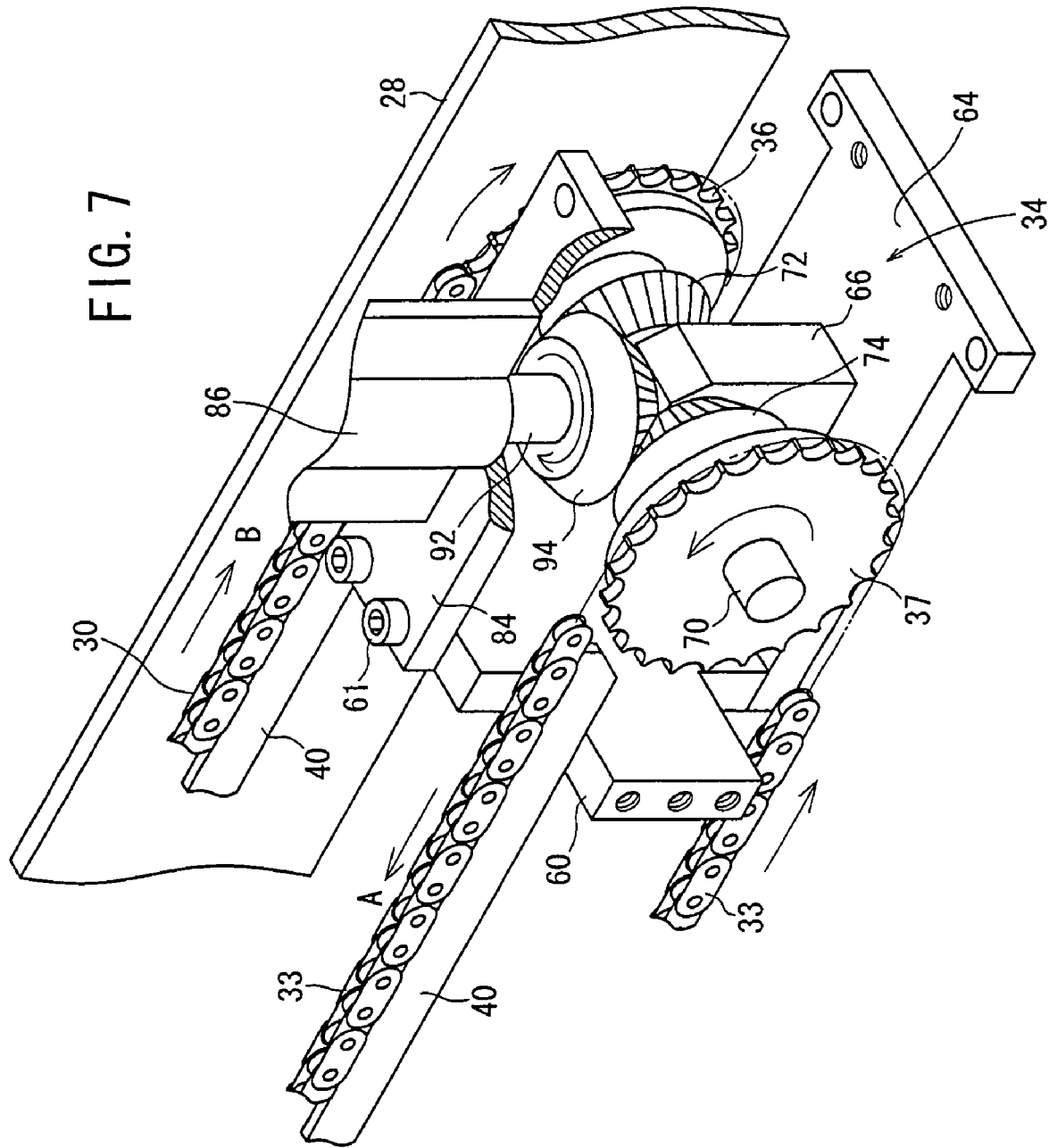
FIG. 7 is perspective view, partly omitted from illustration, of the end of the horizontal conveyance unit of FIG. 4. shown in an assembled configuration with a chain.

As shown in FIG. 7, the connection plate 84 is fastened to the upper surfaces of the intermediate plates 60, 62 by bolts 61, holding left and right sides of the drive bevel gear 94 in mesh with respective upper portions of the first driven bevel gear 72 and the second driven bevel gear 74.

When the motor 32 is energized to rotate the extension shaft 92 clockwise as viewed from above, the first driven bevel gear 72 is rotated clockwise in FIG. 7, and the second driven bevel gear 74 is rotated counterclockwise in FIG. 7.

The first drive sprocket 36 rotates in unison with the first driven bevel gear 72, pulling the upper stretch of the annular chain 30 and pushing the lower stretch of the annular chain 30. The second drive sprocket 37 rotates in unison with the second driven bevel gear 74, pulling the lower stretch of the annular chain 33 and pushing the upper stretch of the annular chain 33.

In this manner, the two annular chains 30, 33 are circulatingly driven in the respective opposite directions, conveying joint conveyance carriage assemblies 12 in the opposite directions. For conveying joint conveyance carriage assemblies 12 in the opposite directions, the circulative driver driven by the bevel gear mechanism 34 may employ wires or belts rather than the annular chains 30, 33.

As shown in FIG. 8, in the end of the horizontal conveyance unit 16 where the driven sprockets 38 are located, the rails 28 on both sides are connected to each other by two intermediate plates 102, 104. The intermediate plate 102 has a vertical height smaller than the diameter of the driven sprockets 38. The intermediate plate 104 is substantially in the form of a flat plate having recesses defined in the respective left and right ends of the lower surface thereof, and is positioned closer to the end of the horizontal conveyance unit 16 than the intermediate plate 102.

The rails 28 have holes 106 defined therein substantially intermediate between the intermediate plates 102, 104. A support shaft 108 has opposite ends inserted respectively in the holes 106. The ends of the support shaft 108 have respective steps 110 having slightly smaller diameters, and bearings 112 are fitted respectively over the steps 110. The driven sprockets 38 are locked on respective outer circumferential surfaces of the bearings 112 by retaining rings 114. Cylindrical spacers 116 are mounted on the steps 110 between the bearings 112 and the rails 28, thereby positioning the bearings 112.

With the above arrangement, the two driven sprockets 38 are rotatable to guide the annular chains 30, 33, respectively. Since the height of the intermediate plate 102 is smaller than the diameter of the driven sprockets 38, the intermediate plate 102 does not interfere with the annular chains 30, 33.

Figure 9:
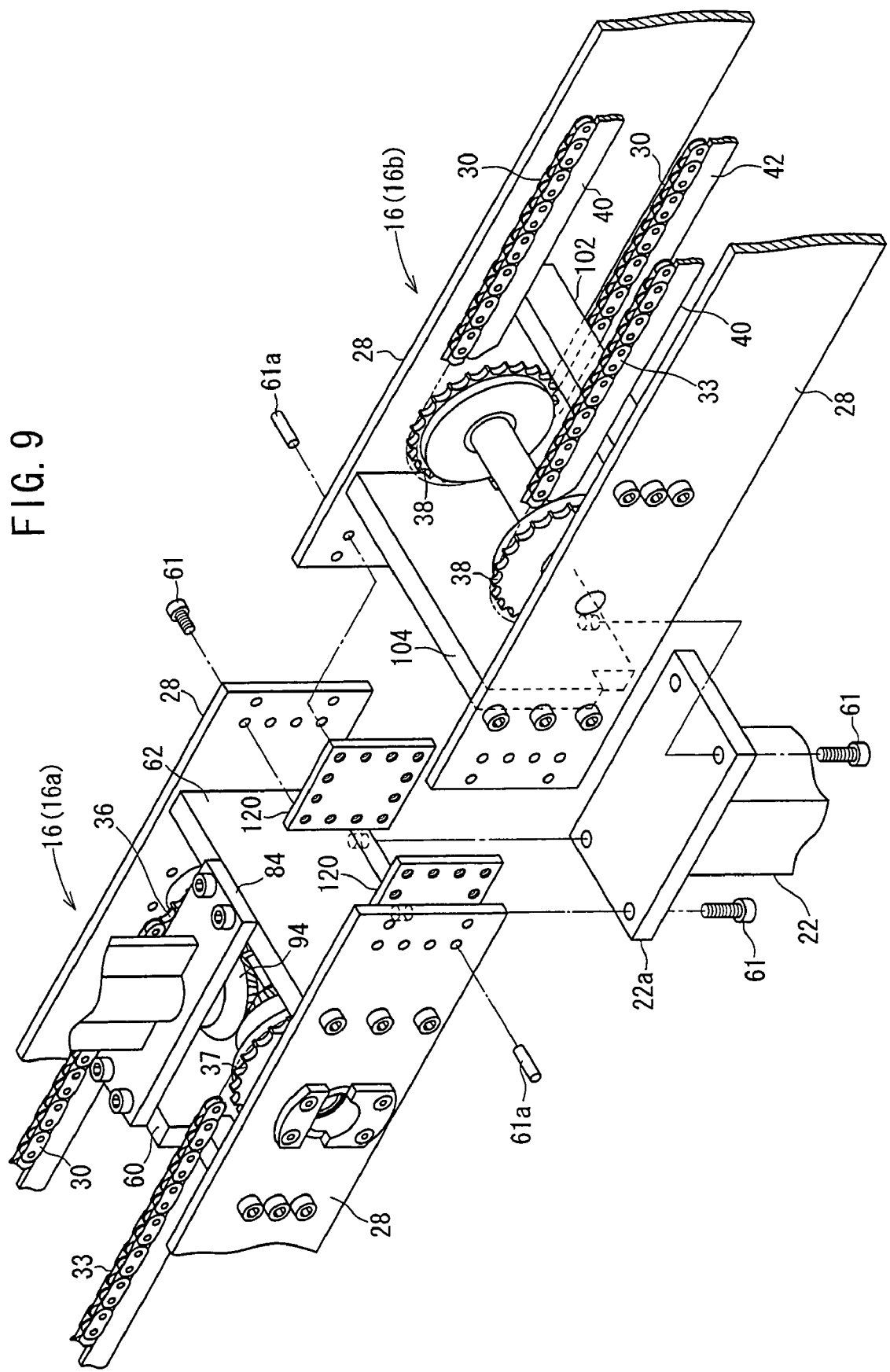
FIG. 9 is a perspective view, partly omitted from illustration, of adjacent ends of two horizontal conveyance units, two joint plates, and a support post.

As shown in FIG. 9, the two horizontal conveyance units 16 (the left horizontal conveyance unit is referred to as a horizontal conveyance unit 16*a* and the right horizontal conveyance unit is referred to as a horizontal conveyance unit 16*b*) are interconnected by two joint plates 120 and a support post 22. The support post 22 has a support plate 22*a* disposed on its uppermost end and projecting to the left and right. The support plate 22*a* has an end fastened to the lower surface of the intermediate plate 62 of the horizontal conveyance unit 16*a* by bolts 61. The other end of the support plate 22*a* is fastened to the lower surface of the intermediate plate 104 of the horizontal conveyance unit 16*b* by bolts 61.

The rail 28 of the horizontal conveyance unit 16*a* and the rail 28 of the horizontal conveyance unit 16*b* have respective end faces held against each other, and are fastened to each other by the joint plates 120 that are applied to the inner surfaces of the rails 28 and bolts 61 threaded in bolt holes in the joint plates 120. Some of the bolts 61 may be replaced with positioning pins 61*a* to position the joint plates 120 and the rails 28 more accurately with respect to each other, thereby accurately joining the rails 28. As a result, the junction between the rails 28 provides a continuous upper surface free of steps and gaps, allowing the joint conveyance carriage assembly 12 to pass smoothly thereover.

As described above, the two horizontal conveyance units 16*a*, 16*b* are interconnected by the two joint plates 120 and the support post 22. The horizontal conveyance units 16*a*, 16*b* can be interconnected easily because it is only necessary to tighten the bolts 61 and insert the positioning pins 61*a* to connect the horizontal conveyance units 16*a*, 16*b* to each other. As the motor 32, the annular chains 30, 33, the motor unit 82, etc. do not need to be separated, each of the horizontal conveyance units 16 can be handled as one unit.

The gradient conveyance unit 18 will be described below.

Figure 10:
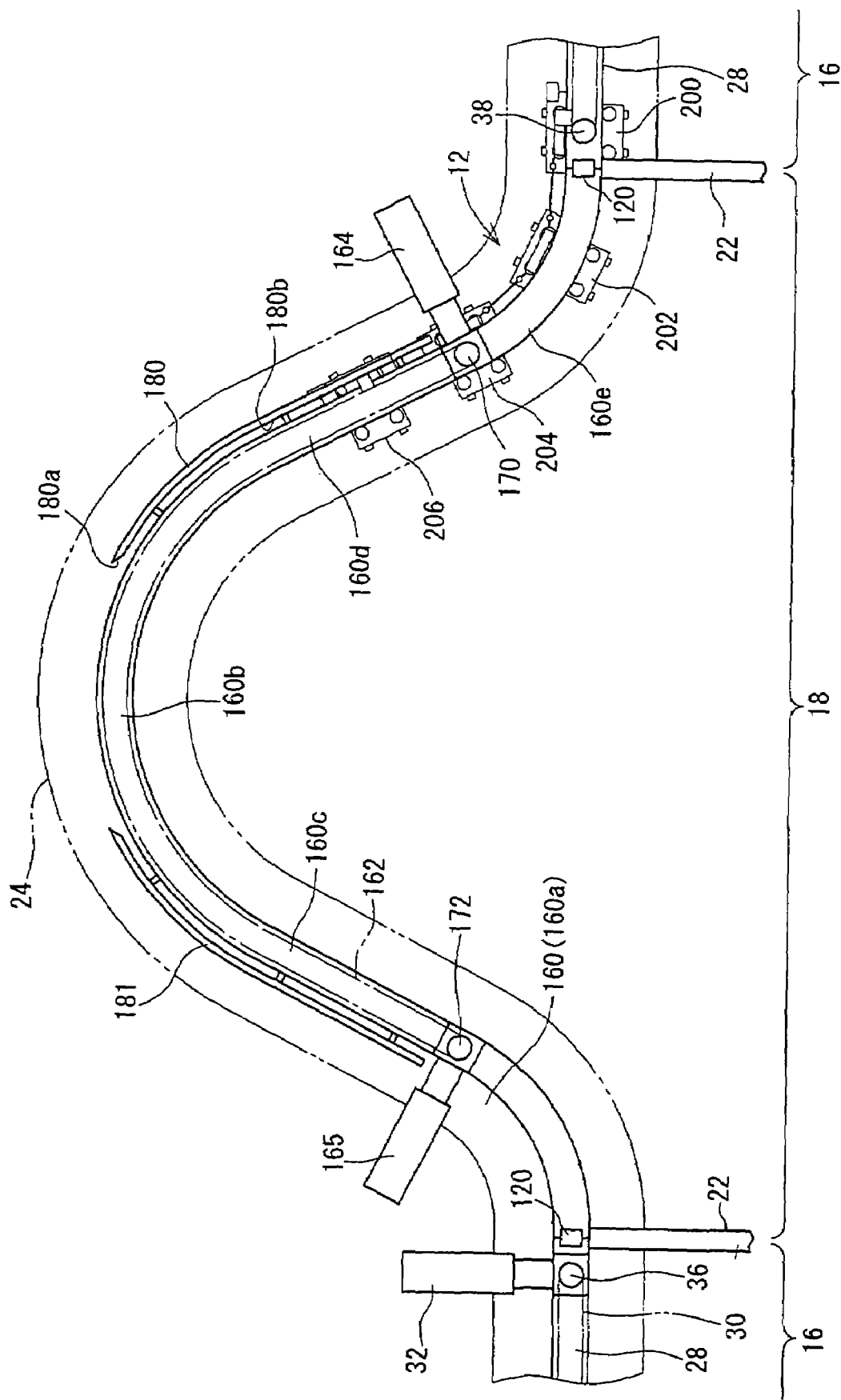
FIG. 10 is a side elevational view of portions of two horizontal conveyance units and a gradient conveyance unit.

As shown in FIGS. 1, 3, and 10, the gradient conveyance unit 18 is of a symmetrical upwardly convex shape except some portions thereof, and keeps a height large enough for people, forklifts, etc. to pass below a central region of the gradient conveyance unit 18.

The gradient conveyance unit 18 has rails 160 for supporting the joint conveyance carriage assembly 12 and guiding the joint conveyance carriage assembly 12 in the conveyance direction, a gradient conveyance annular chain (driver) 162 for conveying the joint conveyance carriage assembly 12, and a motor 164 as a drive source for driving the annular chain 162. The motor 164 is a drive source dedicated for the gradient conveyance annular chain for conveying the joint conveyance carriage assembly 12 in the direction indicated by the arrow B. The gradient conveyance unit 18 has another motor 165 as a drive source for driving a gradient conveyance annular chain 163 (see FIG. 11) for conveying the joint conveyance carriage assembly 12 in the direction indicated by the arrow A. A mechanism for operatively coupling the motor 164 and the annular chain 162 to each other, and a mechanism for operatively coupling the motor 165 and the annular chain 163 to each other are similar to the bevel gear mechanism 34 shown in FIG. 7, and are devoid of one of bevel gears corresponding to the first driven bevel gear 72 or the second driven bevel gear 74.

The rails 160 are a width d (see FIG. 16) and a height h (see FIG. 17) which are the same as those of the rails 28 of the horizontal conveyance units 16. The rails 28 and the rails 160 are interconnected by joint plates 120 that are identical to the joint plates 120 (see FIG. 9) which interconnect the horizontal conveyance units 16.

As shown in FIG. 11, the annular chain 30 and the annular chain 162 are positionally different from each other in the transverse direction, and the annular chain 162 is positioned inwardly of the annular chain 30 by a width w.

Referring back to FIG. 10, the rails 160 have gradient inlet sections 160*a* which are of a relatively small arcuate shape having an upward grade toward the center of the rails 160. The gradient inlet sections 160*a* are connected contiguously to the ends of the rails 28 of the horizontal conveyance units 16. The rails 160 have central sections 160*b* which are of a relatively large arcuate shape that is upwardly convex. The gradient inlet sections 160*a* and the central sections 160*b* are connected to each other by constant gradient sections 160*c* having an upward grade of constant gradient. The rails 160 are symmetrical in shape, and the central sections 160*b* are connected to constant gradient sections 160*d* having a downward grade of constant gradient. The constant gradient sections 160*d* are connected to gradient inlet sections 160*e* which are of a relatively small arcuate shape. The gradient inlet sections 160*a*, 160*e* are identical in shape to each other, and the constant gradient sections 160*c*, 160*d* are identical in shape to each other.

The gradient conveyance unit 18 has a drive bevel gear coupled to the motor 164, a drive sprocket (gradient conveyance drive sprocket) 170 for circulatingly driving the annular chain 162 by the aid of the drive bevel gear, and a driven sprocket (gradient conveyance driven sprocket) 172 which is driven when the annular chain 162 is circulatingly driven. As viewed from the central line C (see FIG. 2), the drive sprocket 170 rotates the annular chain 162 clockwise to convey the joint conveyance carriage assembly 12 in the direction indicated by the arrow B. The drive sprocket 170 is disposed in the vicinity of a junction between the gradient inlet section 160*e* and the constant gradient section 160*d*. The driven sprocket 172 is disposed in the vicinity of a junction between the gradient inlet section 160*a* and the constant gradient section 160*c*.

The motor 164 has a rotational shaft extending perpendicularly to the conveyance direction. The axis of rotation of the rotational shaft of the motor 164 is converted 90° into an axis of rotation on a vertical plane. Therefore, the drive sprocket 170 and the driven sprocket 172 rotate on the vertical plane.

The gradient conveyance unit 18 also has a gradient upper guide (gradient guide) 174 for supporting, from below, chain guide rollers 162*a* (see FIG. 11) of an upper stretch of the annular chain 162, and a gradient lower guide (gradient guide) 176 for supporting, from below, chain rollers 162*a* of a lower stretch of the annular chain 162.

The gradient upper guide 174 and the gradient lower guide 176 are of a shape substantially along the respective upper and lower surfaces of the rails 160. The annular chain 162 is guided to move circulatingly in an upwardly convex pattern by the gradient upper guide 174 and the gradient lower guide 176.

The driven sprocket 172 has a push-out portion 172*a* for pushing the annular chain 162. The push-out portion 172*a* is positioned slightly below the upper surfaces of the rails 160 such that a lateral-tooth sprocket 246 (to be described later) which enters substantially along the upper surfaces of the rails 160 is smoothly introduced.

The driven sprocket 172 has its axis positionally adjustable by a tension mechanism 178 to adjust the slack or tension of the annular chain 162.

A cam plate (lowering cam plate) 180 is disposed in a downgrade region of the gradient conveyance unit 18. The cam plate 180 extends along the conveyance direction. The cam plate 180 has a lower surface comprising a slanted surface 180*a* inclined obliquely downwardly along the conveyance direction and a parallel surface 180*b* contiguous to the slanted surface 180*a* and parallel to the rails 160. A cam plate 181 shown in FIGS. 1 and 10 is identical in shape to the cam plate 180, and is used to convey the joint conveyance carriage assembly 12 in the direction indicated by the arrow A.

The horizontal conveyance unit 16 and the gradient conveyance unit 18 are connected to each other in the same manner as the horizontal conveyance units 16 are connected to each other (see FIG. 9). Specifically, the rails 28 of horizontal conveyance unit 16 and the rails 160 of the gradient conveyance unit 18 are connected to each other by joint plates 120 (see FIG. 3), and supported by a support post 22 fixed thereto from below.

The horizontal conveyance unit 16 and the direction-reversing unit 20 (see FIGS. 1 and 2), and the direction-reversing unit 20 and the gradient conveyance unit 18 are also connected to each other in the same manner as the horizontal conveyance units 16 are connected to each other.

The direction-reversing unit 20 will be described below.

Figure 12:
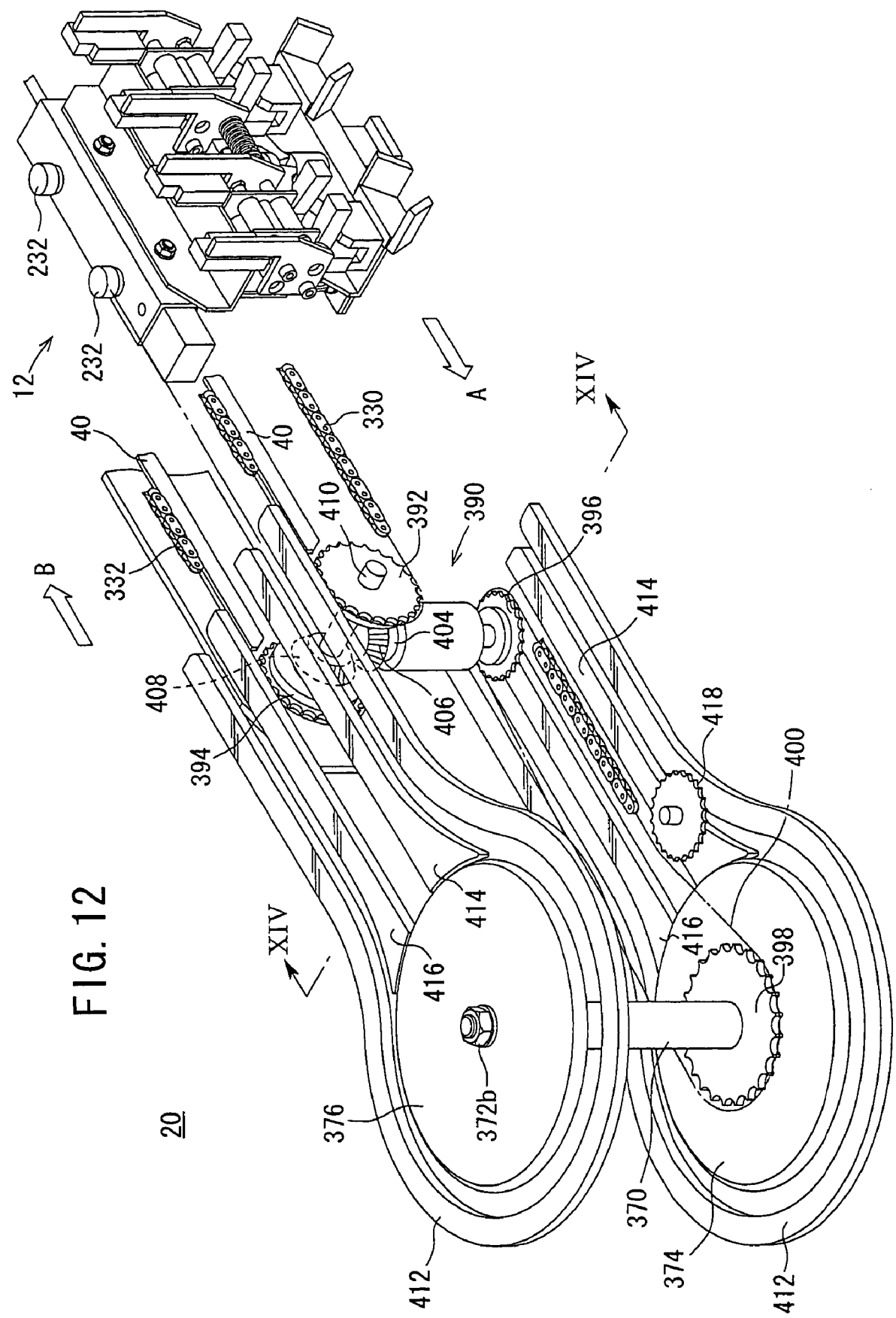
FIG. 12 is a fragmentary perspective view of a direction-changing unit according to the system hereof.
Figure 13:
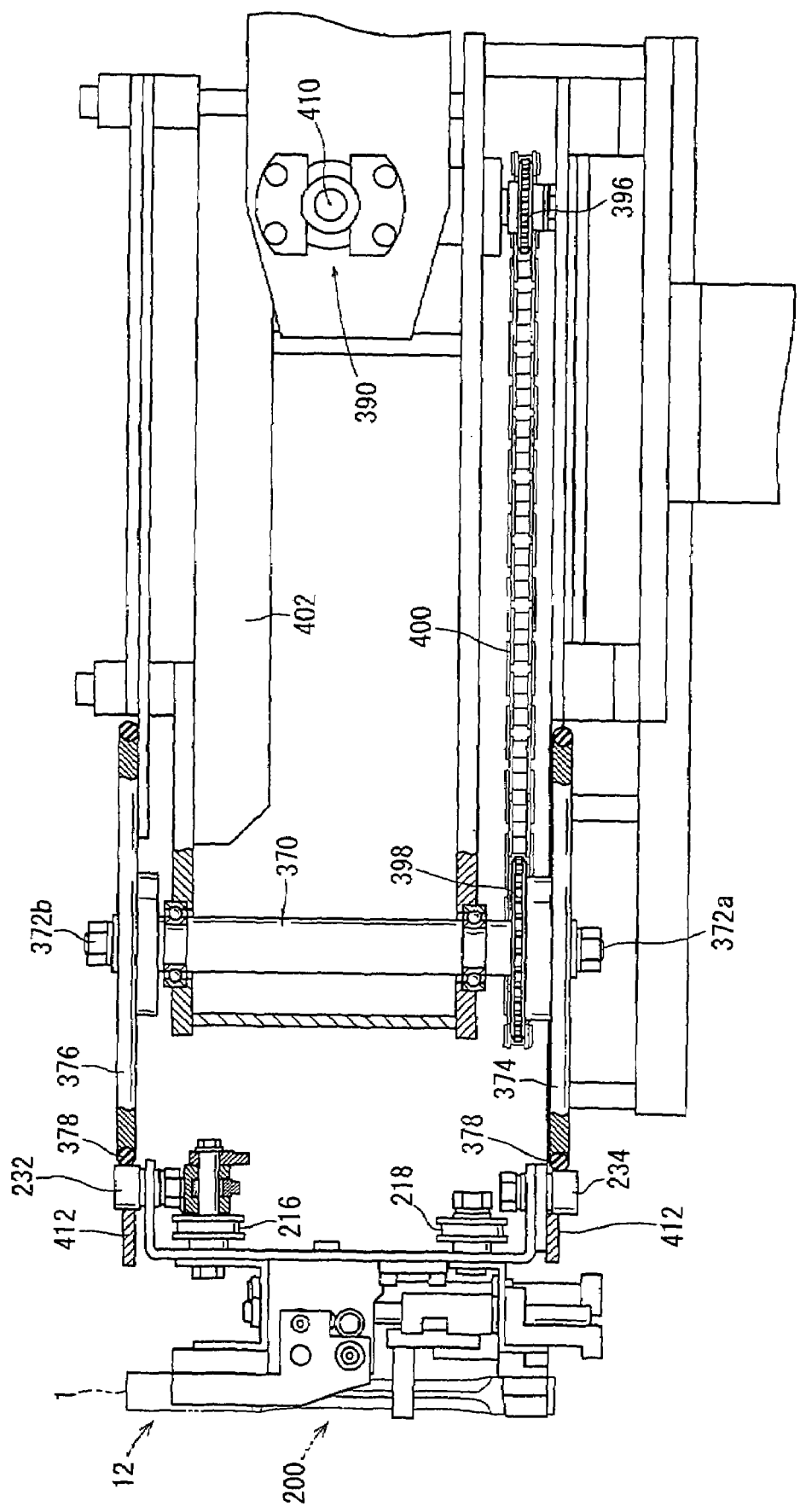
FIG. 13 is a vertical cross-sectional view of the direction-changing unit shown in FIG. 12.

As shown in FIGS. 12 and 13, the direction-reversing unit 20 has a rotational shaft 370, and first and second disks 374, 376 coupled to the rotational shaft 370 respectively by screws 372*a*, 372*b*, the first and second disks 374, 376 being rotatable upon rotation of the rotational shaft 370. O-rings 378 (see FIG. 13) are mounted on respective circumferential side walls of the first and second disks 374, 376.

The direction-reversing unit 20 also has a forward-path chain 330 and a return-path chain 332 which are circulatively driven by a motor 32*b* shown in FIG. 1 as with the annular chains 30, 33 of the horizontal conveyance unit 16. The joint conveyance carriage assembly 12 is conveyed to shift from the chain 33 to the forward-path chain 330, and enters the direction-reversing unit 20. After having been reversed in direction by the direction-reversing unit 20, the joint conveyance carriage assembly 12 is conveyed to shift from the return-path chain 332 to the annular chain 30.

The direction-reversing unit 20 has an auxiliary propelling mechanism 390 for conveying the joint conveyance carriage assembly 12 from the horizontal conveyance unit 16 to the first and second disks 374, 376 or from the first and second disks 374, 376 to the horizontal conveyance unit 16.

The auxiliary propelling mechanism 390 has a reversing-unit first driven sprocket 392 around which the forward-path chain 330 is trained, a reversing-unit second driven sprocket 394 around which the return-path chain 332 is trained, a small sprocket 396 rotatable in ganged relation to the reversing-unit first driven sprocket 392 and the reversing-unit second driven sprocket 394, a large sprocket 398 fitted over the rotational shaft 370, and a chain 400 trained around the small sprocket 396 and the large sprocket 398. The chain 400 can be adjusted in tension by a gear 418 serving as a tensioner.

As shown in FIG. 13, the direction-reversing unit 20 and the auxiliary propelling mechanism 390 are mounted on a mount base 402 disposed on a support post 22. The small sprocket 396 is mounted on a vertically extending rotational shaft 404 that is rotatably supported on the mount base 402.

Figure 14:
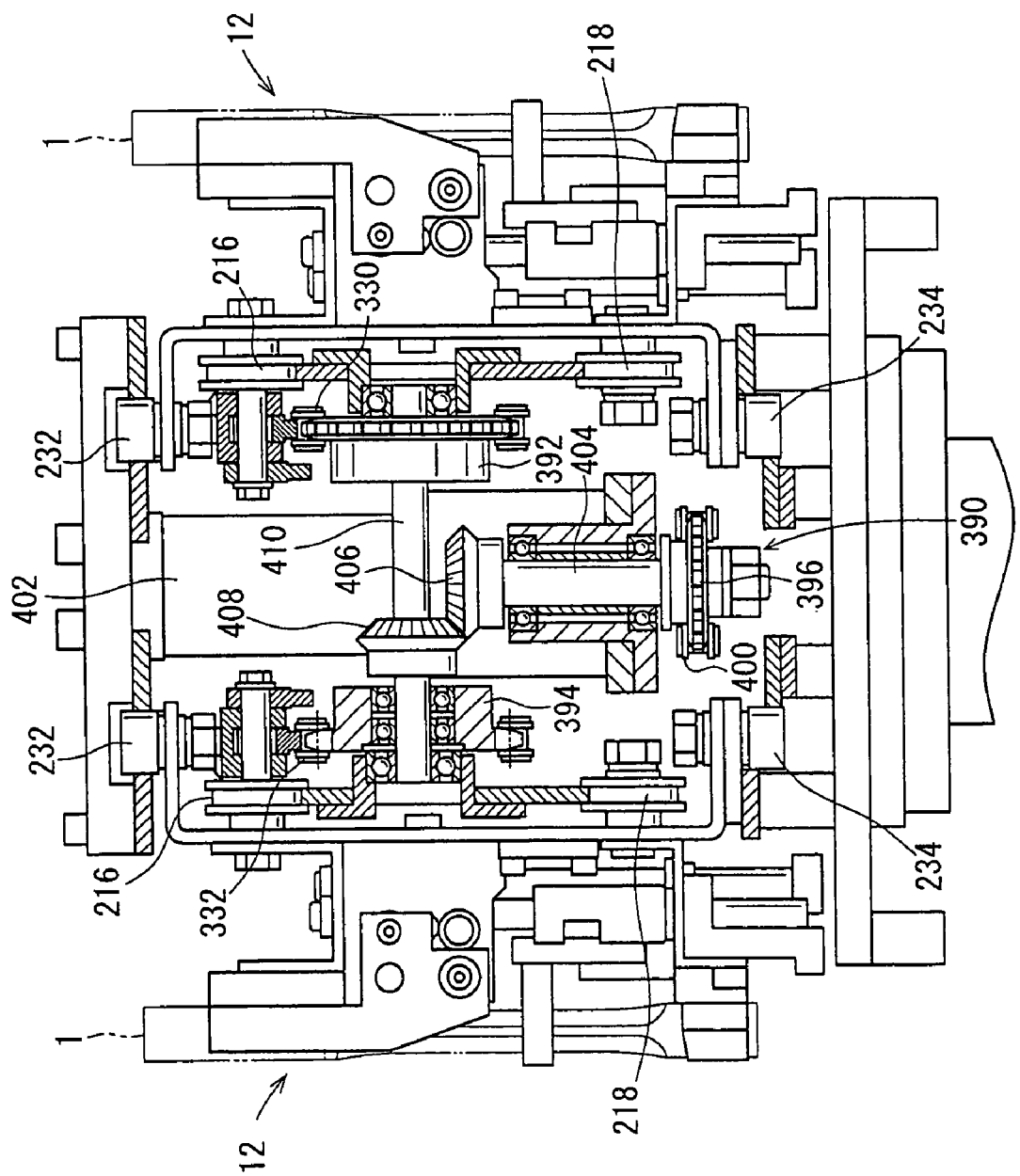
FIG. 14 is a cross-sectional view taken along line XIV-XIV of FIG. 12.

As shown in FIGS. 12 and 14, a reversing-unit main bevel gear 406 is fitted over an end of the rotational shaft 404. The reversing-unit main bevel gear 406 is held in mesh with a reversing-unit driven bevel gear 408.

The reversing-unit driven bevel gear 408 has a through hole defined therein, and a shaft 410 extends through the through hole and has an end projecting therefrom. The reversing-unit second driven sprocket 394 is fitted over the projecting end of the shaft 410. The reversing-unit first driven sprocket 392 is fitted over the other end of the shaft 410. When the motor 32b is energized to rotate a drive sprocket 36b (see FIG. 1) of the direction-reversing unit 20, the forward-path chain 330 (see FIGS. 12 and 14) is circulatingly driven, rotating the reversing-unit first driven sprocket 392. The reversing-unit main bevel gear 406 and the reversing-unit driven bevel gear 408 are rotated, finally rotating the reversing-unit second driven sprocket 394, the rotational shaft 404, and the small sprocket 396.

The large sprocket 398 fitted over the rotational shaft 370 is rotated, rotating the first and second disks 374, 376.

Though the auxiliary propelling mechanism 390 is shown as being exposed in FIG. 12, the auxiliary propelling mechanism 390 is actually surrounded by the cover 24.

Figure 15:
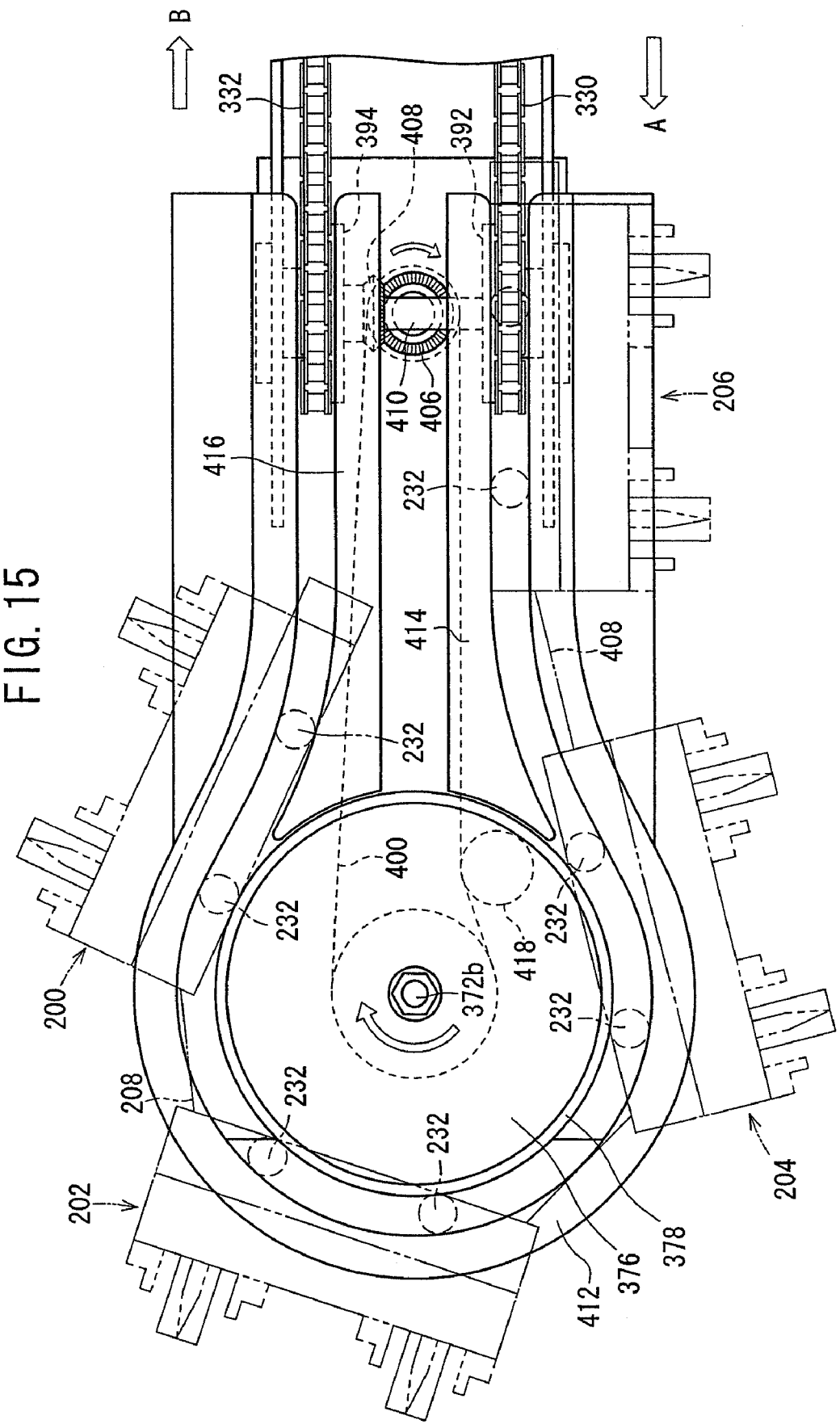
FIG. 15 is a plan view of the directional changer of FIG. 12.

As shown in FIGS. 12 and 15, a first guide member 412 for sandwiching and supporting upper rollers 232 in coaction with the first disk 374 is disposed around the first disk 374. The first guide member 412 has a curved portion spaced from the circumferential side wall of the first disk 374 by a gap large enough for the upper rollers 232 to enter, and surrounding the circumferential side wall of the first disk 374. The first guide member 412 has elongate straight portions, and a forward-path second guide member 414 and a return-path third guide member 416 are disposed inwardly of those elongate straight portions. The first through third guide members 412, 414, 416 are supported on the mount base 402 (see FIGS. 13 and 14).

A structure which is the same as the above structure is disposed around the second disk 376. Therefore, identical parts are denoted by identical reference characters and will not be described below.

The joint conveyance carriage assembly 12 will be described below.

As shown in FIG. 1, the joint conveyance carriage assembly 12 comprises four conveyance carriages arranged successively in the conveyance direction, i.e., a first conveyance carriage 200, a second conveyance carriage 202, a third conveyance carriage 204, and a fourth conveyance carriage 206, and three joint bars (joints) 208 interconnecting the first through fourth conveyance carriages 200, 202, 204, 206. Since the joint conveyance carriage assembly 12 comprises a plurality of conveyance carriages, the number of workpieces loaded on the joint conveyance carriage assembly 12 can be increased depending on the number of conveyance carriages. The number of conveyance carriages may be increased or reduced depending on the number of loaded workpieces.

Figure 16:
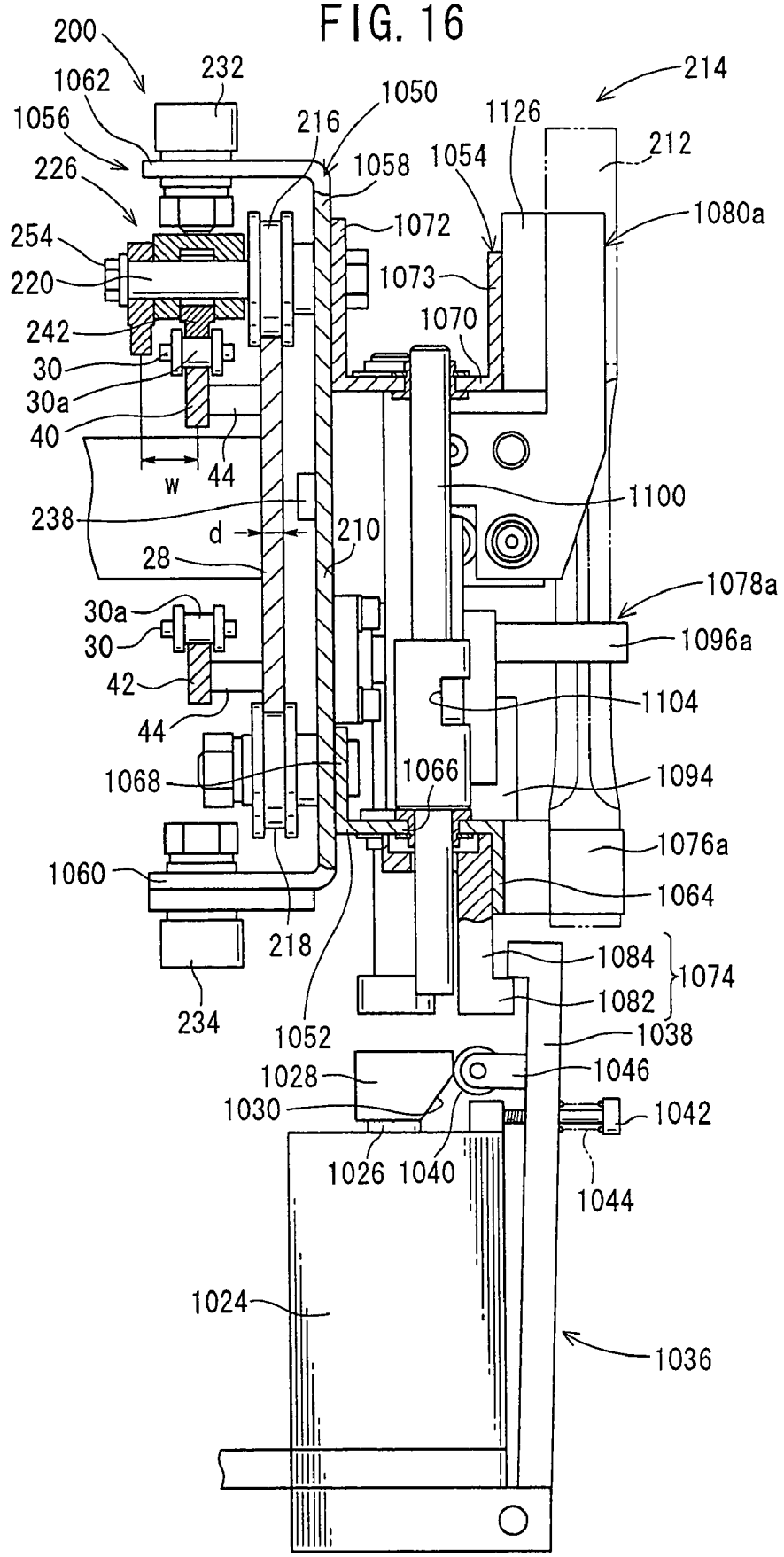
FIG. 16 is a front elevational view, partly in cross section, of a rail, a horizontal upper guide, a horizontal lower guide, and a first conveyance carriage according to the system hereof.
Figure 17:
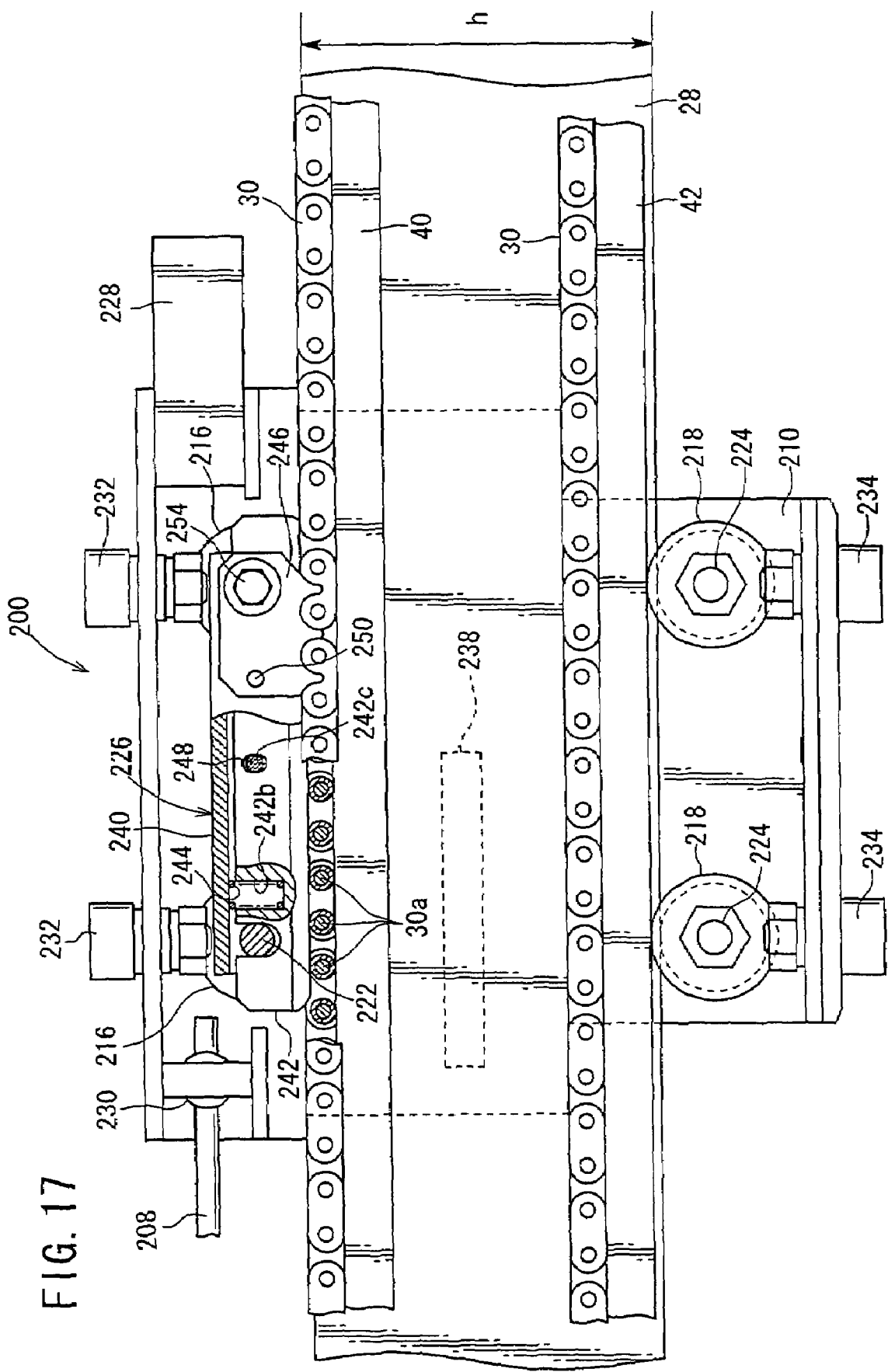
FIG. 17 is a side elevational view, partly in cross section, of the first conveyance carriage as viewed from the central line of the conveyance system.
Figure 18:
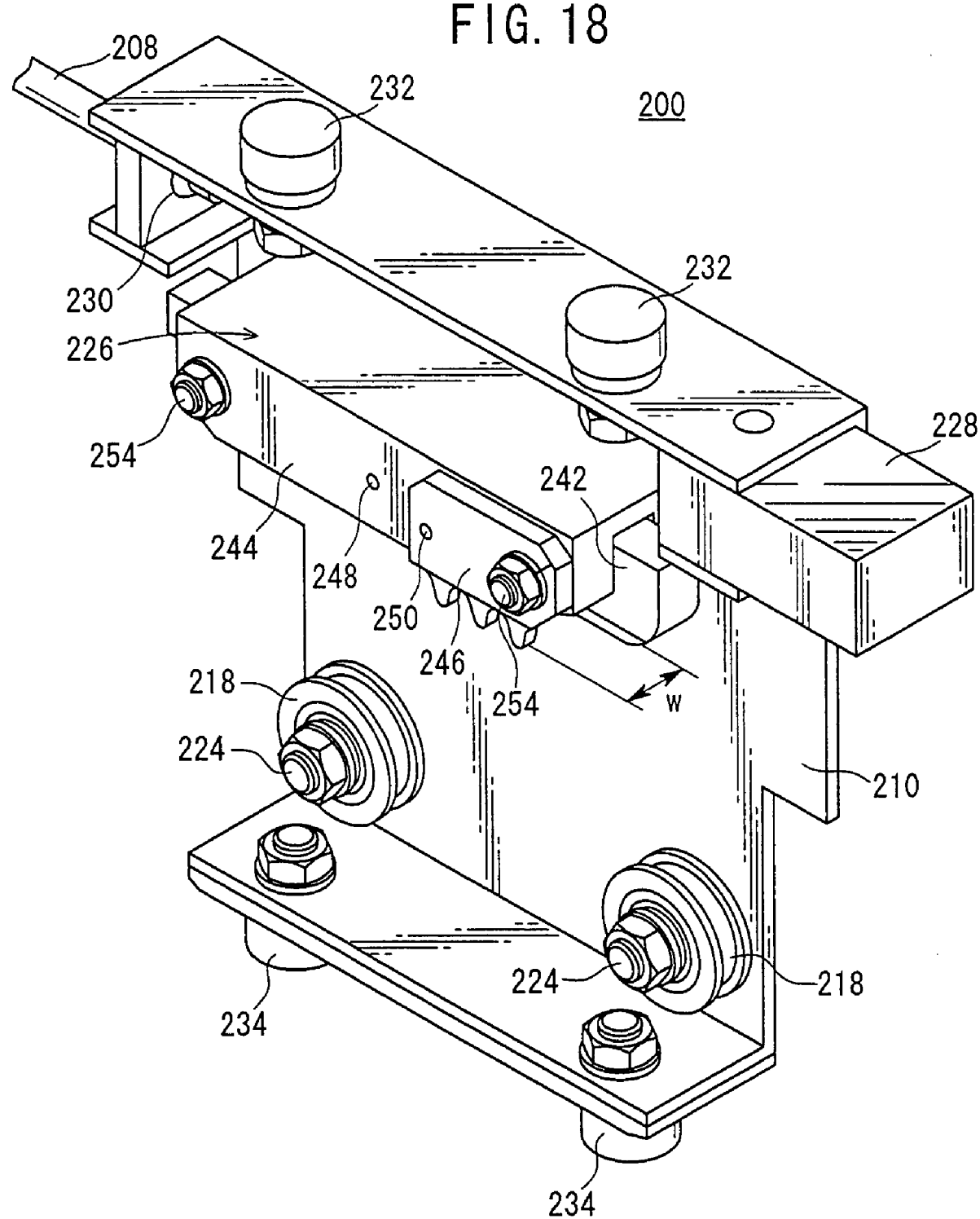
FIG. 18 is a perspective view of the first conveyance carriage.

As shown in FIGS. 16 through 18, the first conveyance carriage 200 has a base plate 210 as a basic component, a mounting/removing mechanism 214 disposed on an outer side of the base plate 210 for mounting and removing a workpiece such as a connecting rod 1, two upper rollers 216 for rolling in the conveyance direction while in abutment against the upper surface of the rail 28 (or the rail 160), and two lower rollers 218 disposed vertically downwardly (when conveyed horizontally) of the respective upper rollers 216, for rolling in the conveyance direction while in abutment against the lower surface of the rail 28 (or the rail 160). A basic arrangement of the first conveyance carriage 200 will first be described below. The mounting/removing mechanism 214 will be described later.

The first conveyance carriage 200 has a main body 1056 made up of an under plate 1052 and an upper plate 1054 that are joined to the base plate 210. The base plate 210 has a main portion 1058, and a lower horizontal portion 1060 and an upper horizontal portion 1062 which are bent substantially perpendicularly from the main portion 1058.

The under plate 1052 has a lower tongue 1064 hanging vertically downwardly, a horizontal portion 1066 bent perpendicularly to the lower tongue 1064 and extending toward the main portion, and an upper tongue 1068 rising perpendicularly from the horizontal portion 1066. The upper plate 1054 has a bottom portion 1070, and a rear vertical end portion 1072 and a front vertical end portion 1073 which rise vertically from the bottom portion 1070. The upper tongue 1068 of the under plate 1052 and the rear vertical end portion 1072 of the upper plate 1054 are joined to an end face of the main portion 1058 of the base plate 210.

The two upper rollers 216 are rotatably supported respectively on a front shaft 220 and a rear shaft 222 (see FIG. 19) which extend inwardly from a relatively upper portion of the base plate 210. The two lower rollers 218 are rotatably supported respectively on two lower shafts 224 which extend inwardly from a relatively lower portion of the base plate 210.

The first conveyance carriage 200 has a drive power transmitter 226 for receiving drive power from the annular chain 30 and the annular chain 162, a shock damper 228 disposed on a foremost portion of the first conveyance carriage 200, and a joint 230 disposed on a rear end of the first conveyance carriage 200 and connected to the joint bar 208.

The drive power transmitter 226, together with the upper rollers 216, is supported on the front shaft 220 and the rear shaft 222. The joint 230 is a ball joint (or a universal joint or the like) which allows the joint bar 208 to swing in any of horizontal and vertical directions. The joint 230 may be made of an elastic material that is elastically deformable in any of horizontal and vertical directions. The joint 230 allows the first through fourth conveyance carriages 200, 202, 204, 206 to be tilted vertically in the gradient conveyance unit 18 and also to be turned in a horizontal plane of the direction-reversing unit 20.

The first conveyance carriage 200 also has two upper rollers 232 for use in a braking action in the station 26 and a direction-reversing action in the direction-reversing unit 20. Two lower rollers 234 are disposed vertically downwardly of the upper rollers 232, respectively, for use in a direction-reversing action in the direction-reversing unit 20. A stopper 238 (see FIG. 34) used by the stopping mechanism 2010 of the station 26 is disposed on the inner surface of the base plate 210.

Figure 19:
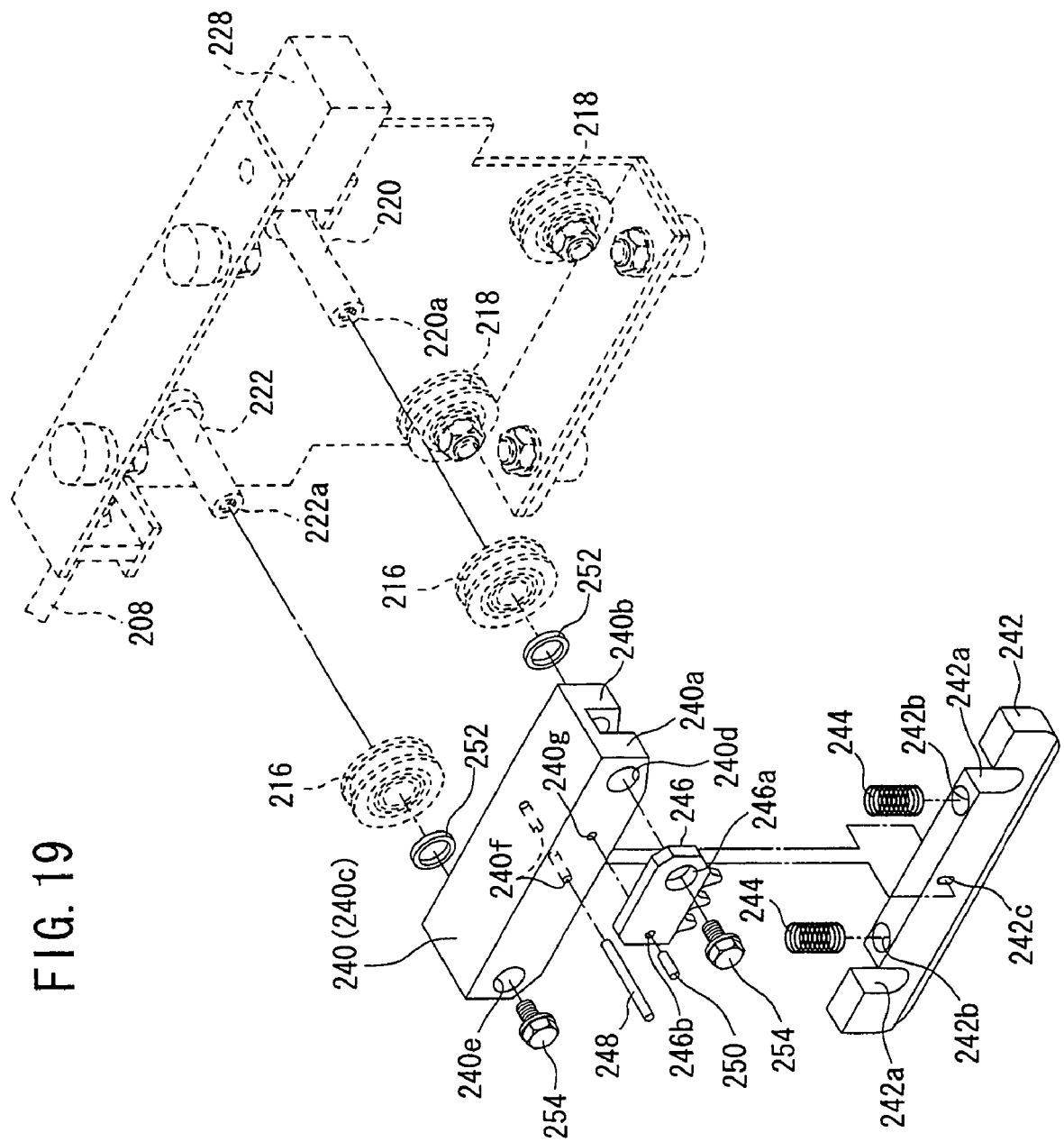
FIG. 19 is an exploded perspective view of a drive power transmitter of the first conveyance carriage.

As shown in FIG. 19, the drive power transmitter 226 has a frame 240 comprising two parallel horizontally elongate plates 240a, 204b and an upper face plate 240c interconnecting the horizontally elongate plates 240a, 204b, a chain presser plate (driven member) 242 fitted from below in the gap between the horizontally elongate plates 240a, 204b, two springs 244 for lowering the chain presser plate 242 with respect to the frame 240, and a lateral-tooth sprocket (driven sprocket) 246 held in contact with an inner surface (facing the viewer of FIG. 19) of the frame 240.

The chain presser plate 242 has a lower surface having arcuate front and rear sides smoothly blending into respective front and rear faces thereof. The chain presser plate 242 also has two U-shaped grooves 242a defined in the upper surface thereof and extending transversely across the chain presser plate 242. The front shaft 220 and the rear shaft 222 on the base plate 210 are fitted respectively in the two U-shaped grooves 242a. The chain presser plate 242 also has two bottomed holes 242b defined in its upper surface between the two U-shaped grooves 242a. The two holes 242b have respective diameters slightly larger than the diameters of the springs 244. The two holes 242b have respective depths smaller than the lengths of the springs 244 in their free state (the lengths thereof when no external forces are applied). The chain presser plate 242 has a vertically elongate hole 242c defined substantially centrally in side surfaces thereof and extending transversely across the chain presser plate 242. The width of the chain presser plate 242 is slightly smaller than the width d (see FIG. 16) of the chain rollers 30a of the annular chain 30.

The two elongate plates 240a, 204b of the frame 240 have holes 240d in which the front shaft 220 is fitted and holes 240e in which the rear shaft 222 is fitted. The two elongate plates 240a, 204b also have small holes 240f defined substantially centrally therein for fixing a retaining pin 248 therein. The retaining pin 248 is fitted in the two small holes 240f and the elongate hole 242c in the chain presser plate 242 disposed between the two small holes 240f. The chain presser plate 242 is vertically movable depending on a vertical dimensional difference between the elongate hole 242c and the retaining pin 248.

Of the two elongate plates 240a, 204b, the inner elongate plate 240a (facing the viewer of FIG. 19) has a small hole 240g defined in a side surface thereof between the small hole 240f and the hole 240d for a fixing pin 250 to be fitted therein.

The lateral-tooth sprocket 246 has a hole 246a defined in a slightly front side surface thereof for the front shaft 220 to be fitted therein, and a small hole 246b defined in a slightly rear side surface thereof for the fixing pin 250 to be fitted therein.

For assembling the drive power transmitter 226, the springs 244 are inserted into the respective two holes 242b in the chain presser plate 242. Then, the chain presser plate 242 is fitted into the frame 240 to bring the small holes 240f and the elongate hole 242c into positional alignment with each other. At this time, since the upper surfaces of the springs 244 are held against the lower surface of the upper face plate 240c of the frame 240, the chain presser plate 242 is fitted into the frame 240 while compressing the springs 244. After the chain presser plate 242 is fitted in the frame 240, the retaining pin 248 is inserted into the small holes 240f and the elongate hole 242c while keeping the springs 244 compressed. The retaining pin 248 is pressed-fitted and fixed in the small holes 240f. When the force applied to fit the chain presser plate 242 in the frame 240 is removed, the chain presser plate 242 is lowered with respect to the frame 240 under the resiliency of the springs 244, and displaced depending on the vertical dimensional difference between the elongate hole 242c and the retaining pin 248. At this time, the holes 240d, 240e and the U-shaped grooves 242a are positionally aligned with each other.

Then, after the upper rollers 216 and spacers 252 are fitted over the front shaft 220 and the rear shaft 222, the holes 240d, 240e in the frame 240 and the U-shaped grooves 242a in the chain presser plate 242 are fitted over the front shaft 220 and the rear shaft 222. The hole 246a of the lateral-tooth sprocket is fitted over the front shaft 220. The fixing pin 250 is press-fitted into the small hole 246b in the lateral-tooth sprocket 246 and the small hole 240g in the elongate plate 240a which are aligned with each other.

Then, two bolts 254 are threaded respectively into threaded holes 220a, 222a that are defined in the respective distal ends of the front shaft 220 and the rear shaft 222.

The drive power transmitter 226 is assembled in the manner described above, and fixedly mounted on the front shaft 220 and the rear shaft 222 that extend from the base plate 210. The center-to-center distance between the lateral-tool sprocket 246 and the chain presser plate 242 of the drive power transmitter 226 is set to a width w, which is the same as the width w (see FIGS. 11 and 18) by which the annular chain 30 and the annular chain 162 are transversely spaced from each other.

When the joint conveyance carriage assembly 12 is installed on the horizontal conveyance unit 16, the lower surface of the chain presser plate 242 of the drive power transmitter 226 is held in abutment against the chain rollers 30a of the annular chain 30. The springs 244 are slightly compressed, and the chain presser plate 242 and the horizontal upper guide 40 sandwich the chain rollers 30a of the annular chain 30. When the annular chain 30 is circulatingly driven, the chain rollers 30a roll on the upper surface of the horizontal upper guide 40. The chain presser plate 242 move on the principles of a roller under the force applied from the upper surfaces of the chain rollers 30a. The joint conveyance carriage assembly 12 is conveyed in the manner described above. On the upper surface of the horizontal upper guide 40, the speed of the annular chain 30 corresponds to the radius of the chain rollers 30a, and the speed of the chain presser plate 242 corresponds to the diameter of the chain rollers 30a. Based on the ratio of the radius and the diameter, the speed of the chain presser plate 242, i.e., the speed of the joint conveyance carriage assembly 12, is twice the speed of the annular chain 30.

In the gradient conveyance unit 18, since the lateral-tool sprocket 246 and the annular chain 162 mesh with each other, the joint conveyance carriage assembly 12 is conveyed by the annular chain 162.

In both the horizontal conveyance unit 16 and the gradient conveyance unit 18, as the rails 28 (or the rails 160) are sandwiched by the upper rollers 216 and the lower rollers 218, the joint conveyance carriage assembly 12 is reliably held by the rails 28 (or the rails 160).

Figure 20:
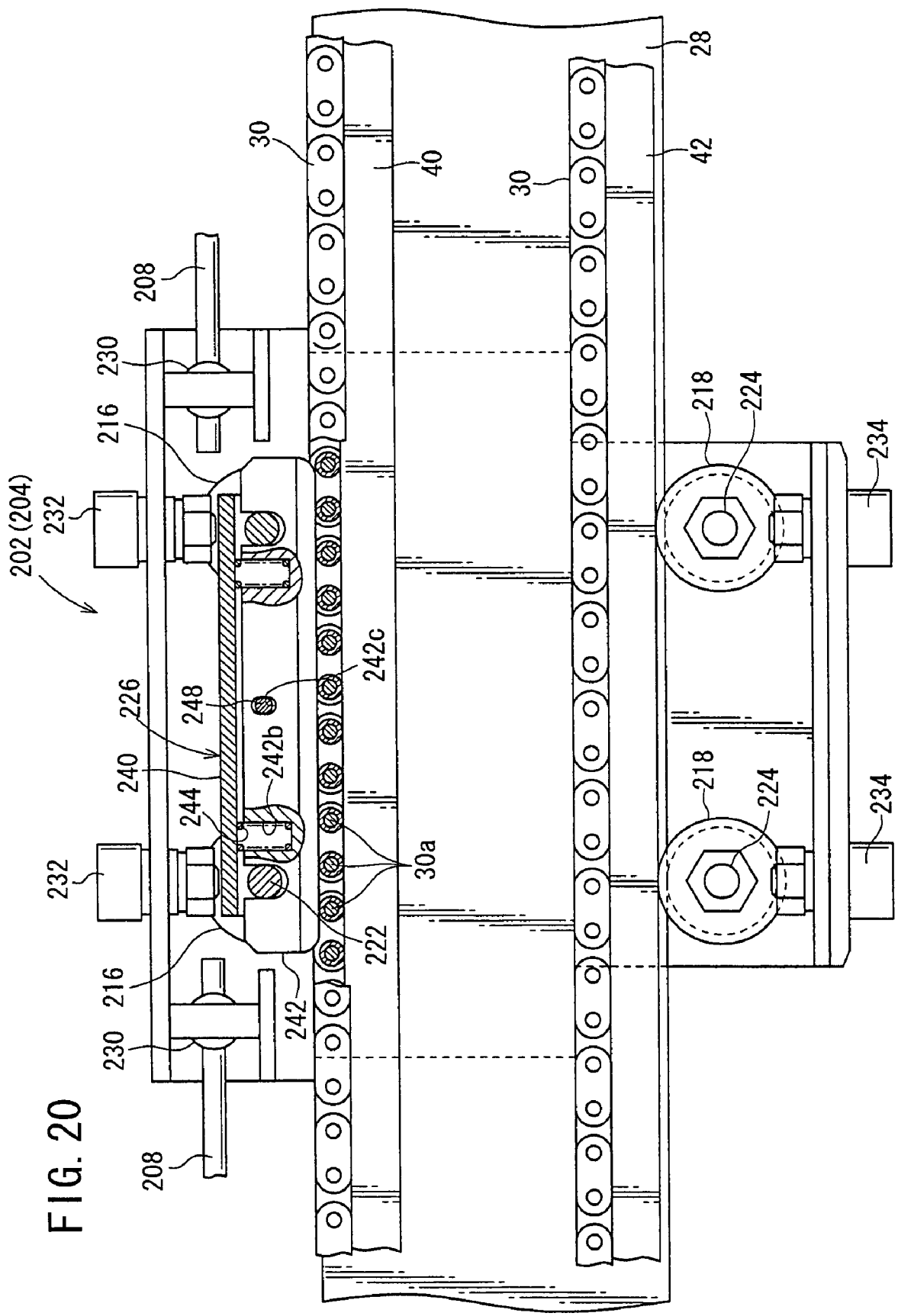
FIG. 20 is a side elevational view, partly in cross section, of a second conveyance carriage as viewed from the central line of the conveyance system.

As shown in FIG. 20, the second conveyance carriage 202 and the third conveyance carriage 204 are essentially identical in structure to the first conveyance carriage 200, but differs therefrom in that the second conveyance carriage 202 and the third conveyance carriage 204 are devoid of the shock damper 228, the lateral-tooth sprocket 246, and the stopper 238. Joints 230, rather than the shock damper 228, are mounted on the front ends of the second conveyance carriage 202 and the third conveyance carriage 204. The joints 230 are the same as the joints 230 on the rear ends of the second conveyance carriage 202 and the third conveyance carriage 204, and are connected to the joint bars 208. Those structural parts of the second conveyance carriage 202 and the third conveyance carriage 204 which are identical to those of the first conveyance carriage 200 are denoted by identical reference characters, and will not be described in detail below.

Figure 21:
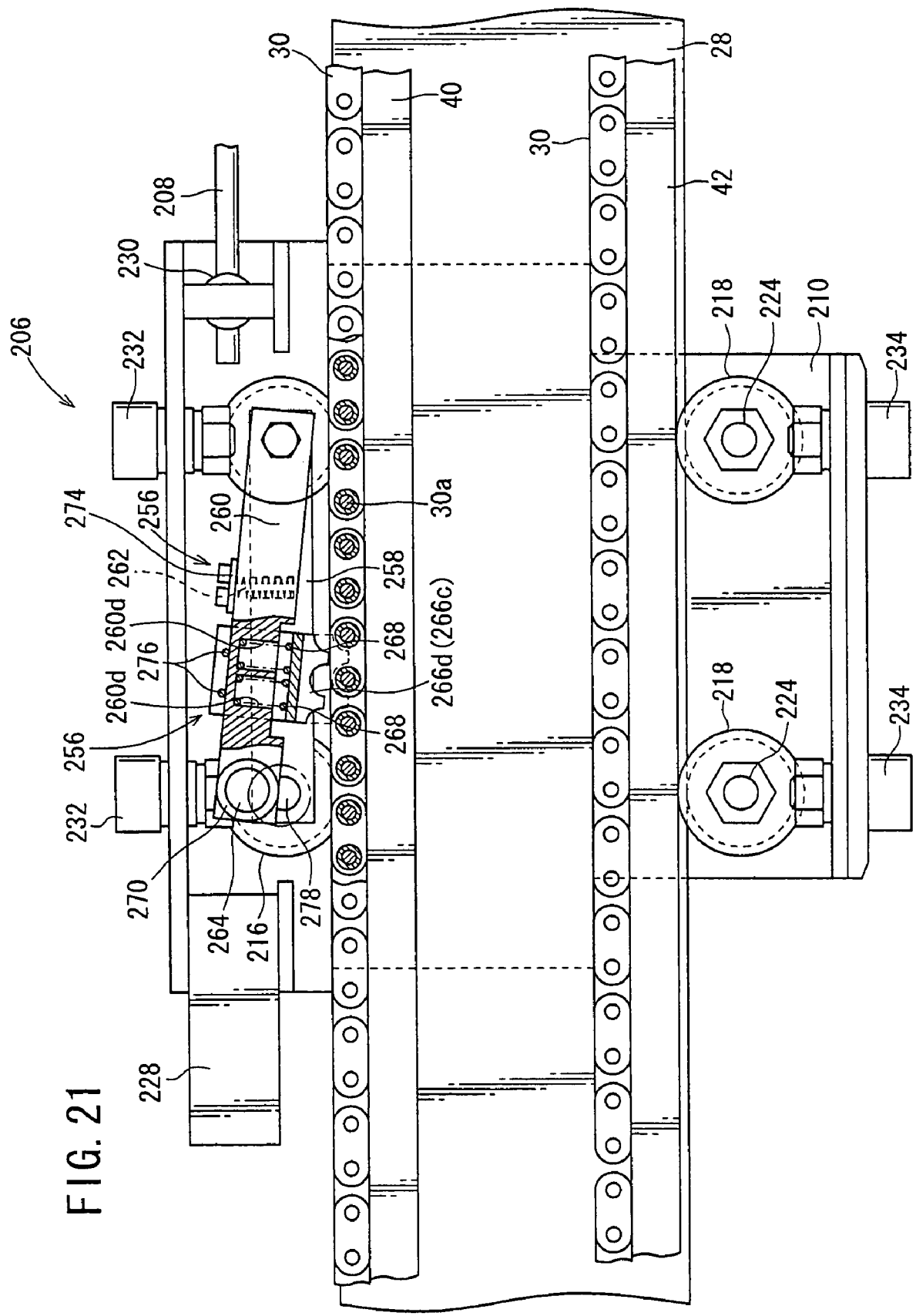
FIG. 21 is a side elevational view, partly in cross section, of a fourth conveyance carriage as viewed from the central line of the conveyance system.
Figure 22:
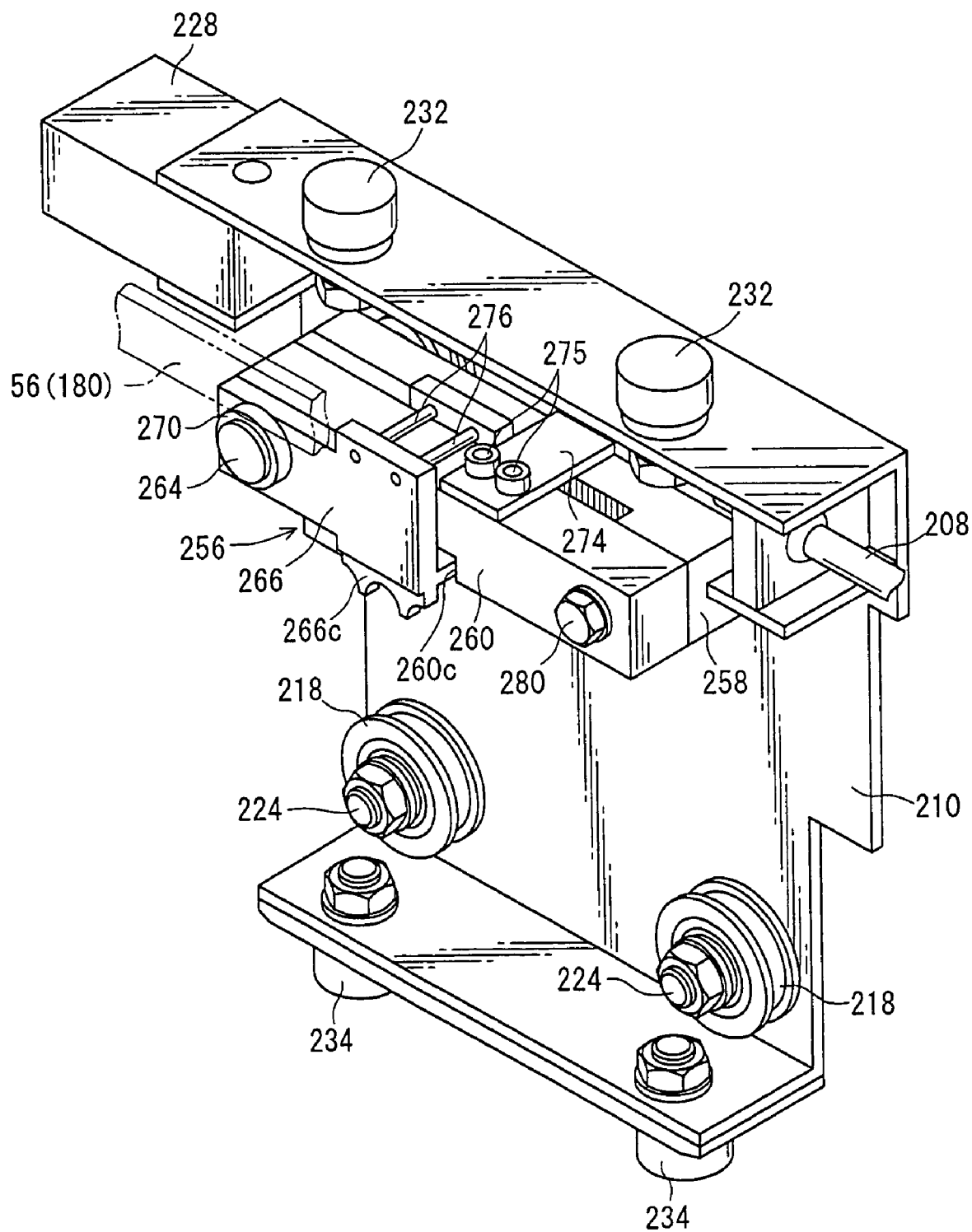
FIG. 22 is a perspective view of the fourth conveyance carriage.

As shown in FIGS. 21 and 22, the fourth conveyance carriage 206 is essentially identical in structure to the first conveyance carriage 200. However, the fourth conveyance carriage 206 differs from the first conveyance carriage 200 in that the shock damper 228 is mounted on the rear end, the joint 230 is disposed on the front end, a drive power transmitter 256 is employed instead of the drive power transmitter 226, and the stopper 238 is dispensed with. Those structural parts of the fourth conveyance carriage 206 which are identical to those of the first conveyance carriage 200 are denoted by identical reference characters, and will not be described in detail below.

The drive power transmitter 226 of the fourth conveyance carriage 206 will be described below.

Figure 23:
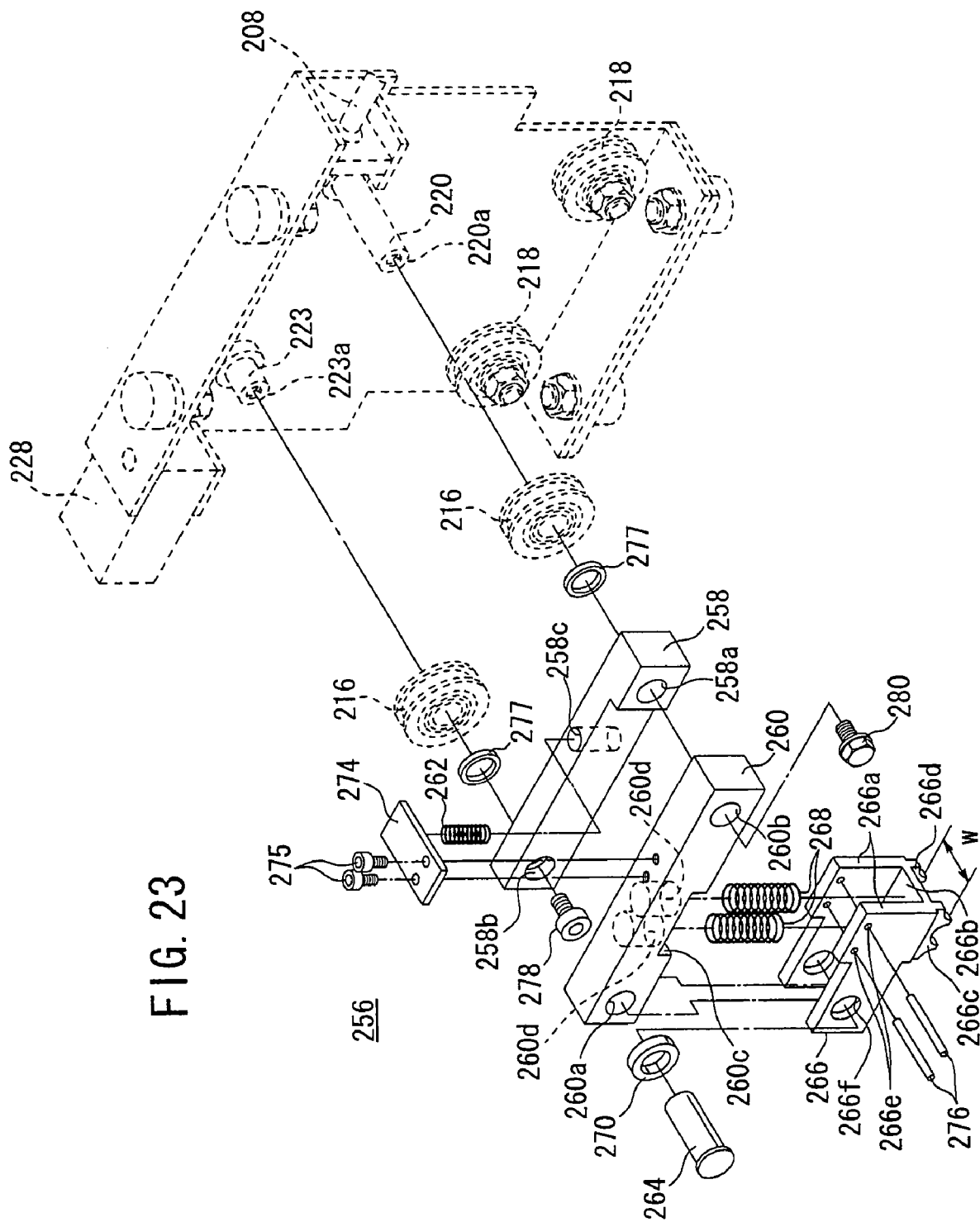
FIG. 23 is an exploded perspective view of a drive power transmitter of the fourth conveyance carriage.
Figure 24:
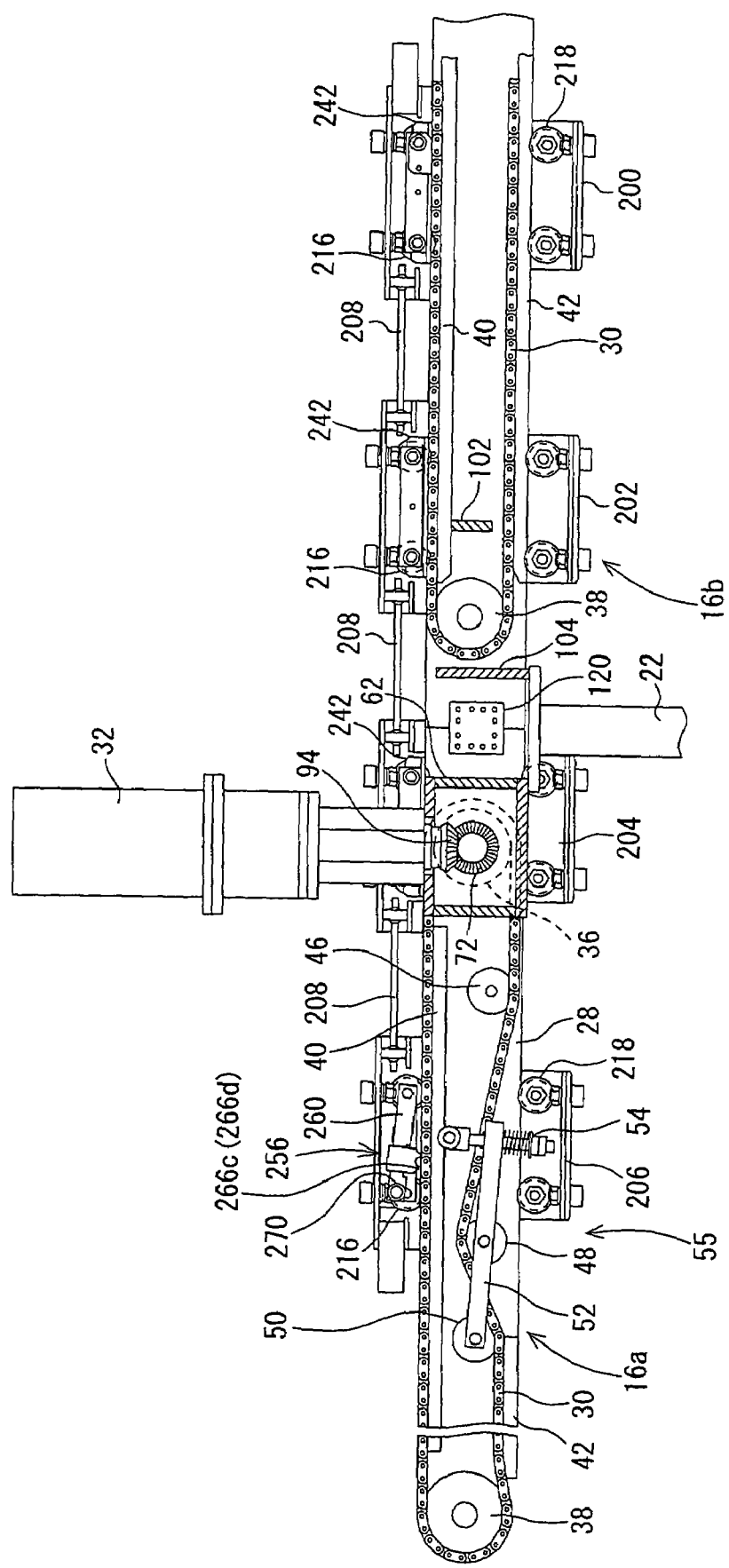
FIG. 24 is a sectional side elevational view of a junction between two horizontal conveyance units as viewed from the central line of the conveyance system.

As shown in FIG. 23, the drive power transmitter 226 has a horizontally elongate plate 258 including a slightly thick front portion, a swing plate 260 disposed inwardly of the horizontally elongate plate 258 (toward the viewer of FIG. 23) and rotatably supported on the front shaft 220, a spring 262 for pressing the swing plate 260 upwardly with respect to the horizontally elongate plate 258, a shaft 264 fitted in a hole 260a defined in a rear portion of the swing plate 260, a small frame 266 rotatably supported, together with the swing plate 260, on the shaft 264, two springs (resilient members) 268 for pressing the small frame 266 with respect to the swing plate 260, and a roller (force-bearing member) 270 for being pressed downwardly by the cam plate 56 or 180 (see FIG. 1).

The horizontally elongate plate 258 has a hole 258a defined therein with the front shaft 220 being fitted therein, and a hole 258b defined therein with a rear shaft 223 on the base plate 210 being fitted therein. The rear shaft 223 is disposed in a position corresponding to the rear shaft 222 (see FIG. 19) of the first conveyance carriage 200, and is shorter than the rear shaft 222. The hole 258b has an inner portion having a slightly larger diameter and an outer portion having a slightly smaller diameter, with a radial step therebetween. The horizontally elongate plate 258 has a bottomed hole 258c defined substantially centrally in an upper surface thereof. The hole 258c has a diameter slightly larger than the diameter of the spring 262 and a depth smaller than the length of the spring 262 in its free state.

The swing plate 260 has a hole 260b defined in a relatively front portion thereof with the front shaft 220 being fitted therein, and a hole 260a defined in a relatively rear portion thereof with the shaft 264 being fitted therein. The swing plate 260 also has a recess 260c defined in a lower surface thereof slightly forward of the hole 260a, the recess 260c extending transversely across the swing plate 260. Two holes 260d each having a ceiling surface are defined in a lower surface of the recess 260c. Springs 268 are inserted respectively in the two holes 260d. The two holes 260d have respective diameters slightly larger than the diameters of the springs 268 and respective depths smaller than the lengths of the springs 268 in their free state. A small plate 274 extending in the direction of the horizontally elongate plate 258 is mounted substantially centrally on an upper surface of the swing plate 260 by two screws 275.

The small frame 266 has two side plates 266a having upwardly elongate front portions forward of the center thereof in the full lengths thereof, a bottom plate 266b joining substantially front half portions of the two side plates 266a on their lower edges, a lateral-tooth sprocket (driven sprocket) 266c disposed on an inner side (facing the viewer of FIG. 23) of the lower surface of the bottom plate 266b, and a lateral-tooth sprocket (driven sprocket) 266d disposed on an outer side of the lower surface of the bottom plate 266b. The two side plates 266a lie parallel to each other. The lateral-tooth sprockets 266c, 266d lie parallel to each other. The center-to-center distance between the lateral-tool sprocket 266c and the lateral-tool sprocket 266d is set to a width w, which is the same as the width w (see FIG. 11) by which the annular chain 30 and the annular chain 162 are transversely spaced from each other. The lateral-tool sprocket 266d is of a shape for mesh with the annular chain 30, and the lateral-tool sprocket 266c is of a shape for mesh with the annular chain 162.

Each of the two side plates 266a has two small holes 266e defined in the upwardly elongate front portion thereof forward of the center of the side plate 266a, with two fixing pins 276 being press-fitted in the small holes 266e. The fixing pins 276 are press-fitted in the small holes 266e while the swing plate 260 and the small frame 266 are being combined with each other, and extend over the upper surface of the swing plate 260 to join the two side plates 266a to each other.

For assembling the drive power transmitter 256, the upper rollers 216 and spacers 277 are fitted over the front shaft 220 and the rear shaft 223, after which the holes 258a, 258b in the horizontally elongate plate 258 are fitted over the front shaft 220 and the rear shaft 223. A bolt 278 is threaded into a threaded hole 223a defined in the distal end of the rear shaft 223 and fixed in place. The bolt 278 has a head housed in the portion having the relatively large diameter of the hole 258b, and hence the head of the bolt 278 does not protrude from a side surface of the horizontally elongate plate 258. The bolt 278 may comprise a bolt with a hexagon socket head.

Then, after the springs 268 are inserted respectively into the two holes 260d in the swing plate 260, the bottom plate 266b of the small frame 266 is fitted in the recess 260c. At this time, since the lower surfaces of the springs 268 are held against the upper surface of the bottom plate 266b of the small frame 266, the small frame 266 is fitted over the swing plate 260 while compressing the springs 268. After the small frame 266 is fitted over the swing plate 260, the fixing pins 276 are inserted and pressed into the small holes 266e while keeping the springs 268 compressed. The fixing pins 276 extend over the upper surface of the swing plate 260 and join the two side plates 266a.

While the springs 268 are being compressed, the hole 260a in the swing plate 260 and the holes 266f in the small frame 266 are aligned with each other, and the shaft 264 is fitted into the aligned holes 260a, 266f. At this time, the roller 270 has been fitted over the shaft 264 and disposed inwardly of the small frame 266.

When the force applied to fit the small frame 266 over the swing plate 260 is removed, the small frame 266 is lowered with respect to the swing plate 260 under the resiliency of the springs 268, and is angularly moved about the shaft 264 to a position wherein the fixing pins 276 abut against the upper surface of the swing plate 260.

Then, the small plate 274 is fastened to the upper surface of the swing plate 260 by the screws 275, and the spring 262 is inserted into the hole 258c in the horizontally elongate plate 258, after which the front shaft 220 is inserted into the hole 260b in the swing plate 260. Because the lower surface of the small plate 274 is resiliently supported by the spring 262, the horizontally elongate plate 258 and the swing plate 260 lie out of parallel to each other, and the swing plate 260 is slightly inclined upwardly toward the rear end thereof.

Then, a bolt 280 is threaded into the threaded hole 220a defined in the distal end of the front shaft 220 and fixed in position.

The drive power transmitter 256 is assembled in the manner described above, and fixedly mounted on the front shaft 220 and the rear shaft 222 that extend from the base plate 210.

With the joint conveyance carriage assembly 12 being mounted on the conveyance assembly 14, when the joint conveyance carriage assembly 12 is conveyed horizontally, the joint conveyance carriage assembly 12 does not contact the annular chain 30 and hence does not receive drive power therefrom. That is, as described later, if the roller 270 is not pressed by the cam plate 56 or 180, the fourth conveyance carriage 206 having the drive power transmitter 256 is not propelled by itself, but is pulled by the third conveyance carriage 204 through the joint bar 208.

The mounting/removing mechanism 214 of the first through fourth conveyance carriages 200, 202, 204, 206 will be described below with reference to FIGS. 16 and 25 through 31.

Figure 25:
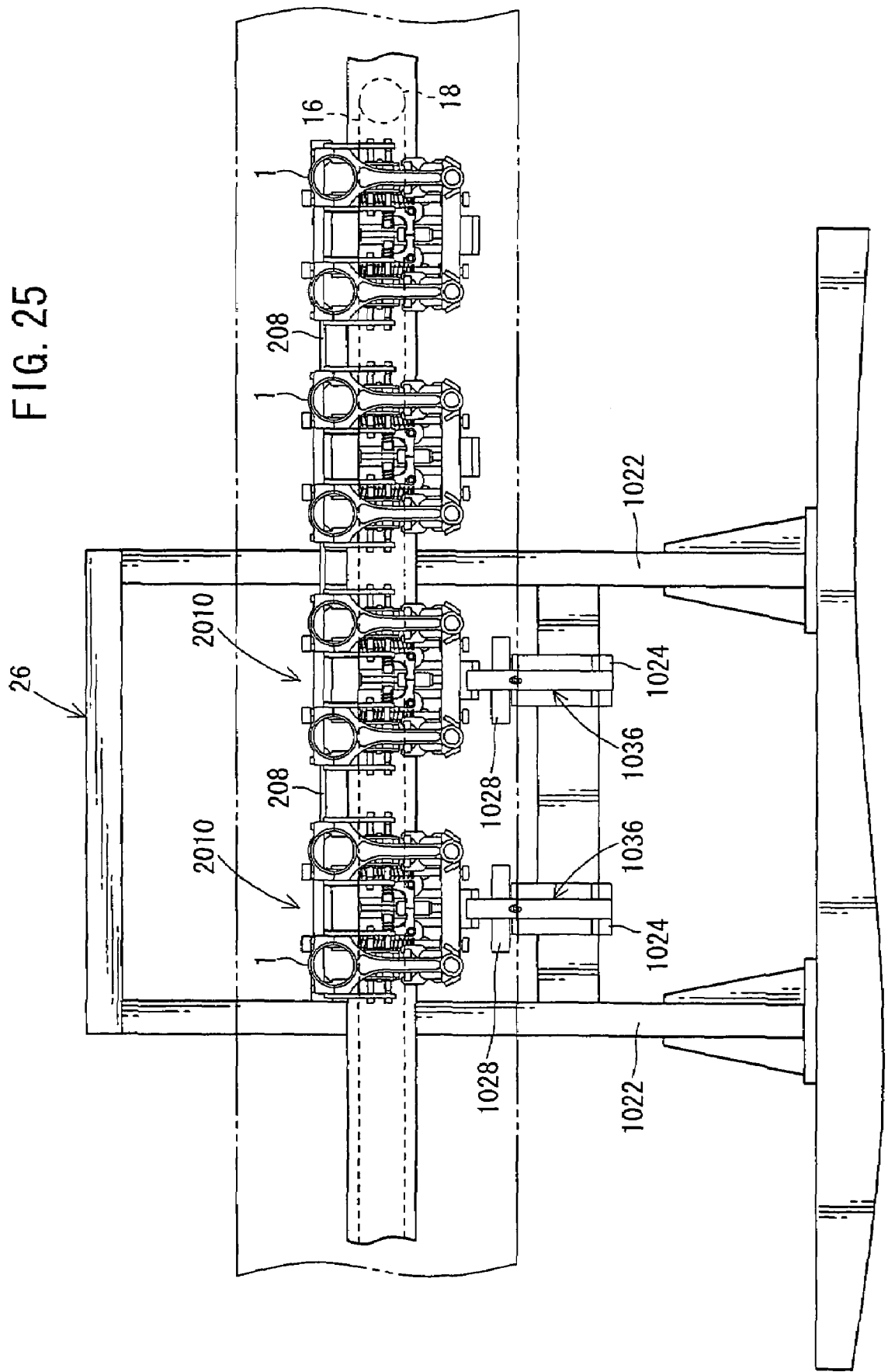
FIG. 25 is a fragmentary view of a conveyance line for transporting a joint conveyance carriage assembly.

In FIG. 25, air cylinders 1024, 1024 are disposed between support posts 1022 in the station 26. Each of the air cylinders 1024 is actuated when a workpiece to be machined is loaded on the joint conveyance carriage assembly 12.

As shown in FIG. 16, the air cylinder 1024 has a rod 1026 including a larger-diameter portion 1028 on its upper end. The larger-diameter portion 1028 has a slanted surface 1030, which is inclined diametrically inwardly thereof in the downward direction. The air cylinder 1024 has a cylinder tube with a protrusion projecting from an upper end surface thereof.

The air cylinder 1024 is combined with a first lock mechanism 1036. The first lock mechanism 1036 has a hook 1038 having a projecting upper end, and a bearing roller 1040 for rolling movement along the slanted surface 1030 of the larger-diameter portion 1028 of the rod 1026.

The hook 1038 has a through hole therein, which a bolt 1042 is inserted therethrough. The bolt 1042 is threaded into a threaded hole in the protrusion. The bolt 1042 has a shank extending through a spring 1044 having an end seated on the hook 1038 and the other end abutting against the lower end face of the head of the bolt 1042.

The bearing roller 1040 is rotatably supported on a support member 1046 mounted on the hook 1038. As described later, as the bearing roller 1040 slides along the slanted surface 1030, the hook 1038 is tilted by the action of the spring 1044.

As described above, the first conveyance carriage 200 (see FIG. 16) has the main body 1056 made up of the under plate 1052 and the upper plate 1054 that are joined to the base plate 210. The base plate 210 has the main portion 1058, and the lower horizontal portion 1060 and the upper horizontal portion 1062 which are bent substantially perpendicularly from the main portion 1058.

As shown in FIG. 16, an engaging member 1074 having a substantially L-shaped cross section has a horizontal engaging finger 1082 extending toward the projecting upper end of the hook 1038 and a wall 1084 extending vertically from the horizontal engaging finger 1082. The engaging member 1074 is fixed to the lower tongue 1064 of the under plate 1052 by a bolt (not shown) extending through the lower tongue 1064 and threaded into the wall 1084. A first pocket 1076a and a second pocket 1076b are formed by four sharp-angled plates having sharp lower ends, the sharp-angled plates being obliquely mounted on the lower tongue 1064.

First rods 1086 extend through the horizontal portion 1066 of the under plate 1052. The first rods 1086 have upper ends extending through the bottom portion 1070 of the upper plate 1054. The first rods 1086 have larger-diameter portions 1088 on their shanks and recesses 1090 defined in the portions of the shanks below the larger-diameter portions 1088.

The portions of the shanks above the larger-diameter portions 1088 are surrounded by springs 1092. The springs 1092 are held between the larger-diameter portion 1088 and the lower end face of the bottom portion 1070, and normally bias the larger-diameter portions 1088 in a direction away from the bottom portion 1070. Therefore, the first rods 1086 are normally pressed downwardly in FIGS. 16, 26, and 27.

A first clamp mechanism 1078a has a base plate 1094 coupled to the horizontal portion 1066 of the under plate 1052. Two clamps 1096a, 1096b are angularly movably supported on the base plate 1094. An arm 1098 has an end coupled to the outer clamp 1096a and an opposite spherical end housed in the recess 1090 in each of the first rods 1086. The clamps 1096a, 1096b are claw-shaped.

The clamps 1096a, 1096b have respective proximal ends having toothed portions (not shown) held in mesh with each other. When one of the toothed portions is turned clockwise, the other toothed portion is turned counterclockwise.

A second rod 1100 extends substantially centrally from the horizontal portion 1066 of the under plate 1052 to the bottom portion 1070 of the upper plate 1054. The second rod 1100 has a larger-diameter portion 1102 on its shank, and the larger-diameter portion 1102 has a recess 1104 defined therein.

The first rods 1086 and the second rod 1100 have respective lower ends positioned above the larger-diameter portion 1028 on the upper end of the rod 1026.

Figure 28:
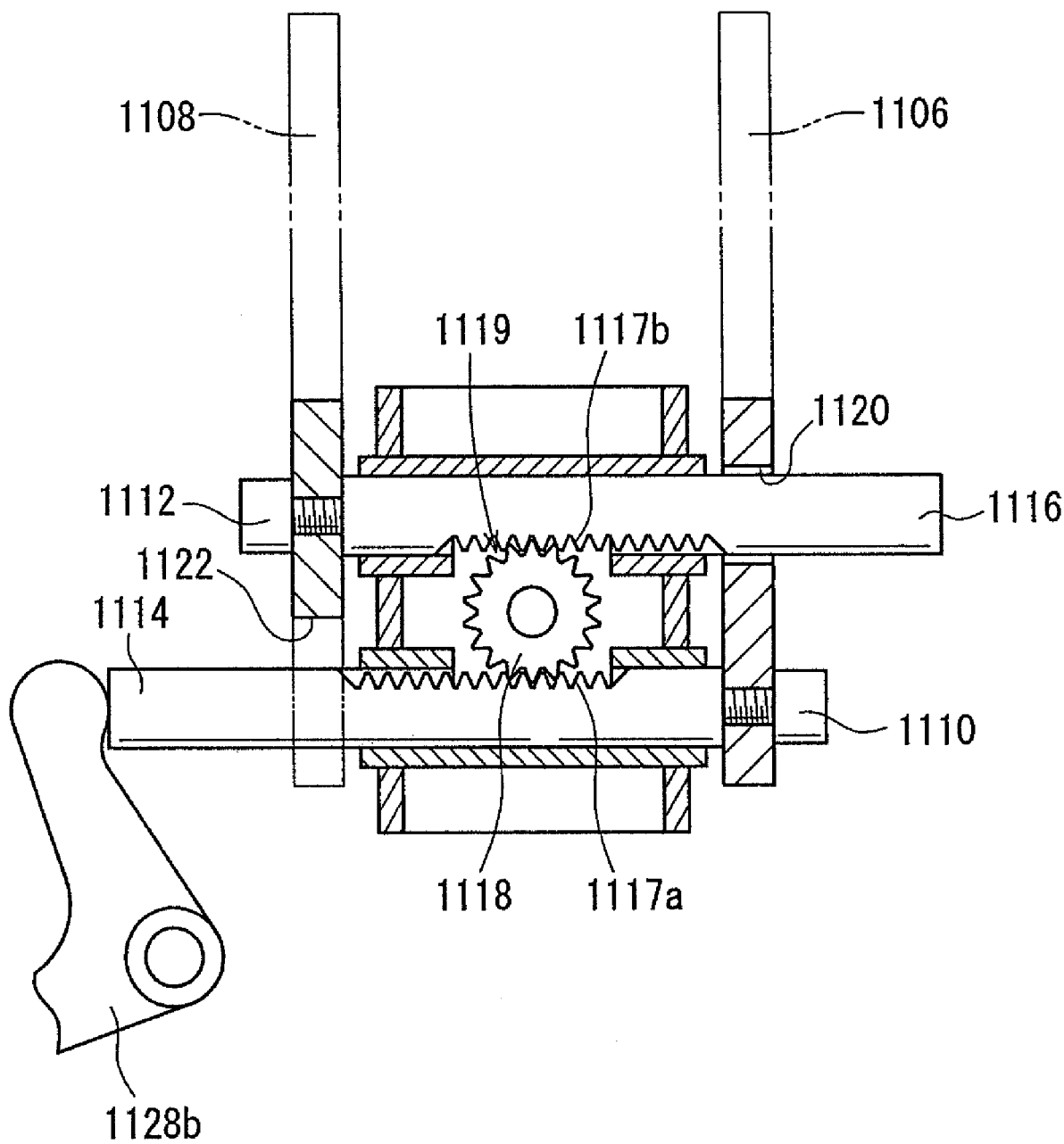
FIG. 28 is an enlarged view, partly cut away, of a first conveyance carriage 200, showing a rack-and-pinion mechanism of each of the holding mechanisms
Figure 29:
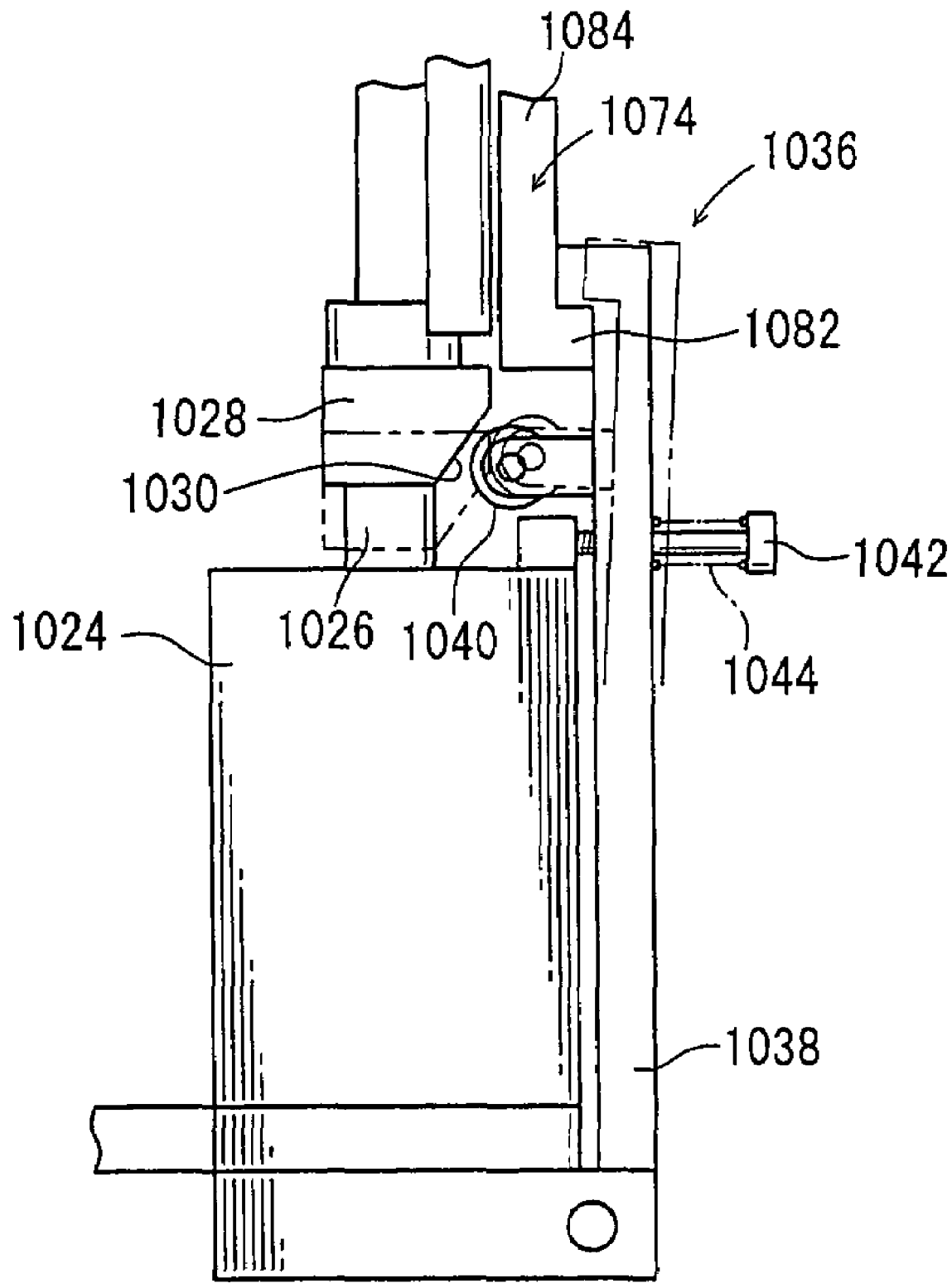
FIG. 29 is an enlarged side elevational view showing the manner in which a hook of a lock mechanism engages an engaging member.

A first holding mechanism 1080a has an outer movable plate 1106 and an inner movable plate 1108. Presser rods 1114, 1116 are fixed respectively to the outer movable plate 1106 and the inner movable plate 1108 by respective bolts 1110, 1112. As shown in FIG. 28, the presser rods 1114, 1116 have respective teeth 1117a, 1117b that are held in mesh with a pinion 1118. The presser rods 1114, 1116 are operatively coupled to each other by a rack-and-pinion mechanism 1119 and operate in an interlinked fashion due to the rack-and-pinion mechanism 1119, causing the outer movable plate 1106 and the inner movable plate 1108 to move toward or away from each other.

Figure 26:
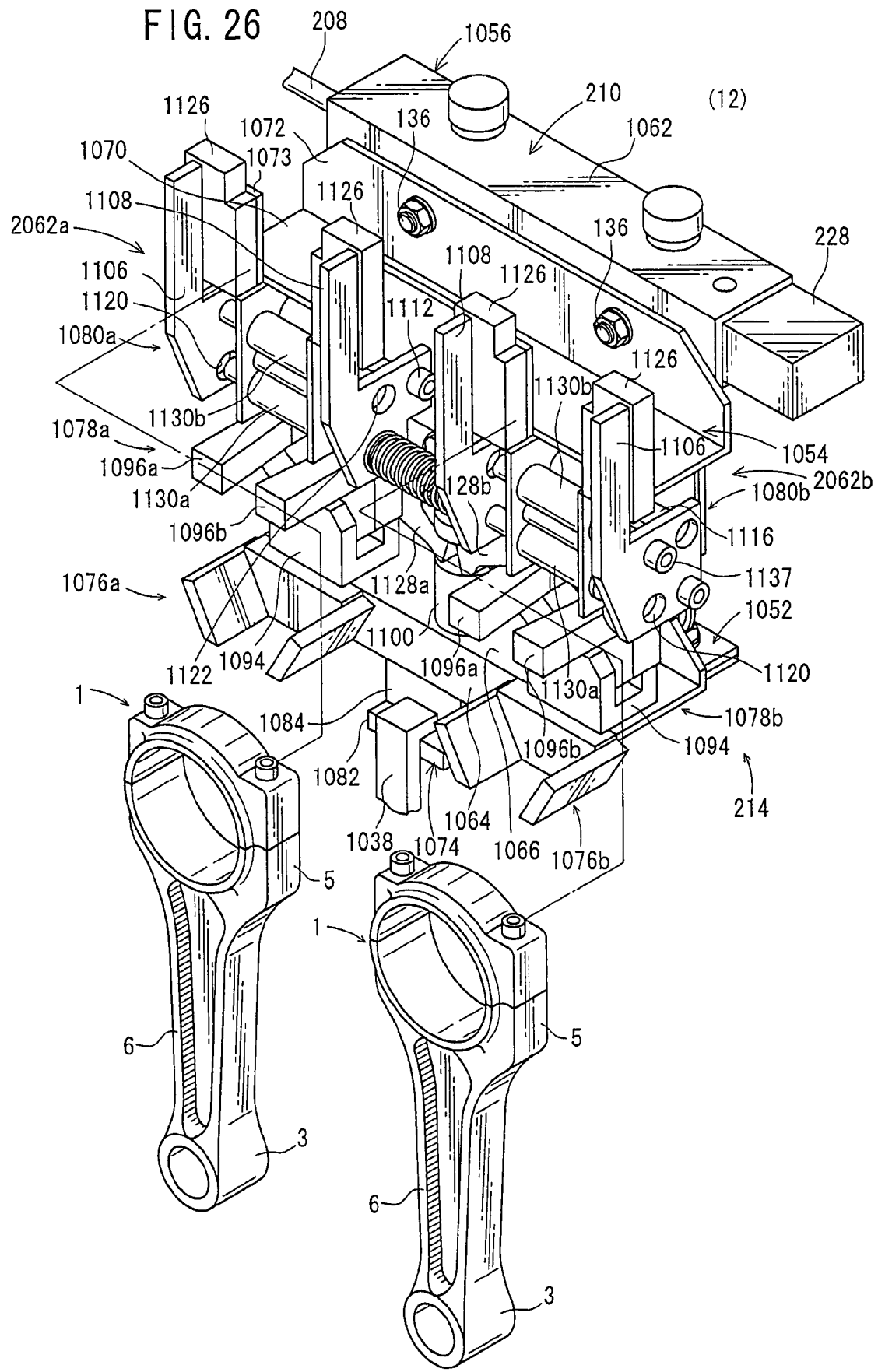
FIG. 26 is a perspective view of retaining mechanisms of the joint conveyance carriage assembly.

The outer movable plate 1106 and the inner movable plate 1108 have through holes 1120, 1122 defined respectively therein (see FIG. 26). When the outer movable plate 1106 and the inner movable plate 1108 are positioned most closely to each other, the presser rod 1114 projects from the through hole 1122 in the inner movable plate 1108, and the presser rod 1116 projects from the through hole 1120 in the outer movable plate 1106.

The inner movable plate 1108 has a recess defined therein. Second end positioning members 1126 for abutting against and positioning the second end 5 of the connecting rod 1 are mounted on the front vertical end portion 1073 of the upper plate 1054 of the main body 1056.

A second clamp mechanism 1078*b* is identical in structure to the first clamp mechanism 1078*a*. A second holding mechanism 1080*b* is identical in structure to the first holding mechanism 1080*a*. Those parts of the second clamp mechanism 1078*b* which are identical to those of the first clamp mechanism 1078*a* are denoted by identical reference characters, and will not be described in detail below.

The recess 1104 in the second rod 1100 houses therein ends of a first L-shaped arm 1128*a* and a second L-shaped arm 1128*b*. The first L-shaped arm 1128*a* and the second L-shaped arm 1128*b* have respective bent corners angularly movably supported by respective pins 1129*a*, 1129*b*. Therefore, the first L-shaped arm 1128*a* and the second L-shaped arm 1128*b* are angularly movable about their bent corners.

The other end of the first L-shaped arm 1128*a* is held against the inner end of the presser rod 1114 of the first holding mechanism 1080*a*, and the other end of the second L-shaped arm 1128*b* is held against the inner end of the presser rod 1114 of the second holding mechanism 1080*b*.

Figure 27:
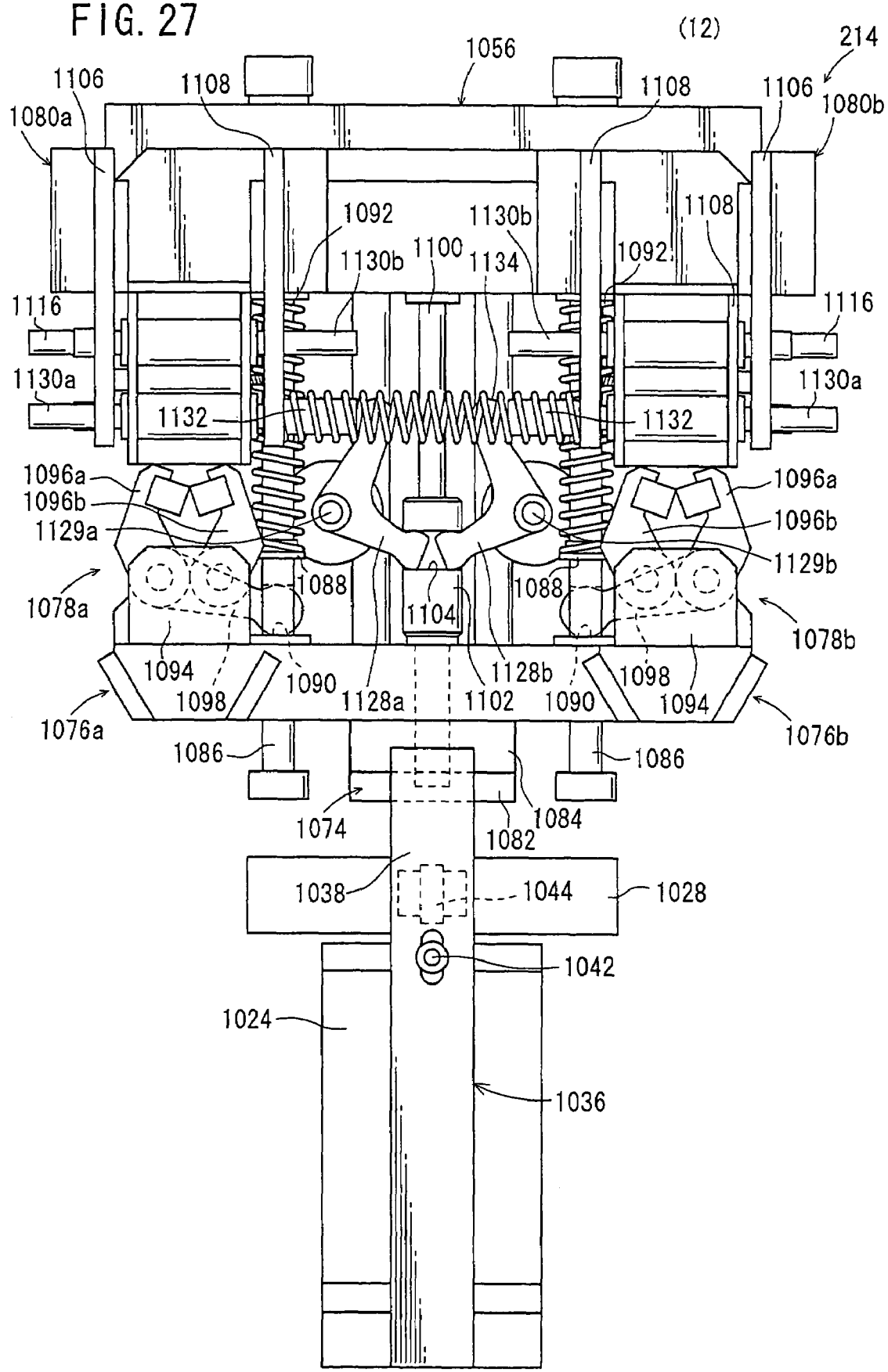
FIG. 27 is a front elevational view of the retaining mechanisms of the joint conveyance carriage assembly.

As shown in FIGS. 26 and 27, guide bars 1130*a* that are fixed to the respective inner movable plates 1108, 1108 by pins (not shown) extend through the outer movable plates 1106, 1106. Covers 1132, 1132 are fitted over the heads of the pins that project from the inner movable plates 1108, 1108. The covers 1132, 1132 are housed in a spring 1134. The ends of the spring 1134 are held against the respective inner movable plates 1108, 1108. Guide bars 1130*b* that are fixed to the respective outer movable plates 1106, 1106 by pins 1137 (see FIG. 26) extend through the inner movable plates 1108, 1108.

The stopping mechanism 2010 for stopping the joint conveyance carriage assembly 12 in the station 26 will be described below with reference to FIGS. 32 through 37.

Figure 32:
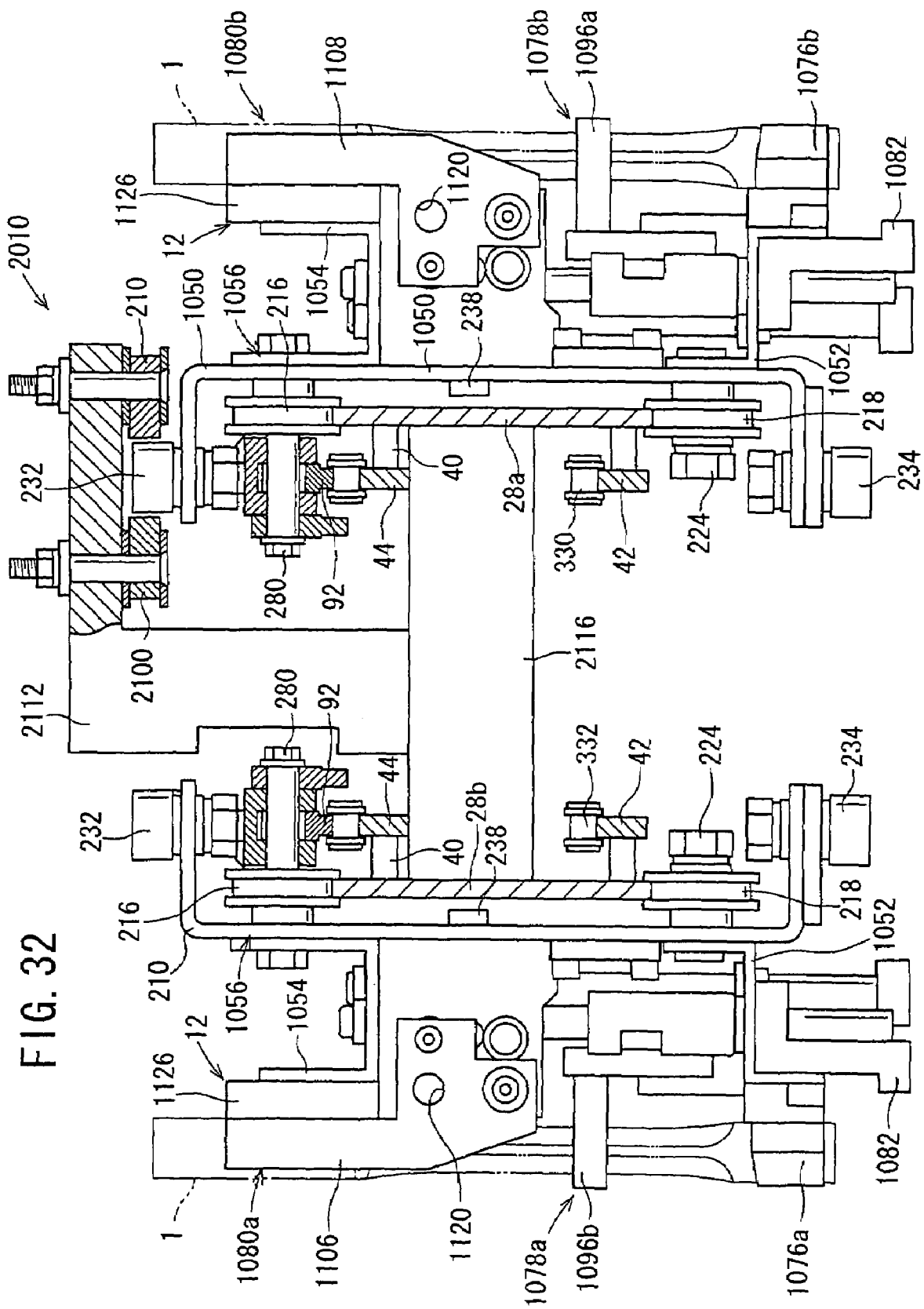
FIG. 32 is a cross-sectional view taken along line XXXII-XXXII of FIG. 2.
Figure 33:
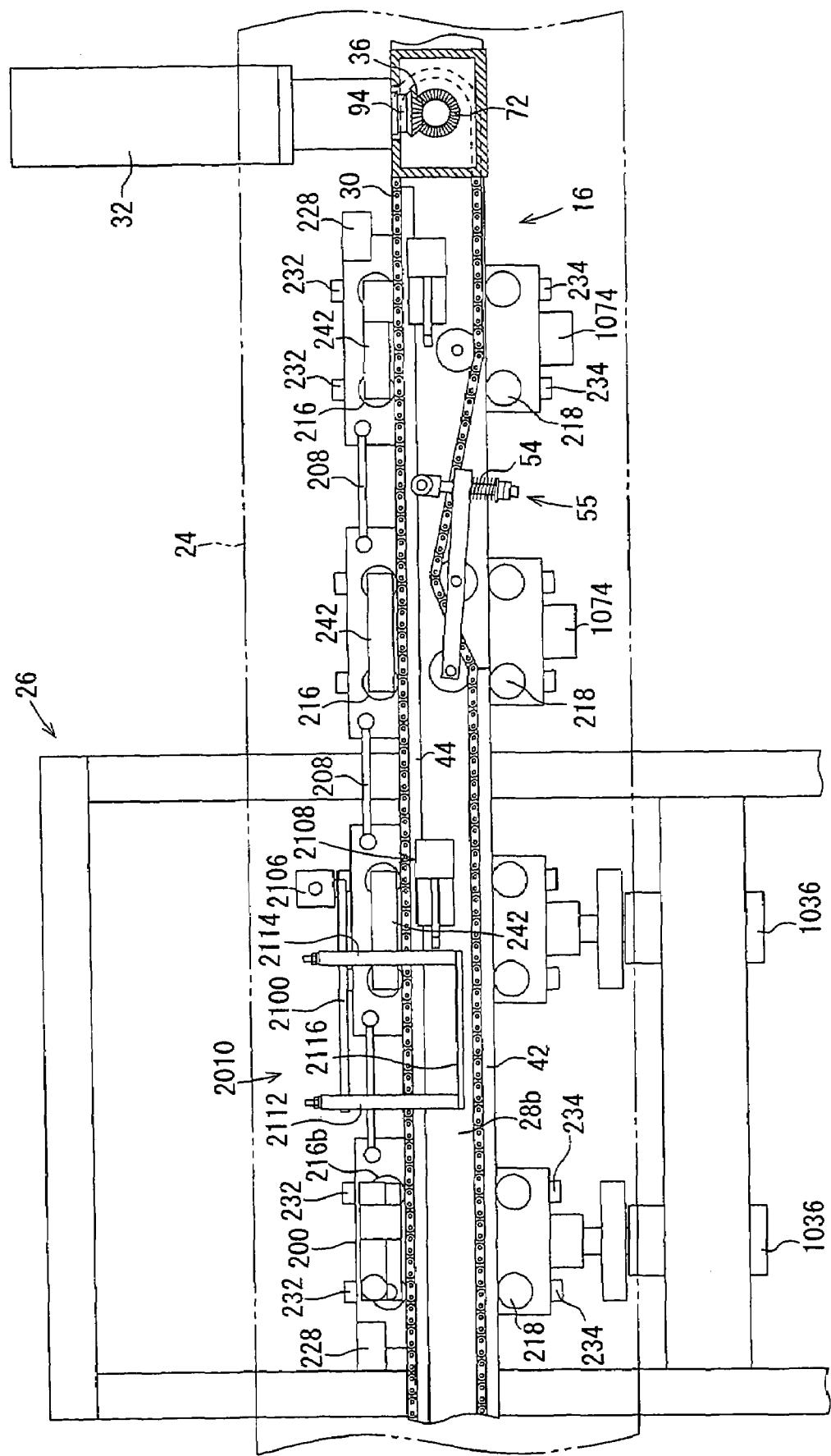
FIG. 33 is an enlarged view of a portion of the conveyance system shown in FIG. 1.
Figure 34:
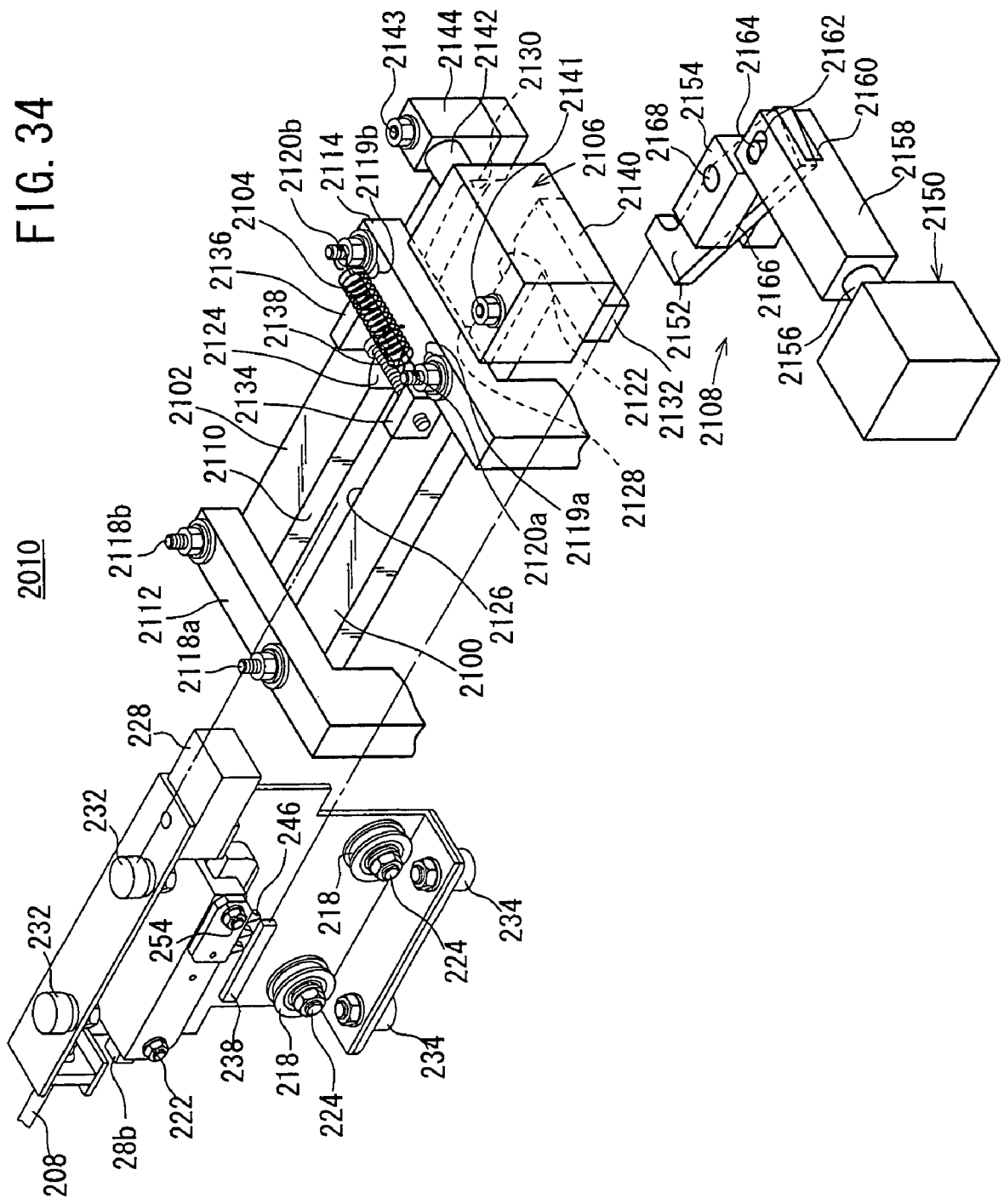
FIG. 34 is a perspective view of a stopping mechanism of the joint conveyance carriage assembly.

As shown in FIGS. 32 through 34, the stopping mechanism 2010 has, in addition to the upper rollers 232 on the joint conveyance carriage assembly 12, first and second arms 2100, 2102, a spring 2104 as a resilient member, an air cylinder 2106 as a displacing mechanism, and a second lock mechanism 2108. The first and second arms 2100, 2102 are spaced a predetermined distance from each other to define an entry path 2110 between the first and second arms 2100, 2102 for the upper rollers 232 to enter. The stopper 238 on the first conveyance carriage 200 serves as the second lock mechanism 2108. The second lock mechanism 2108 is different in structure from the first lock mechanism 1036 (see FIG. 30).

The structural details of the stopping mechanism 2010 on the return path will be described below. For the sake of convenience, the rails 28 on the forward and return paths will be referred to as a rail 28*a* and a rail 28*b*, respectively.

The first arm 2100 and the second arm 2102 are mounted on horizontal portions of a first support plate 2112 and a second support plate 2114 which are coupled to the forward-path rail 28*a* and the return-path rail 28*b*. The support plates 2112, 2114 are disposed on an intermediate plate 2116 extending from the forward-path rail 28*a* to the return-path rail 28*b*.

Specifically, the first arm 2100 and the second arm 2102 have ends supported on the horizontal portion of the first support plate 2112 by respective bolts 2118*a*, 2118*b* (see FIG. 34). The horizontal portion of the second support plate 2114 has oblong holes 2119*a*, 2119*b* defined therein, and bolts 2120*a*, 2120*b* that extend respectively through the oblong holes 2119*a*, 2119*b* are threaded into respective shanks of the first arm 2100 and the second arm 2102.

Figure 35:
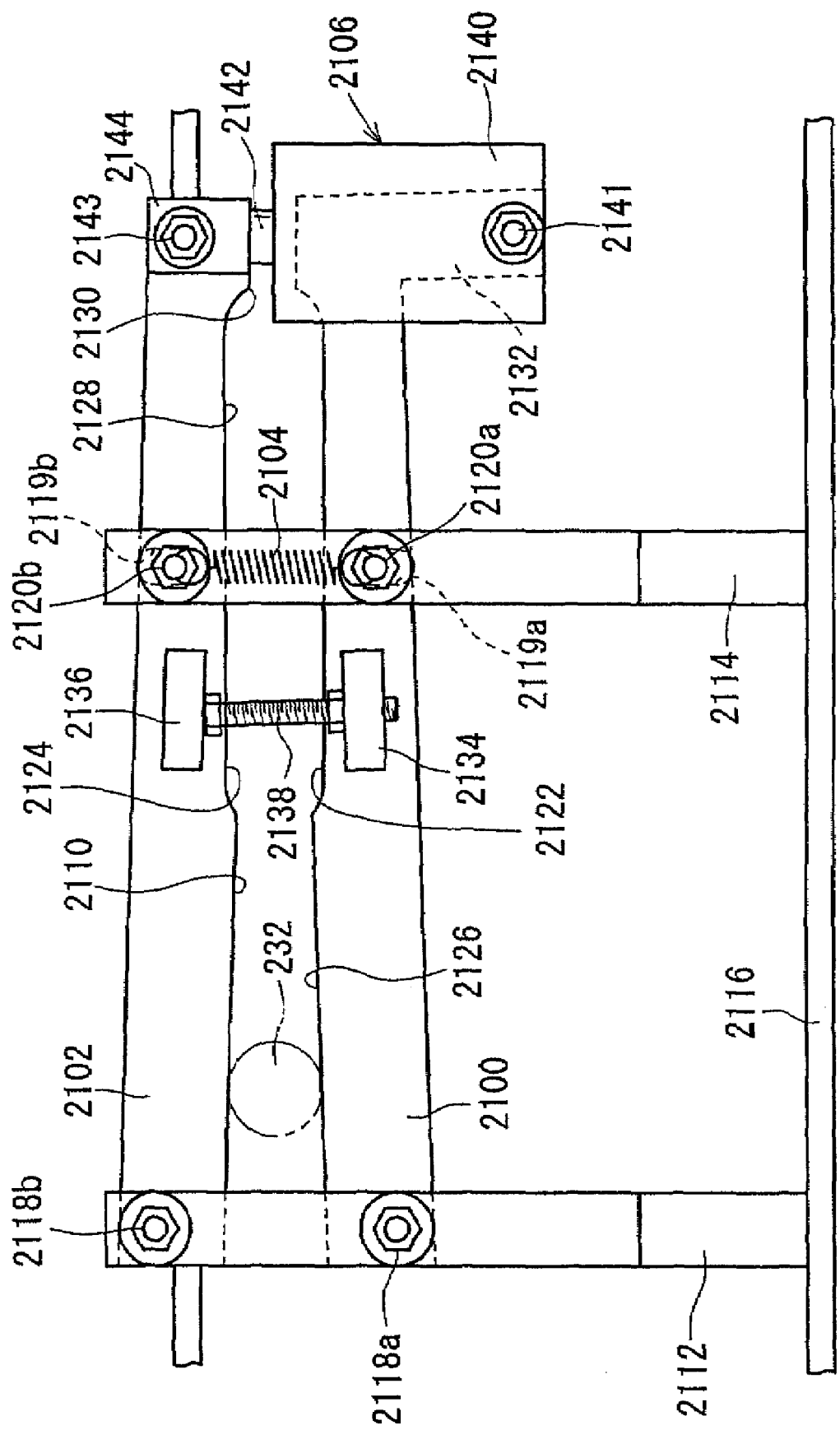
FIG. 35 is a plan view of the stopping mechanism shown in FIG. 34.

As shown in FIG. 35, the shank of the first arm 2100 has a recess 2122 defined in a surface thereof facing the second arm 2102, and, similarly, the shank of the second arm 2102 has a recess 2124 defined in a surface thereof facing the first arm 2101. The first arm 2100 and the second arm 2102 have respective distal ends spaced from each other by a distance which is smaller than the diameter of the upper rollers 232.

With the first arm 2100 and the second arm 2102 being thus arranged, the entry path 2110 includes a narrower portion 2126 where the upper rollers 232 start entering the entry path 2110 and a wider portion 2128 that is wider than the narrower portion 2126, and the distal ends of the first arm 2100 and the second arm 2102 have supports 2130 for supporting the upper rollers 232. The distal end of the first arm 2100 has a tongue 2132 directed away from the second arm 2102.

When the first arm 2100 and the second arm 2102 are positioned mostly closely to each other, the width of the narrower portion 2126 is progressively smaller in the direction of travel of the upper rollers 232. The width of the narrower portion 2126 is smaller than the diameter of the upper rollers 232 at a substantially central region of the narrower portion 2126. The width of the wider portion 2128 is substantially the same as the diameter of the upper rollers 232.

A first stopper columnar member 2134 and a second stopper columnar member 2136 are joined to respective regions of the shanks of the first arm 2100 and the second arm 2102 which are positioned between the first support plate 2112 and the second support plate 2114. The first stopper columnar member 2134 has a bolt hole defined therein with a stopper bolt 2138 threaded therein.

The opposite ends of the spring 2104 are engaged by the respective bolts 2120*a*, 2120*b*. The first arm 2100 and the second arm 2102 are normally biased in the direction in which the spring 2104, is contracted, i.e., normally biased to torn toward each other about the bolts 2118*a*, 2118*b*. The distance by which the first stopper columnar member 2134 and the second stopper columnar member 2136, i.e., the width of the entry path 2110, is maintained by the stopper bolt 2138 whose head has its tip end face held against the second stopper columnar member 2136.

The air cylinder 2106 has a cylinder tube 2140 positioned on and fixed to the tongue 2132 by a bolt 2141. The air cylinder 2106 has a piston rod 2142 having a distal end held against a side surface of a piston rod bearing member 2144 that is positioned on and fixed to the distal end of the second arm 2102 by a bolt 2143.

The second lock mechanism 2108 has, in addition to the stopper 238 (see FIG. 34) on the joint conveyance carriage assembly 12, a cylinder 2150 (see FIG. 34) mounted on the rail 28*a* (see FIG. 32), a hook 2152, and a hook support member 2154 supporting the hook 2152. The cylinder 2150 has a piston rod 2156 connected to a columnar member 2158 in the form of a quadrangular prism having a groove 2160 defined in the distal end thereof. The columnar member 2158 also has an oblong hole 2162 defined therein which communicates with the groove 2160.

The hook 2152 that is inserted in the groove 2160 has an end coupled to the columnar member 2158 by a shaft 2164 inserted in the oblong hole 2162. The hook 2152 has a shank inserted in a groove 2166 that is defined in a longitudinal wall of the hook support member 2154, and coupled to the hook support member 2154 by a joint shaft 2168.

The hook 2152 is tilted as the piston rod 2156 is projected or retracted, and is engaged by the stopper 238 on the first conveyance carriage 200.

Operation of the various parts of the conveyance system 10 thus constructed will be described below. First, a process in which the joint conveyance carriage assembly 12 is transferred from the horizontal conveyance unit 16a to the horizontal conveyance unit 16b will be described below with reference to FIG. 24.

The motor 32 of the horizontal conveyance unit 16 and the motor 164 of the gradient conveyance unit 18 are energized to rotate at a predetermined speed, circulatively driving the annular chain 30. As viewed from the central line C (see FIG. 2), the annular chain 30 and the annular chain 162 are circulatively driven clockwise.

When the joint conveyance carriage assembly 12 is present in the horizontal conveyance unit 16a, the lower surfaces of the chain presser plates 242 of the first through third conveyance carriages 200, 202, 204 of the joint conveyance carriage assembly 12 press the chain rollers 30a under the resiliency of the springs 244 (see FIG. 16). As the chain rollers 30a of the annular chain 30 roll on the upper surface of the horizontal upper guide 40, the chain presser plates 242 move horizontally on the principles of a roller. As a result, the first through third conveyance carriages 200, 202, 204 are conveyed in the direction indicated by the arrow B, pulling the fourth conveyance carriage 206 coupled to the third conveyance carriage 204 through the joint bar 208.

At this time, since the chain presser plates 242 are sufficiently longer than the pitch of the annular chain 30, i.e., the distance between adjacent ones of the chain rollers 30a, the lower surfaces of the chain presser plates 242 are held against a plurality of chain rollers 30a at all times, and do not liable to produce vibrations in synchronism with the chain rollers 30a. Because the leading ends in the conveyance direction of the lower surfaces of the chain presser plates 242 are arcuate, the chain rollers 30a are smoothly introduced into the gap between the chain presser plates 242 and the horizontal upper guide 40.

Then, the leading end of the joint conveyance carriage assembly 12, i.e., the first conveyance carriage 200, is conveyed to the end of the horizontal conveyance unit 16a where the first conveyance carriage 200 is released from the annular chain 30. At this time, since the chain presser plates 242 of the second conveyance carriage 202 and the third conveyance carriage 204 are held in contact with the annular chain 30, the joint conveyance carriage assembly 12 is continuously conveyed.

The first conveyance carriage 200 continues to be conveyed along the rails 28, and is transferred from the horizontal conveyance unit 16a to the horizontal conveyance unit 16b. At this time, as the junction between the rails 28 of the horizontal conveyance units 16a, 16b has a continuous upper surface free of steps and gaps, the first conveyance carriage 200 can smoothly pass over the joint, and the speed of the joint conveyance carriage assembly 12 does not drop.

Then, the second conveyance carriage 202 is transferred from the horizontal conveyance unit 16a to the horizontal conveyance unit 16b. At this time, the final fourth conveyance carriage 206 which has the chain presser plate 242 reaches the end of the horizontal conveyance unit 16a, and is released from the annular chain 30. Though no force is supplied from the horizontal conveyance unit 16a to the third conveyance carriage 204, since the chain presser plates 242 of the first conveyance carriage 200 and the second conveyance carriage 202 are held in contact with the annular chain 30 of the horizontal conveyance unit 16b, the joint conveyance carriage assembly 12 is continuously conveyed.

Thereafter, the third conveyance carriage 204 and the fourth conveyance carriage 206 are transferred to the horizontal conveyance unit 16b, whereupon the joint conveyance carriage assembly 12 is conveyed on the horizontal conveyance unit 16b.

The process of conveying the joint conveyance carriage assembly 12 in the direction indicated by the arrow B has been described above. The joint conveyance carriage assembly 12 is similarly conveyed in the direction indicated by the arrow A (see FIG. 2). Specifically, if the joint conveyance carriage assembly 12 is directed inversely and the annular chain 30 is rotated inversely in FIG. 24, then it can be understood that the joint conveyance carriage assembly 12 is conveyed smoothly in the direction indicated by the arrow A, as when it is conveyed in the direction indicated by the arrow B.

When the joint conveyance carriage assembly 12 is transferred from the horizontal conveyance unit 16a to the horizontal conveyance unit 16b, no workpieces need to be mounted on and removed from.

A process in which the joint conveyance carriage assembly 12 passes through the gradient conveyance unit 18 disposed between the two horizontal conveyance units 16 will be described below with reference to FIG. 3.

When the leading end of the joint conveyance carnage assembly 12, i.e., the first conveyance carriage 200, approaches the gradient conveyance unit 18, the roller 270 of the fourth conveyance carriage 206 abuts against the slanted surface 56a as the lower surface on the end of the cam plate 56. As the joint conveyance carriage assembly 12 is conveyed, the roller 270 is pressed downwardly along the slanted surface 56a, and reaches the parallel surface 56b where the roller 270 remains pressed downwardly by a constant depth (see FIG. 3).

When the roller 270 is subjected to the pressing force from the cam plate 56, the roller 270 compresses the spring 262 of the drive power transmitter 256 (see FIG. 23), angularly moving and lowering the swing plate 260 about the front shaft 220.

When the swing plate 260 is lowered, the small frame 266 is also lowered to bring the lateral-tooth sprocket 266d on the lower surface of the small frame 266 into mesh with the annular chain 30.

At this time, the teeth of the lateral-tooth sprocket 266d and the teeth of the annular chain 30 may not necessarily be in phase with each other. If the teeth of the lateral-tooth sprocket 266d and the teeth of the annular chain 30 are out of phase with each other, then since the lateral-tooth sprocket 266d approaches the annular chain 30 substantially perpendicularly thereto, the crests of the teeth of the lateral-tooth sprocket 266d ride on the corresponding chain rollers 30a of the annular chain 30. Since the springs 268 are compressed, the teeth of the lateral-tooth sprocket 266d do not unduly press the chain rollers 30a, and hence the lateral-tooth sprocket 266d, the chain rollers 30a, and the cam plate 56 are prevented from being damaged.

Initially when the small frame 266 is lowered, if the teeth of the lateral-tooth sprocket 266d and the teeth of the annular chain 30 are out of phase with each other and the teeth of the lateral-tooth sprocket 266d ride on the corresponding chain rollers 30a of the annular chain 30, then as the joint conveyance carriage assembly 12 is subsequently conveyed, the teeth of the lateral-tooth sprocket 266d and the teeth of the annular chain 30 are naturally brought into phase with each other, and the lateral-tooth sprocket 266d are brought into mesh with the annular chain 30.

Then, the first conveyance carriage 200 moves across the drive sprocket 36, and the chain presser plate 242 of the first conveyance carriage 200 is released from the annular chain 30. The first conveyance carriage 200 receives no drive power, and is pushed out by the second conveyance carriage 202 through the joint bar 208 so as to be continuously conveyed. Thereafter, the second conveyance carriage 202 and the third conveyance carriage 204 are successively released from the annular chain 30, and are pushed out by the fourth conveyance carriage 206.

At this time, since the lateral-tooth sprocket 266d of the fourth conveyance carriage 206 stays in mesh with the annular chain 30, the fourth conveyance carriage 206 receives the drive power from the annular chain 30 and is conveyed, pushing out the first through third conveyance carriages 200, 202, 204.

The first through third conveyance carriages 200, 202, 204 start being lifted along the gradient inlet sections 160a. At this time, though the joint conveyance carriage assembly 12 moves against gravity, the joint conveyance carriage assembly 12 can reliably travel up the gradient inlet sections 160a because the lateral-tooth sprocket 266d of the fourth conveyance carriage 206 is held in mesh with the annular chain 30. Furthermore, inasmuch as the first through fourth conveyance carriages 200, 202, 204, 206 are interconnected by the vertically swingable joints 230, the joint conveyance carriage assembly 12 is smoothly conveyed along the gradient inlet sections 160a.

The first conveyance carriage 200 is transferred from the gradient inlet sections 160a to the constant gradient sections 160c. At this time, since the push-out portion 172a (see FIG. 3) of the driven sprocket 172 is positioned slightly below than the upper surfaces of the rails 160, the lateral-tooth sprocket 246 of the first conveyance carriage 200 obliquely approaches and meshes with the annular chain 162. As the lateral-tooth sprocket 246 obliquely approaches the annular chain 162, they are automatically brought into mesh with each other. Consequently, the lateral-tooth sprocket 246 and the annular chain 162 reliably mesh with each other.

As shown in FIG. 3, when the lateral-tooth sprocket 246 and the annular chain 162 reliably mesh with each other (or shortly after they mesh with each other), the roller 270 of the fourth conveyance carriage 206 moves across the end of the cam plate 56, and is released from the cam plate 56. The roller 270, the swing plate 260, and the small frame 266 are released from the pressing force from the cam plate 56 and return upwardly under the resiliency of the spring 262. The lateral-tooth sprocket 266d is now released from the annular chain 30.

After the lateral-tooth sprocket 266d is released from the annular chain 30, the lateral-tooth sprocket 266d is lifted by the annular chain 162. Therefore, the second through fourth conveyance carriages 202, 204, 206 are pulled by the first conveyance carriage 200.

At this time, because the joint conveyance carriage assembly 12 is reliably supported on the rails 160 by the upper rollers 216 and the lower rollers 218, the joint conveyance carriage assembly 12 can be conveyed even if the constant gradient sections 160c are sharply inclined. If the lateral-tooth sprockets 246, the annular chain 162, and the joint bars 208, etc. are sufficiently strong and the motor 164 produces sufficient drive power, then the constant gradient sections 160c may be directed at a right angle to the horizontal plane.

Thereafter, the joint conveyance carriage assembly 12 passes through the constant gradient sections 160c having an upward grade and the central sections 160b, and enters the constant gradient sections 160d having a downward grade. In the constant gradient sections 160d having a downward grade, as the lateral-tooth sprockets 246 is held in mesh with the annular chain 162, the joint conveyance carriage assembly 12 is prevented from sliding down by gravity.

Then, before the first conveyance carriage 200 reaches the junction between the constant gradient sections 160d having a downward grade and the gradient inlet sections 160e, i.e., reaches the end of the gradient upper guide 174, the roller 270 of the fourth conveyance carriage 206 abuts against the end of the cam plate 180, i.e., the slanted surface 180a thereof.

As the joint conveyance carnage assembly 12 travels along, the roller 270 is lowered by the slanted surface 180a and the parallel surface 180b of the cam plate 180. At this time, the roller 270 moves in the same manner as it is lowered by the cam plate 56. When the roller 270 is lowered, the lateral-tooth sprocket 266c is brought into mesh with the annular chain 162. If the lateral-tooth sprocket 266c and the annular chain 162 are out of phase with each other at this time, the springs 268 are compressed, the teeth of the lateral-tooth sprocket 266c do not unduly press the chain rollers 162a (see FIG. 11), and hence the lateral-tooth sprocket 266c, the chain rollers 162a, and the cam plate 180 are prevented from being damaged. As the joint conveyance carriage assembly 12 is conveyed, the lateral-tooth sprocket 266c and the annular chain 162 are naturally brought into phase with each other and into mesh with each other.

Then, the first conveyance carriage 200 passes across the drive sprocket 170 and enters the gradient inlet sections 160e having a downward grade. At this time, the lateral-tooth sprocket 246 of the first conveyance carriage 200 is released from the annular chain 162. Since the lateral-tooth sprocket 266c of the fourth conveyance carriage 204 is held in mesh with the annular chain 162, the joint conveyance carriage assembly 12 is prevented from sliding down.

The gear speed reducer (not shown) of the motor 164 may incorporate a one-way clutch for preventing the joint conveyance carriage assembly 12 from sliding down in the event of an accidental power failure or the like.

As shown in FIG. 10, the joint conveyance carriage assembly 12 moves through the gradient conveyance unit 18 and enters the horizontal conveyance unit 16 that is disposed beyond and connected to the gradient conveyance unit 18. In the horizontal conveyance unit 16, the first conveyance carriage 200 moves over the horizontal upper guide 40, and the chain rollers 30a (see FIG. 17) of the annular chain 30 is sandwiched between the horizontal upper guide 40 and the chain presser plate 242 of the first conveyance carriage 200. Since the chain presser plate 242 has a lower surface having an arcuate front side, the annular chain 30 is smoothly introduced beneath the chain presser plate 242. Thereafter, the first conveyance carriage 200 is conveyed under the force applied by the annular chain 30. Then, the chain presser plate 242 of the second conveyance carriage 202 also reaches the horizontal upper guide 40, and the second conveyance carriage 202 is subjected to the conveyance force from the annular chain 30.

Then, the roller 270 of the fourth conveyance carriage 206 passes across the end of the cam plate 180, and is released from the cam plate 180. The roller 270, the swing plate 260, the small frame 266 are now released from the pressing force applied from the cam plate 180, and return upwardly under the resiliency of the spring 262 (see FIG. 21). The lateral-tooth sprocket 266c is now released from the annular chain 162. Though the fourth conveyance carriage 206 tends to slide down by gravity, since at least the chain presser plate 242 of the first conveyance carriage 200 presses the annular chain 30, the joint conveyance carriage assembly 12 is supported by the fictional force. Therefore, the joint conveyance carriage assembly 12 is not unnecessarily accelerated.

Therefore, the joint conveyance carriage assembly 12, i.e., all the conveyance carriages including the fourth conveyance carriage 206, enters the horizontal conveyance unit 16, and is continuously conveyed by the force received from the chain presser plates 242 of the first through third conveyance carriages 200, 202, 204.

In the conveyance system 10 according to the embodiment of the present invention, as described above, the joint conveyance carriage assembly 12 can continuously pass between the horizontal conveyance unit 16 and the gradient conveyance unit 18 by holding the lateral-tooth sprocket 246 of the first conveyance carriage 200 in mesh with the annular chain 162 supported on the gradient upper guide 174. No workpiece needs to be mounted and removed between the horizontal conveyance unit 16 and the gradient conveyance unit 18. By conveying the joint conveyance carriage assembly 12 with the lateral-tooth sprocket 266d of the fourth conveyance carriage 206 in mesh with the annular chain 30, the front portion of the joint conveyance carriage assembly 12 can reliably be pushed onto the upgrade region of the gradient conveyance unit 18.

In the downgrade region of the gradient conveyance unit 18, even after the lateral-tooth sprocket 246 is released from the annular chain 162, since the lateral-tooth sprocket 266c of the fourth conveyance carriage 206 is held in mesh with the annular chain 162, the joint conveyance carriage assembly 12 is prevented from sliding down.

In the above embodiment, the rails 160 of the gradient conveyance unit 18 are of an upwardly convex arcuate shape. However, the rails 160 of the gradient conveyance unit 18 are not limited to such a shape, but may include a horizontal zone in its central sections. The gradient conveyance unit 18 may be of a shape having only an upward grade or a downward grade or a shape having a combination of an upward grade or a downward grade and a horizontal portion.

In the conveyance system 10 according to the embodiment of the present invention, as described above, when the third conveyance carriage 204 reaches the terminal end of the moving range of the annular chain 30 in the horizontal conveyance unit 16a, the joint conveyance carriage assembly 12 is continuously conveyed because at least the chain presser plate 242 of the first conveyance carriage 200 has been transferred to the adjacent horizontal conveyance unit 16b.

When the joint conveyance carriage assembly 12 is transferred from the horizontal conveyance unit 16 to the gradient conveyance unit 18, the joint conveyance carriage assembly 12 is pushed by the lateral-tooth sprocket 266d of the fourth conveyance carriage 206 which is in mesh with the annular chain 30, and is continuously conveyed by the lateral-tooth sprocket 246 of the first conveyance carriage 200 which is in mesh with the annular chain 162.

Furthermore, when the joint conveyance carriage assembly 12 is transferred from the gradient conveyance unit 18 to the horizontal conveyance unit 16, the joint conveyance carriage assembly 12 is preventing from sliding down by the lateral-tooth sprocket 266c of the fourth conveyance carriage 206 which is in mesh with the annular chain 162, and is continuously conveyed by the chain presser plate 242 of the first conveyance carriage 200 which is held against the annular chain 30.

Inasmuch as the upper rollers 216 and the lower rollers 218 rotate along the end faces of the rails 28 and the rails 160, the joint conveyance carriage assembly 12 is conveyed stably and continuously.

Moreover, because the horizontal conveyance units 16 and the gradient conveyance unit 18 are separable from each other, the number of horizontal conveyance units 16 and gradient conveyance units 18 may be increased or reduced depending on the layout of machine tools used, thereby adjusting the conveyance distance. As the horizontal conveyance units 16, the gradient conveyance unit 18, and the direction-reversing units 20 are separable from and connectable to each other, they can conveniently be assembled and managed, and they can easily be replaced in the event of failures.

In a factory that manufactures those units, the units can be managed for assembling and quality control. Since the units are shipped after they have been tested for operability, it is possible to install units at a site within a reduced period of time.

Horizontal conveyance units 16 can be connected to and separated from each other simply by using the joint plate 120, the support posts 22, and the bolts 61. It is not necessary to separate and machine the motors, the horizontal conveyance annular chains, etc. The horizontal conveyance units 16, the gradient conveyance unit 18, and the direction-reversing units 20 can also be connected to and separated from each other in the same manner. The horizontal conveyance units 16 should preferably have a length of about 2 meters.

Each of the horizontal conveyance units 16 has two rails 28 (rails 28a, 28b) parallel to each other and two annular chains 30, 33 corresponding to the respective rails 28, and the two annular chains 30, 33 rotate in the opposite directions, respectively, for conveying the joint conveyance carriage assembly 12 in forward and reverse directions.

Generally, after having conveyed a workpiece in the forward direction (the direction of the forward path), the joint conveyance carriage assembly 12 often returns in the reverse direction (the direction of the return path). The horizontal conveyance unit 16 is a space saver because the single horizontal conveyance unit 16 can convey a workpiece in both the forward and reverse directions. The gradient conveyance unit 18 can also convey a workpiece in both the forward and reverse directions.

The rails 28, 160 are in the form of plates that are elongate in the conveyance direction. The joint conveyance carriage assembly 12 moves laterally of the rails 28, 160 and carries a workpiece on a side opposite to the rails 28, 160. Therefore, it is possible to mount a workpiece on and remove a workpiece from the joint conveyance carriage assembly 12 at its side in the station 26 or the like.

In the above example, the motors 32 in a plurality of horizontal conveyance units 16 rotate at the same speed. However, these motors 32 may rotate at different speeds. In this case, the chain presser plates 242 of the joint conveyance carriage assembly 12 and the chain rollers 30a can pass over junctions between the horizontal conveyance units 16 while somewhat slipping against each other.

Because the gradient conveyance unit 18 is of an upwardly convex shape, a space is provided centrally below the gradient conveyance unit 18 to allow people, forklifts, or the like to pass therethrough.

Operation for circulatingly rotating the annular chains 30, 33 with the motor 32 will be described below with reference to FIGS. 5 and 7.

The motor 32 of the horizontal conveyance unit 16 rotates at a predetermined speed, and the drive power thereof is transmitted through the coupling 96 and the extension shaft 92 (see FIG. 6) to the drive bevel gear 94. The drive bevel gear 94 rotates clockwise as viewed from above. The first driven bevel gear 72 and the second driven bevel gear 74 are held in mesh with the drive bevel gear 94, and are driven by the rotation transmitted from the drive bevel gear 94. The first driven bevel gear 72 has its upper portion pushed out in the direction indicated by the arrow B in FIG. 7, and the second driven bevel gear 74 has its upper portion pushed out in the direction indicated by the arrow A in FIG. 7. As a result, the first driven bevel gear 72 rotates clockwise in FIG. 7, and the second driven bevel gear 74 rotates counterclockwise in FIG. 7.

The first driven bevel gear 72 rotates about the first rotational shaft 68, and the first drive sprocket 36 fixed to the first rotational shaft 68 also rotates in unison therewith. The upper run of the annular chain 30 is pulled in, and the lower run of the annular chain 30 is pushed out. Therefore, the annular chain 30 moves over the horizontal upper guide 40 in the direction indicated by the arrow B in FIG. 7.

The second driven bevel gear 74 rotates about the second rotational shaft 70, and the second drive sprocket 37 fixed to the second rotational shaft 70 also rotates in unison therewith. The lower run of the annular chain 33 is pulled in, and the upper run of the annular chain 33 is pushed out. Therefore, the annular chain 33 moves over the horizontal upper guide 40 in the direction indicated by the arrow A in FIG. 7.

The first rotational shaft 68 has its both ends rotatably supported by the bearing 78 and the bearing (first inner bearing) 67*a*, and hence can rotate stably and smoothly and withstand large loads. Similarly, the second rotational shaft 70 has its both ends rotatably supported by the bearing 79 and the bearing (second inner bearing) 67*b*, and hence can rotate stably and smoothly and withstand large loads.

Since the bearings 67*a*, 67*b* are housed in the bearing box 66, they can easily be handled, and can effectively utilize the space between the first driven bevel gear 72 and the second driven bevel gear 74. The bearings 78, 79 can easily be mounted into place from outside of the rails 28 using the fixing members 80.

Only the first driven bevel gear 72, the second driven bevel gear 74, the bearing box 66, and the drive bevel gear 94 are present between the first drive sprocket 36 and the second drive sprocket 37, making it possible to reduce the gap between the first drive sprocket 36 and the second drive sprocket 37. That is, the distance between the annular chain 30 and the annular chain 33 is reduced, reducing the width of the horizontal conveyance unit 16.

Because the first rotational shaft 68 and the second rotational shaft 70 are coaxial with each other, the first drive sprocket 36 and the second drive sprocket 37 are also coaxial with each other. The corresponding two driven sprockets 38 (see FIG. 8) are also supported on the common support shaft 108. Therefore, the annular chain 30 and the annular chain 33 provide equal conveyance distances and are symmetrically disposed. This layout makes it easy to construct the horizontal conveyance unit 16 as one unit, and to connect and separate the horizontal conveyance units 16.

Since the drive bevel gear 94 and the motor 32 are disposed on a line perpendicular to the axis of the first rotational shaft 68 and the second rotational shaft 70, it is possible to freely set the dimensions of the first rotational shaft 68 and the second rotational shaft 70. With this layout, the motor 32 does not project in the direction of the first rotational shaft 68 and the second rotational shaft 70, allowing the joint conveyance carriage assembly 12 to pass on the side of the rail 28.

As described above, the drive bevel gear 94 is rotated by the motor 32, and the first driven bevel gear 72 and the second driven bevel gear 74 are rotated by the rotation transmitted from the drive bevel gear 94. The first driven bevel gear 72 and the second driven bevel gear 74 can be rotated in the respective opposite directions. Accordingly, the annular chains 30, 33 can be moved over the horizontal upper guide 40 in the respective opposite directions by the first drive sprocket 36 that rotates in unison with the first driven bevel gear 72 and the second drive sprocket 37 that rotates in unison with the second driven bevel gear 74. As a consequence, the annular chains 30, 33 can convey the joint conveyance carriage assembly 12 in the two directions, i.e., the forward and reverse directions.

Furthermore, since the joint conveyance carriage assembly 12 is conveyed laterally outside of the pair of rails 28 or 160, there is no obstacle thereto in the vertical direction. Consequently, an elongate workpiece such as the connecting rod 1 or the like can be conveyed in an upstanding state without projecting in the conveyance direction or the transverse direction. Therefore, relatively elongate workpieces can be conveyed.

The drive bevel gear 94 may be positioned laterally or downwardly of, rather than upwardly of, the first driven bevel gear 72 and the second driven bevel gear 74. Each of the drive bevel gear 94, the first driven bevel gear 72, and the second driven bevel gear 74 may comprise any bevel gear such as a spiral bevel gear, a helical bevel gear, or the like. Since the first driven bevel gear 72 and the second driven bevel gear 74 may be of such a structure capable of changing the direction of rotation of the drive bevel gear 94, they may comprise face gears, crown gears, or the like.

The bearings are not limited to rolling element bearings, but may be plain bearings.

Operation of the direction-reversing unit 20 will be described below with reference to FIGS. 12 through 15. In the present embodiment, it is assumed that the joint conveyance carriage assembly 12 which has traveled in the direction indicated by the arrow A in FIGS. 2, 12, and 15 is reversed by the direction-reversing unit 20 to travel in the direction indicated by the arrow B.

The forward-path chain 330 and the return-path chain 332 are circulatingly operated by the motor 32*b* and drive sprocket 36*b*. The forward-path chain 330 and the return-path chain 332 of the direction-reversing unit 20 are thus circulatingly operated.

Since the forward-path chain 330 is trained around the reversing-unit first driven sprocket 392 disposed in the direction-reversing unit 20 (see FIG. 12), the reversing-unit first driven sprocket 392, the reversing-unit second driven sprocket 394, and the rotational shaft 404 are also rotated. The chain 400 trained around the small sprocket 396 which is rotated by the rotational shaft 404 and the large sprocket 398 rotates the rotational shaft 370, the first disk 374, and the second disk 376. Thus, the auxiliary propelling mechanism 390 is also in operation, and the first disk 374 and the second disk 376 are continuously rotated at all times irrespective of whether the joint conveyance carriage assembly 12 reaches the direction-reversing unit 20 or not.

As described above, the upper rollers 216 and the lower rollers 218 of the joint conveyance carriage assembly 12 hold the forward-path rail 28a, and the chain presser plate 242 (see FIG. 17) presses the forward-path chain 330 that is circulatingly operated. Therefore, the joint conveyance carriage assembly 12, while being guided by the forward-path rail 28a, is moved in the direction indicated by the arrow A in FIG. 12 by the forward-path chain 330.

When the joint conveyance carriage assembly 12 travels to the direction-reversing unit 20, the chain presser plate 242 of the first conveyance carriage 200 is shifted from the chain 33 of the horizontal conveyance unit 16 to the chain 330 of the direction-reversing unit 20. Thereafter, the joint conveyance carriage assembly 12 is moved by the chain 330 of the direction-reversing unit 20.

In the direction-reversing unit 20, the lower rollers 234 and the upper rollers 232 of the first conveyance carriage 200 of the joint conveyance carriage assembly 12 enter between the first guide members 412, 412 and the second guide members 414, 414. As the joint conveyance carriage assembly 12 travels on, the lower rollers 234 and the upper rollers 232 of the first conveyance carriage 200 are held by the curved portions of the first guide members 412, 412 and the first disk 374 or the second disk 376.

The lower rollers 234 and the upper rollers 232 are moved as they are accompanied by the first disk 374 or the second disk 376, as shown in FIGS. 13 and 15, by frictional forces developed between them and the O-rings 378. Finally, the lower rollers 234 and the upper rollers 232 of the first conveyance carriage 200 enter between the first guide members 412, 412 and the third guide members 416, 416 (see FIG. 15).

As the chain pressure plate 242 of the fourth conveyance carriage 206 is released from the forward-path chain 330 and the upper rollers 216 and the lower rollers 218 of the fourth conveyance carriage 206 are released from the rail 28a, the upper rollers 216 and the lower rollers 218 of the first conveyance carriage 200 are fitted over the rail 28b. As with the first conveyance carriage 200, the second through fourth conveyance carriages 202, 204, 206 are successively moved as they are accompanied by the first disk 374 or the second disk 376. The first conveyance carriage 200 is pushed by the fourth conveyance carriage 206 that is turning, and moved while being guided by the rail 28b. Finally, the upper rollers 216 and the lower rollers 218 of the fourth conveyance carriage 206 are fitted over the rail 28b, and the chain presser plate 242 thereof presses the return-path chain 332, whereupon the turning movement of the joint conveyance carriage assembly 12 is finished.

The joint conveyance carriage assembly 12 is shifted from the return-path chain 332 of the direction-reversing unit 20 to the annular chain 30 of the horizontal conveyance unit 16. Subsequently, the joint conveyance carriage assembly 12 is moved on the rail 28 in the direction indicated by the arrow B in FIG. 12 by the annular chain 30 of the horizontal conveyance unit 16. That is, the joint conveyance carriage assembly 12 is guided by the rail 28a and moved in the direction indicated by the arrow A in FIG. 12, then is turned 180° in direction by the direction-reversing unit 20, and guided by the rail 28b and moved in the direction indicated by the arrow B.

Since the lower rollers 234 and the upper rollers 232 are cylindrical in shape, the direction-reversing unit 20 allows the first through fourth conveyance carriages 200, 202, 204, 206 to turn easily.

Furthermore, because there are two lower rollers 234 and two upper rollers 232, the drive power for turning the joint conveyance carriage assembly 12 is greater than if there are one lower roller 234 and one upper roller 232. If there are three or more lower rollers 234 and three or more upper rollers 232, then it is difficult for the third lower and upper rollers 234, 232 to enter between the first guide members 412 and the first and second disks 374, 376, making it difficult to turn the joint conveyance carriage assembly 12.

Thus, the two lower rollers 234 and the two upper rollers 232 allow the joint conveyance carriage assembly 12 to turn reliably and easily.

The direction-reversing unit 20 can be operated by the motor 32b which circulatingly operates the forward-path chain 330 and the return-path chain 332. Specifically, the drive means for operating the direction-reversing unit 20 does not need to be separate from the drive means for operating the forward-path chain 330 and the return-path chain 332. Accordingly, the direction-reversing unit 20 may be simplified in structure.

When the joint conveyance carriage assembly 12 is released from the rail 28a and the forward-path chain 330, turned, or starts being moved by the rail 28b and the return-path chain 332, no shock is applied to the joint conveyance carriage assembly 12. Specifically, when the joint conveyance carriage assembly 12 is turned by the direction-reversing unit 20, the joint conveyance carriage assembly 12 can be transferred from the forward-path chain 330 to the return-path chain 332 without being subjected to shocks. Consequently, the connecting rod 1 is prevented from falling off the joint conveyance carriage assembly 12 and from being damaged.

Operation for mounting the connecting rod 1 as a workpiece on and removing same from the joint conveyance carriage assembly 12, and conveying the connecting rod 1 with the joint conveyance carriage assembly 12 will be described below.

When the joint conveyance carriage assembly 12 is displaced to the station 26 where the connecting rod 1 is to be loaded, the joint conveyance carriage assembly 12 is stopped in a given position by the stopping mechanism 2010 mentioned below.

Thereafter, the rod 1026 of the air cylinder 1024 is lifted. At this time, since the bearing roller 1040 rolls in abutment against the slanted surface 1030 of the larger-diameter portion 1028 on the upper end of the rod 1026, the bearing roller 1040 is displaced radially inwardly of the larger-diameter portion 1028. The hook 1038 is tilted until finally the projecting upper end thereof engages the horizontal engaging finger 1082 of the engaging member 1074. The joint conveyance carriage assembly 12 is now positioned.

Figure 30:
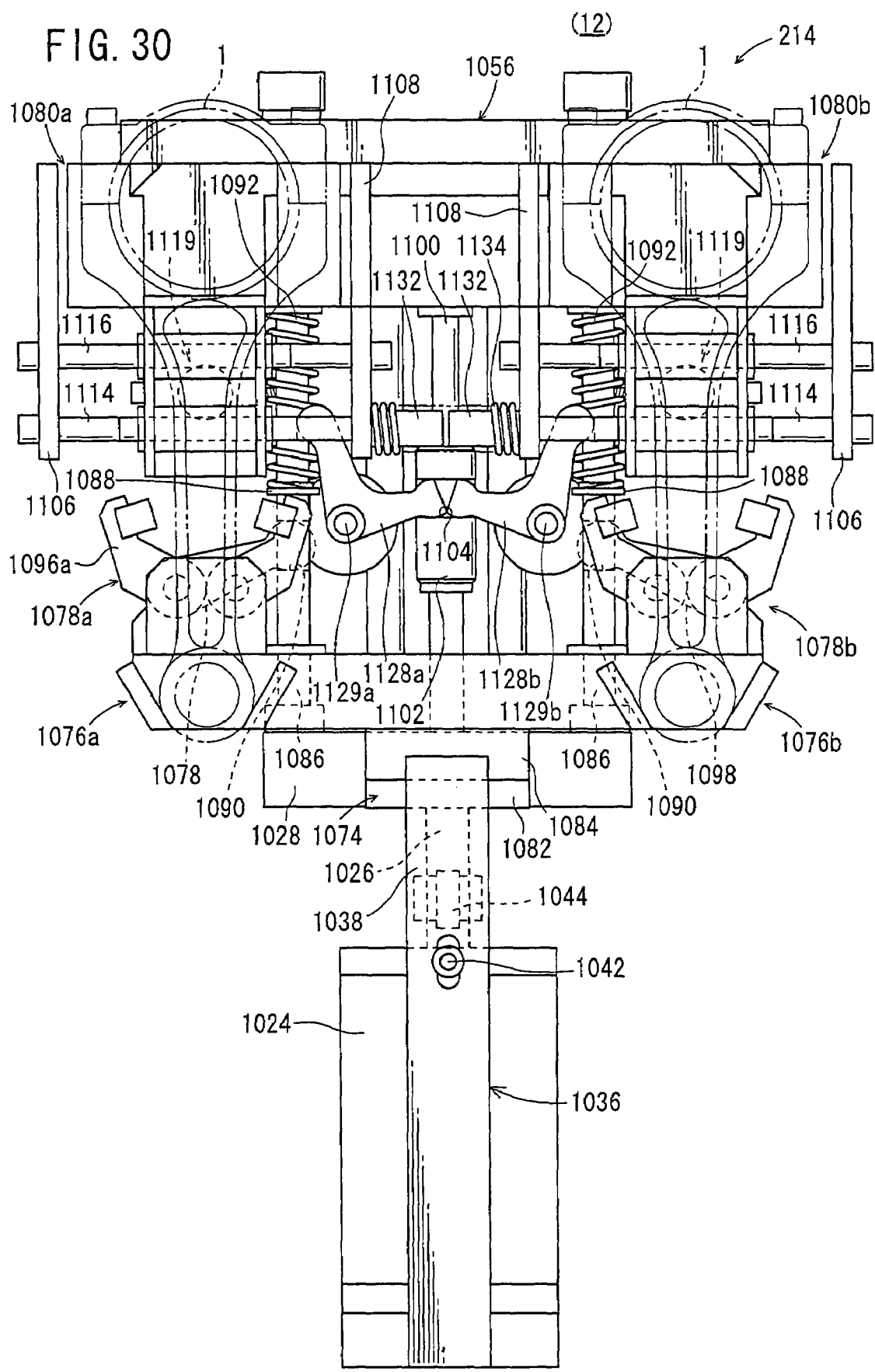
FIG. 30 is a front elevational view showing the manner in which a clamp mechanism and holding mechanisms in a retaining mechanism of the joint conveyance carriage assembly are opened.

The first rods 1086 and the second rod 1100 are elevated by being pushed by the larger-diameter portion 1028 on the upper end of the rod 1026. The end of the arm 1098 which is housed in the recess 1090 in the first rod 1086 of the first clamp mechanism 1078a is lifted, tilting the clamp 1096a outwardly. Since the toothed portions of the clamps 1096a, 1096b are held in mesh with each other, when the clamp 1096a is tilted outwardly, the clamp 1096b is also tilted outwardly. As a result, as shown in FIG. 30, the clamps 1096a, 1096b are opened.

The spring 1092 is compressed during the above operation.

Figure 31:
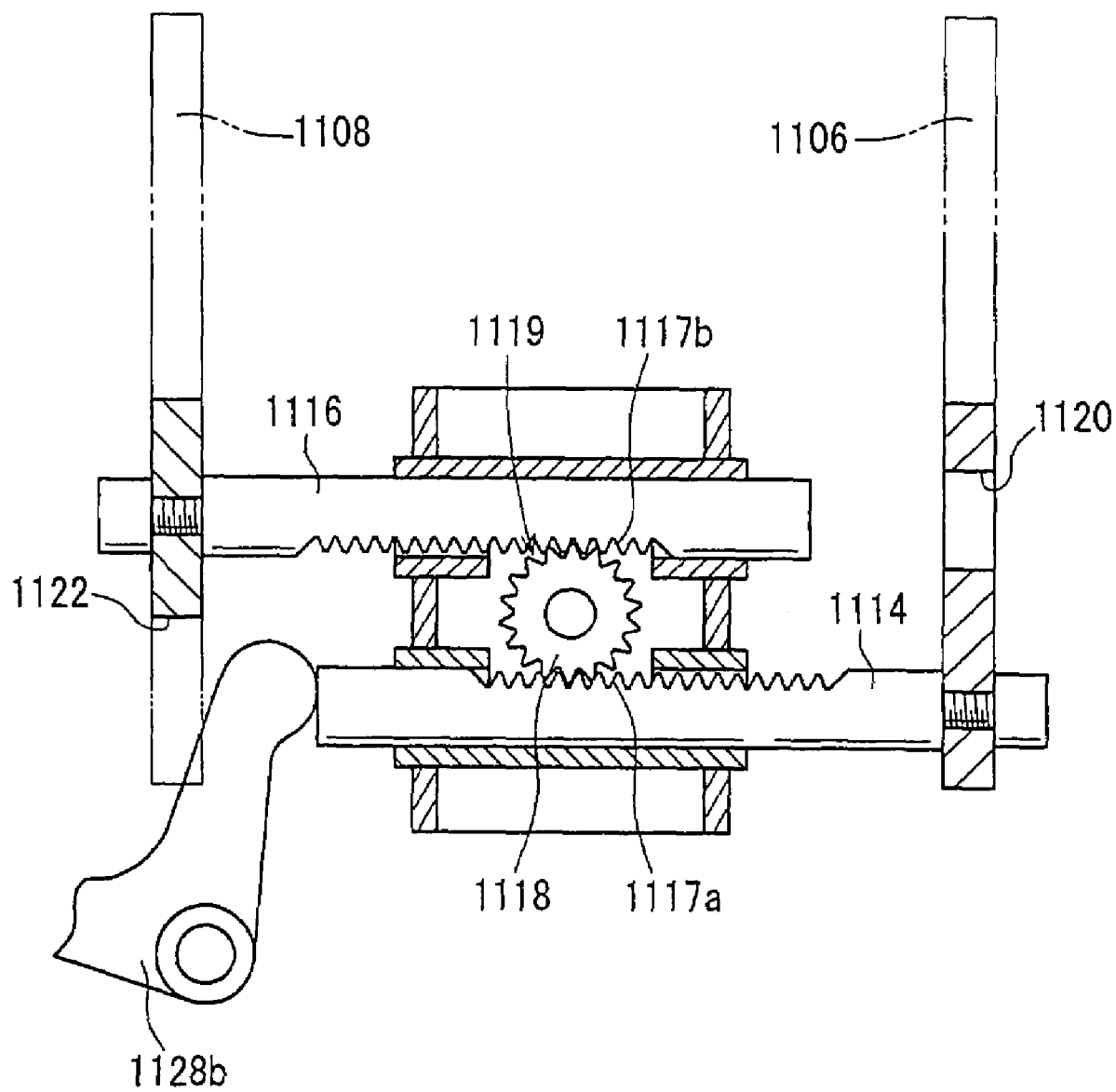
FIG. 31 is an enlarged view, partly cut away, showing the manner by which an outer movable plate and an inner movable plate are displaced away from each other by the rack-and-pinion mechanism shown in FIG. 28.

The end of the first L-shaped arm 1128a which is housed in the recess 1104 in the second rod 1100 is lifted, turning the first L-shaped arm 1128a about the bent corner thereof. Therefore, the presser rod 1114 is pressed and displaced by the other end of the first L-shaped arm 1128a, and finally the outer movable plate to which the presser rod 1114 is coupled is displaced in a direction away from the second rod 1100. At this time, since the teeth 1117a, 1117b of the presser rods 1114, 1116 are held in mesh with the pinion 1118, as shown in FIG. 31, the presser rod 1116 is displaced in the direction opposite to the direction in which the presser rod 1114 is displaced, by the rack-and-pinion mechanism 1119. The inner movable plate to which the presser rod 1116 is now displaced toward the second rod 1100.

That is, the outer movable plate 1106 and the inner movable plate 1108 are displaced away from each other while being guided by the guide bars 1130a, 1130b. The first holding mechanism 1080a is thus opened (see FIG. 30). When the outer movable plate 1106 and the inner movable plate 1108 are most spaced from each other, the guide bar 1130a is released from the outer movable plate 1106, and the guide bar 1130b is released from the inner movable plate 1108.

The second clamp mechanism 1078b and the second holding mechanism 1080b operate in the same manner as described above. The spring 1134 is therefore compressed by the two inner movable plates 1108, 1108.

As shown in FIG. 26, two connecting rods 1 that are gripped by a predetermined transfer device (e.g., a robot or the like) are inserted respectively into the first holding mechanism 1080a and the second holding mechanism 1080b from their front side. The smaller-diameter first end 3 of each of the connecting rods 1 is inserted into the first pocket 1076a or the second pocket 1076b.

Thereafter, the rod 1026 of the air cylinder 1024 is lowered, releasing the first rods 1086 and the second rod 1100 from the pressure of the air cylinder 1024. The second rod 1100 is lowered, and the springs 1092, 1092 are extended. The springs 1092, 1092 press the first rods 1086, 1086, lowering the first rods 1086, 1086.

Since the arms 1098 are lowered, the intermeshing toothed portions tilt the clamps 1096a, 1096b of the first clamp mechanism 1078a inwardly. The shank 6 of the connecting rod 1 is now gripped by the clamps 1096a, 1096b. Since the clamps 1096a, 1096b are claw-shaped, they reliably grip the connecting rod 1 and prevent the connecting rod 1 from falling off. The second clamp mechanism 1078b also operates in the same manner.

The ends of the first L-shaped arm 1128a and the second L-shaped arm 1128b are lowered, turning the first L-shaped arm 1128a and the second L-shaped arm 1128b. Therefore, the presser rods 1114, 1114 are released from the pressure from the first L-shaped arm 1128a and the second L-shaped arm 1128b. When the pressure from the first L-shaped arm 1128a and the second L-shaped arm 1128b becomes smaller than the resilient force of the spring 1134, the spring 1134 is extended to press the inner movable plates 1108, 1108. The inner movable plates 1108, 1108 are displaced toward the outer movable plates 1106, 1106, which are displaced toward the inner movable plates 1108, 1108 by the rack-and-pinion mechanism 1119.

The outer movable plates 1106, 1106 and the inner movable plates 1108, 1108 are now displaced toward each other until finally they hold the larger-diameter second ends 5 of the connecting rods 1 from their opposite sides.

According to the present embodiment, therefore, the first end 3 of each of the connecting rods 1 is inserted in and held by the first pocket 1076a or the second pocket 1076b, the shank 6 thereof is gripped by the first clamp mechanism 1078a or the second clamp mechanism 1078b, and the second end 5 thereof is held by the first holding mechanism 1080a or the second holding mechanism 1080b, so that each of the connecting rods 1 is carried in an upstanding state by the joint conveyance carriage assembly 12. Since the elongate connecting rods 1 are carried in an upstanding state by the joint conveyance carriage assembly 12, the joint conveyance carriage assembly 12 can be reduced in the transverse direction or the longitudinal direction thereof, and hence reduced in size.

The first clamp mechanism 1078a and the second clamp mechanism 1078b are opened and closed, and the first holding mechanism 1080a and the second holding mechanism 1080b are caused to hold and release the connecting rods 1, only by the air cylinder 1024 in the station 26. Therefore, the joint conveyance carriage assembly 12 does not need to incorporate hydraulic devices, pneumatic devices, and electric devices, so that the joint conveyance carriage assembly 12 and the conveyance system 10 may be simplified in structure.

As the connecting rods 1 are carried by the joint conveyance carriage assembly 12, the connecting rods 1 are not subject to shocks and hence are prevented from being damaged.

Moreover, because the connecting rod 1 is supported by the first pocket 1076a or the second pocket 1076b, the connecting rod 1 is reliably prevented from falling off the joint conveyance carriage assembly 12.

When the rod 1026 of the air cylinder 1024 is lowered, the bearing roller 1040 rolls along the slanted surface 1030 of the larger-diameter portion 1028 on the upper end of the rod 1026, and is displaced radially outwardly of the larger-diameter portion 1028. At this time, the hook 1038 is tilted by being pressed by the spring 1044. As a result, the projecting upper end of the hook 1038 is disengaged from the horizontal engaging finger 1082 of the engaging member 1074 (see FIG. 29). The joint conveyance carriage assembly 12 is now released from the first lock mechanism 1036.

Furthermore, the joint conveyance carriage assembly 12 is released from the stopping mechanism 2010.

During this time, the motors 32, 32b, 164, 165 remain energized without stopping. Therefore, the joint conveyance carriage assembly 12 released from the stopping mechanism 2010 starts to be displaced again while being guided by the rail 28, by the circulating annular chain 30. The connecting rods 1 are conveyed to a station 26 for performing a next process.

In the next station 26, the conveyed connecting rods 1 are gripped by the transfer device and removed from the joint conveyance carriage assembly 12. At this time, since the connecting rods 1 are erected with the second ends 5 as the upper ends, the transfer device can easily grip the connecting rods 1.

The first ends 3 are loosely inserted in the first pocket 1076a and the second pocket 1076b, and the first clamp mechanism 1078a and the second clamp mechanism 1078b and also the first holding mechanism 1080a and the second holding mechanism 1080b grip and hold the connecting rods 1 under relatively small forces, i.e., the resilient forces of the springs 1092, 1134. Therefore, the transfer device can easily release the connecting rods 1 from the joint conveyance carriage assembly 12.

As the connecting rods 1 are positioned by the first pocket 1076a and the second pocket 1076b, the transfer device operates in the same manner in successive cycles. Even if the transfer device is of a simple structure, it can transfer the connecting rods 1. Therefore, the transfer device does not need to be complex in structure, and hence facility investments can be reduced.

For conveying connecting rods 1 having different dimensions, the clamps 1096a, 1096b, the outer movable plates 1106, 1106, and the inner movable plates 1108, 1108 are displaced to grip or hold the connecting rods 1 from their opposite ends. The joint conveyance carriage assembly 12 is thus able to carry connecting rods 1 having various dimensions. Therefore, the joint conveyance carriage assembly 12 is not required to modify dimensions and shapes thereof depending on connecting rods 1 to be carried thereby.

The connecting rods 1 that have been released from the joint conveyance carriage assembly 12 are tapped to form threads thereon or otherwise machined. Thereafter, the connecting rods 1 are conveyed by the joint conveyance carriage assembly 12 to a station 26 for performing a next process, where the connecting rods 1 are machined into final products.

In the present embodiment, the connecting rods 1 of identical dimensions are illustrated as workpieces. However, connecting rods 1 having different dimensions may be conveyed. The outer movable plate 1106 and the inner movable plate 1108 of the clamp mechanism for holding a workpiece of smaller dimensions are closed under the pressure from the spring 1134, and the clamps 1096a, 1096b of the holding mechanism are closed under the pressure from the spring 1092. The outer movable plates 1106 and the inner movable plates 1108 of the first clamp mechanism 1078a and the second clamp mechanism 1078b, and the clamps 1096a, 1096b of the first holding mechanism 1080a and the second holding mechanism 1080b are different closed positions.

Both the clamp mechanisms and the holding mechanisms do not need to be incorporated, but at least one of these clamp and holding mechanisms may be incorporated.

Each of the first holding mechanism 1080a and the second holding mechanism 1080b is constructed of the outer movable plate 1106 and the inner movable plate 1108. However, one of these movable plates may be replaced with a fixed plate.

Workpieces that are conveyed are not limited to connecting rods 1.

Operation to decelerate and stop the joint conveyance carriage assembly 12 with the stopping mechanism 2010 when the joint conveyance carriage assembly 12 is guided by the rail 28b and is about to reach the station 26 will be described below.

In the description which follows, it is assumed that the joint conveyance carriage assembly 12 which has traveled in the direction indicated by the arrow A in FIG. 2 is stopped by the stopping mechanism 2010 while it is being reversed by the direction-reversing unit 20 to travel in the direction indicated by the arrow B.

As described above, the entry path 2110 of the stopping mechanism 2010 has the narrower portion 2126 and the wider portion 2128. When the first conveyance carriage 200 approaches the station 26, the upper rollers 232 enter the narrower portion 2126.

The width of the narrower portion 2126 is progressively smaller in the direction of travel of the joint conveyance carriage assembly 12 (in the direction indicated by the arrow B in FIG. 2) (see FIG. 35). Therefore, the circumferential side walls of the upper rollers 232 are held against the shanks of the first arm 2100 and the second arm 2102. Since the joint conveyance carriage assembly 12 is supported by a relatively small force, the joint conveyance carriage assembly 12 is decelerated.

Figure 36:
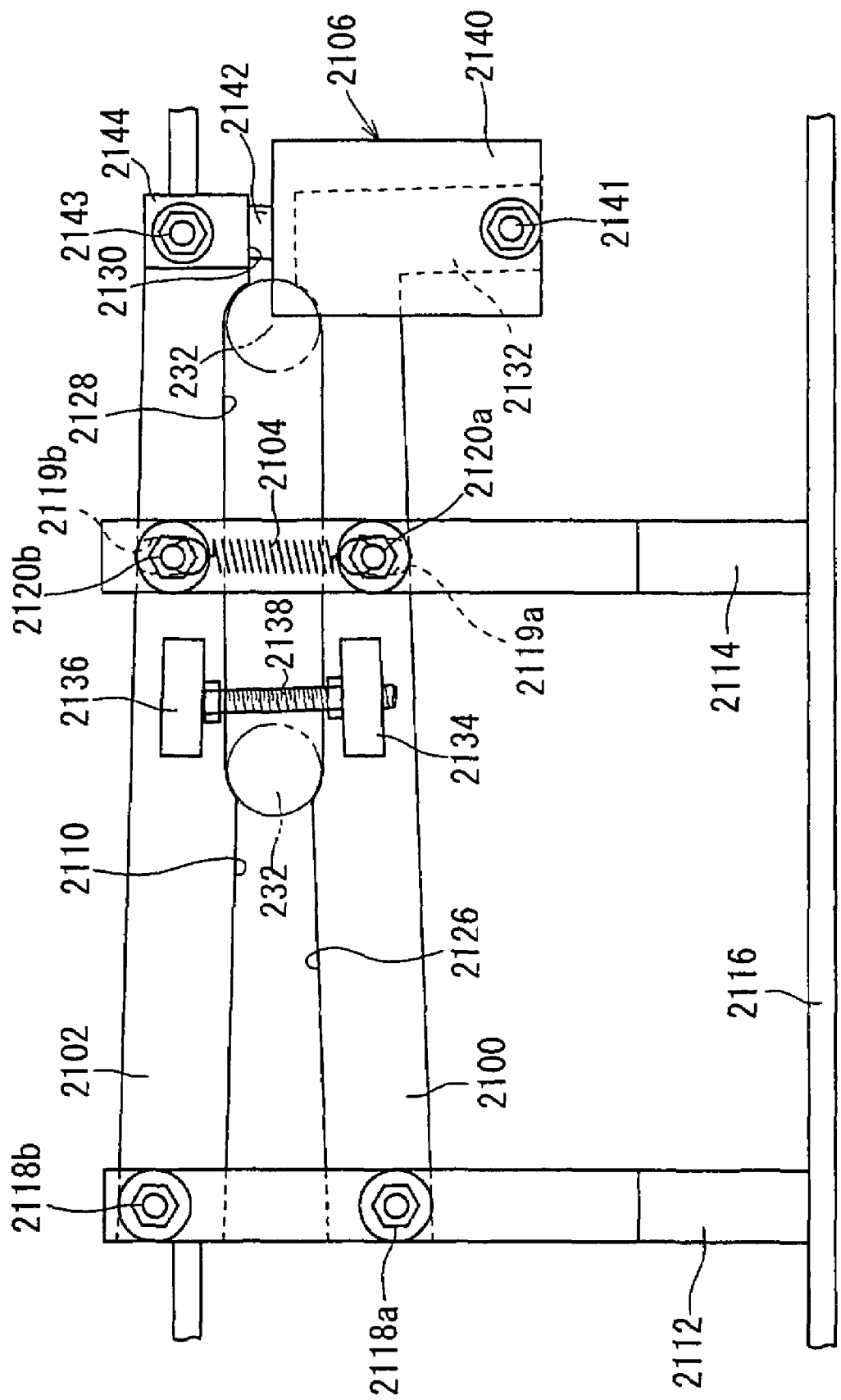
FIG. 36 is a plan view showing the manner in which upper rollers of the first conveyance carriage enter an entry path.

As shown in FIG. 36, as the joint conveyance carriage assembly 12 travels on, the leading upper roller 232 spreads the narrower portion 2126. That is, the upper roller 232 extends the spring 2104 and the piston rod 2142 of the air cylinder 2106, and is allowed to pass through the narrower portion 2126.

At this time, the kinetic energy of the joint conveyance carriage assembly 12 is converted into a work for extending the spring 2104 and the piston rod 2142 by the leading upper roller 232. Therefore, the kinetic energy of the joint conveyance carriage assembly 12 is reduced, resulting in a further deceleration of the joint conveyance carriage assembly 12.

Then, the trailed upper roller 232 also extends the spring 2104 and the piston rod 2142 of the air cylinder 2106, spreading the narrower portion 2126. Inasmuch as the kinetic energy of the joint conveyance carriage assembly 12 is further reduced, the speed of the joint conveyance carriage assembly 12 is further lowered.

The upper rollers 232, 232 of the decelerated joint conveyance carriage assembly 12 enter the wider portion 2128. The leading upper roller 232 is supported by the supports 2130 of the first arm 2100 and the second arm 2102, whereupon the joint conveyance carriage assembly 12 is put to a full stop.

Specifically, the two upper rollers 232, 232 spread the first arm 2100 and the second arm 2102 apart from each other, absorbing the kinetic energy of the joint conveyance carriage assembly 12 stepwise. Since the joint conveyance carriage assembly 12 is gradually decelerated and stopped, shocks are prevented from being produced when the joint conveyance carriage assembly 12 is stopped. Therefore, the connecting rods 1 carried by the joint conveyance carriage assembly 12 are prevented from falling off or being damaged.

After the upper rollers 232 enter the entry path 2110 until the joint conveyance carriage assembly 12 is stopped, the upper rollers 232 are held in rolling contact with the first arm 2100 and the second arm 2102 while in rotation. The upper rollers 232 are less subject to wear than if they are in the form of simple cylinders which do not rotate. The joint conveyance carriage assembly 12 can thus reliably be decelerated and stopped over a long period of time.

If the motors 32, 32b, 164, 165 are rotated at an increased speed to increase the speed of the joint conveyance carriage assembly 12, then the spring 2104 may be of a design having increased resiliency (harder) or the air cylinder 2106 may be designed to operate the piston rod 2142 under greater forces for thereby reliably decelerating and stopping the joint conveyance carriage assembly 12 depending on its speed.

The stopping mechanism 2010 is thus capable of easily decelerating and stopping the joint conveyance carriage assembly 12. Therefore, no undue limitations are posed on the range in which the joint conveyance carriage assembly 12 is conveyed.

Figure 37:
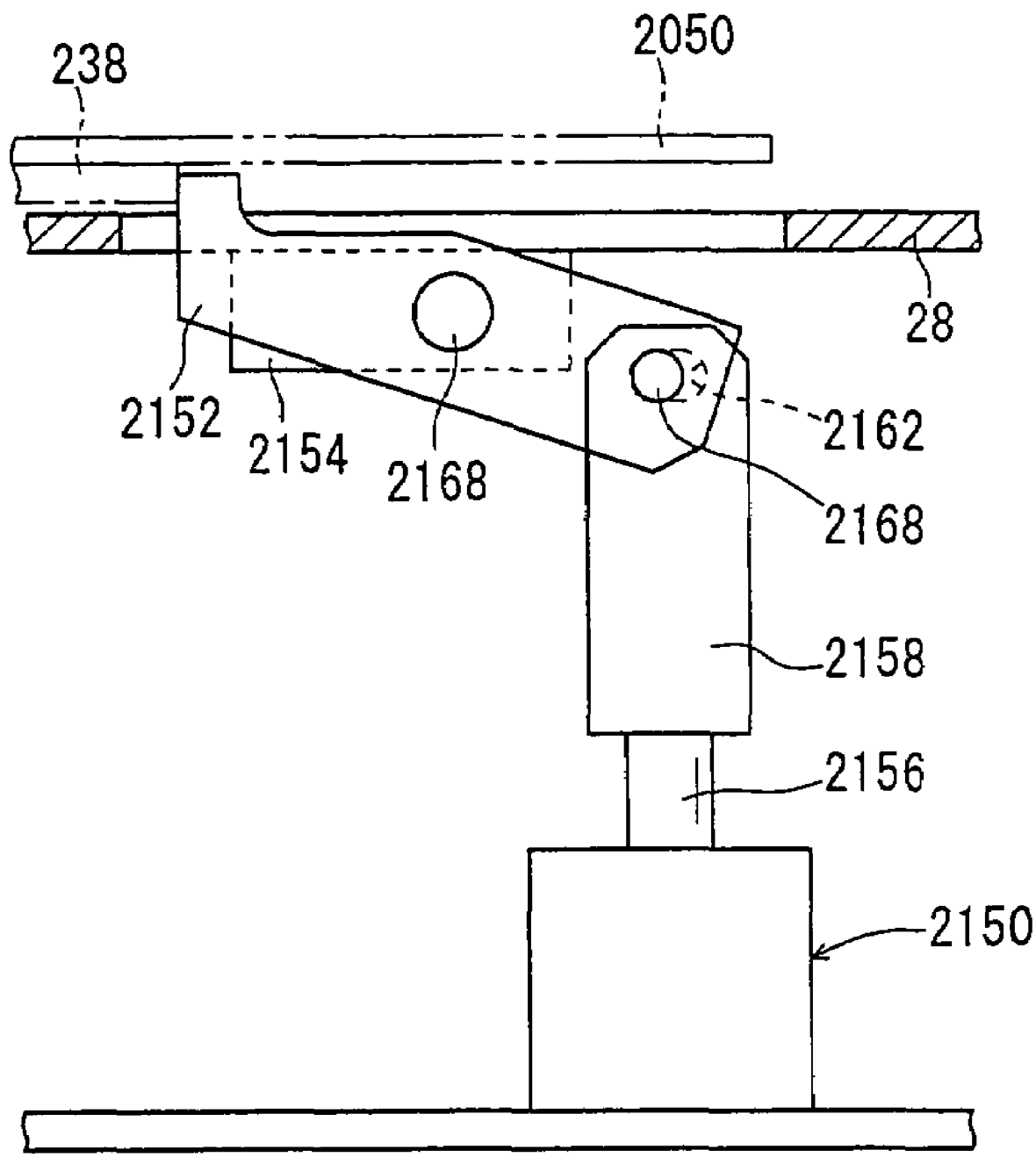
FIG. 37 is a plan view showing the manner in which a hook portion of the hook abuts against an end face of a stopper of the first conveyance carriage.
Figure 38:
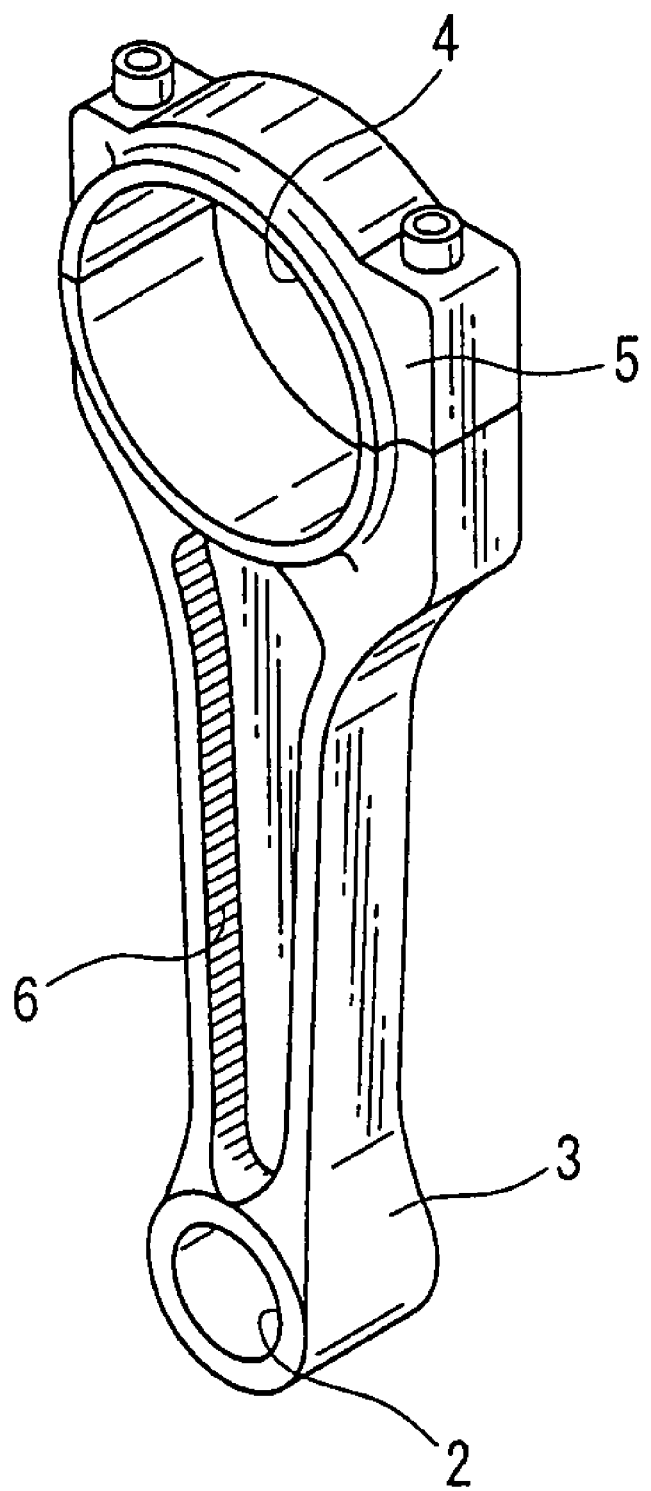
FIG. 38 is a perspective view of a connecting rod, which is an example of a workpiece which can be carried by the conveyance system hereof.

When the joint conveyance carriage assembly 12 is stopped, the first conveyance carriage 200 is positioned and fixed by the second lock mechanism 2108 (see FIG. 34). Specifically, the cylinder 2150 is actuated to retract the piston rod 2156, tilting the hook 2152 about its joint as a pivot toward the first conveyance carriage 200. Finally, the hooked end of the hook 2152 abuts against the end face of the stopper 238 of the first conveyance carriage 200, as shown in FIG. 37. The first conveyance carriage 200 is now supported, positioning and fixing the joint conveyance carriage assembly 12.

As described above, the first lock mechanisms 1036 (see FIG. 33) are actuated to cause the engaging members 1074 to engage the hooks 1038 (see FIGS. 33 and 26). The joint conveyance carriage assembly 12 is thus positioned more reliably.

Connecting rods 1 are transferred to and from the joint conveyance carriage assembly 12 that is stopped, positioned, and fixed. Specifically, as described above, the air cylinder 1024 in the station 26 actuates the first clamp mechanism 1078a, the second clamp mechanism 1078b, the first holding mechanism 2062a, and the second holding mechanism 2062b of the joint conveyance carriage assembly 12. The clamps 1096a, 1096b are opened, and the outer movable plates 1106 and the inner movable plates 1108 are moved away from each other by the rack-and-pinion mechanisms.

The connecting rods 1 are released from the joint conveyance carriage assembly 12, and the predetermined transfer device grips the connecting rods 1 from the front side and transfers the connecting rods 1 to the machine, and returns machined connecting rods 1 to the joint conveyance carriage assembly 12.

Thereafter, the air cylinders 1024 are actuated to close the clamps 1096a, 1096b and actuate the rack-and-pinion mechanisms again to move the outer movable plates 1106 and the inner movable plates 1108 toward each other. New connecting rods 1 as they are in an upstanding state are gripped by the first clamp mechanism 1078a, the second clamp mechanism 1078b, the first holding mechanism 2062a, and the second holding mechanism 2062b of the joint conveyance carriage assembly 12. The lower ends of the connecting rods 1 are supported respectively by the first pocket 1076a and the second pocket 1076b.

When the above operation is finished, the piston rod 2156 of the cylinder 2150 (see FIG. 34) is projected to tilt the hook 2152 away from the first conveyance carriage 200. The first conveyance carriage 200 is now released from the second lock mechanism 2108.

Then, the air cylinder 2106 is actuated to project the piston rod 2142 to press the piston rod bearing member 2144. As a result, the first arm 2100 and the second arm 2102 are moved away from each other, making the width of the entry path 2110 greater than the diameter of the upper rollers 232. The joint conveyance carriage assembly 12 is now released from the stopping mechanism 2010.

During which time, the motor 32 continues to rotate, i.e., the annular chain 30 continues to operate circulatingly, without stopping. Therefore, the joint conveyance carriage assembly 12 released from the stopping mechanism 2010 immediately starts traveling again.

Thus, the joint conveyance carriage assembly 12 can be stopped without stopping the motor 32 and the annular chain 30 which serve as a drive source to propel the joint conveyance carriage assembly 12. Consequently, since the joint conveyance carriage assembly 12 released from the stopping mechanism 2010 can be quickly moved again, it can efficiently convey the connecting rods 1.

When the last fourth conveyance carriage 206 is released from the entry path 2110, the piston rod 2142 of the air cylinder 2106 is retracted. Thereafter, the first arm 2100 and the second arm 2102 (see FIG. 35) are displaced toward each other about the bolts 2118a, 2118b under the pressure from the spring 2104. At this time, the end face of the head of the stopper bolt 2138 abuts against the second stopper columnar member 2136 to form the second entry path 2110 at a predetermined interval therebetween.

The joint conveyance carriage assembly 12 which has started moving again in the direction indicated by the arrow B in FIG. 2 while being guided by the rail 28b, the joint conveyance carriage assembly 12 is decelerated and stopped in the next station 26 in the same manner as described above for transferring connecting rods 1.

In the above embodiment, the direction-reversing unit 20 changes the direction of travel of the joint conveyance carriage assembly 12 through 180°. However, the direction-reversing unit 20 may change the direction of travel of the joint conveyance carriage assembly 12 through 90°. According to this modification, the direction can easily be changed if one upper roller 232 and one lower roller 234 are employed.

Each of the mechanisms in the conveyance system 10 may be constructed of inexpensive and general-purpose components including the motor 32, the motor 164, the first drive sprocket 36, the drive sprocket 170, the driven sprocket 38, the driven sprocket 172, the annular chain 30, and the annular chain 162, etc.

Since operative parts of the joint conveyance carriage assembly 12 are only passive parts to which forces from other parts are applied, including the upper roller 216, the lower roller 218, the roller 270, the spring 262, and the spring 268, etc., actuators such as motors, cylinders, etc., and pipes and wires connected to such actuators are not required on the joint conveyance carriage assembly 12.

The conveyance system according to the present invention is not limited to the above embodiment, but may employ various arrangements without departing from the scope of the present invention.

The invention claimed is:

1. A conveyance system, comprising:
  a conveyance carriage assembly for carrying a workpiece thereon; and
  a plurality of conveyance units through which said conveyance carriage assembly is conveyed;
  wherein said conveyance carriage assembly comprises a plurality of driven members including a foremost driven member;
  and said conveyance units are separable into individual units;
  each of said individual units comprising:
  two substantially parallel rails for selectively and alternately guiding said conveyance carriage assembly in opposite directions, respectively; and
  two drivers, wherein each of said rails has a respective one of said drivers associated therewith for driving said conveyance carriage assembly through said driven members; and
  wherein said system is configured so that during use, when the last one of said driven members is separated from a movable range of a driver with which it is associated, at least the foremost one of said driven members is relayed to a driver of an adjacent unit and said conveyance carriage assembly is substantially continuously conveyed.

2. A conveyance system according to claim 1, wherein said units comprise three units including:
  a horizontal conveyance unit for linearly conveying said conveyance carriage assembly;
  a gradient conveyance unit for conveying said conveyance carriage assembly on an upward grade and/or a downward grade; and a direction-changing unit for changing a conveyance direction of said conveyance carriage assembly;

wherein a plurality of types of said units are combined with each other.

3. A conveyance system according to claim 1, wherein said driver comprises an annular chain which is circulatingly drivable through a sprocket; and said driven members comprise driven sprockets held in mesh with said annular chain or a presser plate for pressing rollers of said annular chain.

4. A conveyance system according to claim 1, wherein said rail is in the form of a plate which is elongate in a conveyance direction; and said conveyance carriage assembly moves laterally of said rail, and carries the workpiece on a side of said rail.

5. A conveyance system, comprising:

a conveyance carriage assembly for carrying a workpiece thereon; and a plurality of conveyance units through which said conveyance carnage assembly is conveyed;

wherein said conveyance carriage assembly comprises a plurality of driven members including a foremost driven member;

and said conveyance units are separable into individual units, each of said individual units comprising:

a rail for guiding said conveyance carriage assembly; and a driver, associated with said rail for driving said conveyance carriage assembly through said driven members; and wherein said system is configured so that during use, when the last one of said driven members is separated from a movable range of a driver with which it is associated, at least the foremost one of said driven members is relayed to a driver of an adjacent unit, and said conveyance carriage assembly is substantially continuously conveyed, wherein said conveyance units include:

a plurality of horizontal conveyance units for conveying said conveyance carriage assembly in a substantially horizontal direction; and a gradient conveyance unit interconnecting two of said horizontal conveyance units;

wherein said gradient conveyance unit comprises:

a gradient conveyance drive sprocket disposed closely to an end of the gradient conveyance unit, said gradient conveyance drive sprocket being rotatable by said driver;

a gradient conveyance driven sprocket disposed closely to an opposite end of the gradient conveyance unit, said gradient conveyance driven sprocket being rotatable;

a gradient conveyance annular chain held in mesh with said gradient conveyance drive sprocket and said gradient conveyance driven sprocket, said gradient conveyance annular chain being circulatingly drivable; and a gradient guide for supporting, from below, an upper portion of said gradient conveyance annular chain which imparts drive power to said conveyance carriage assembly and a lower portion of said gradient conveyance annular chain which is guided in a direction opposite to said upper portion, making said gradient conveyance annular chain upwardly convex in shape;

wherein said conveyance carriage assembly has a gradient conveyance driven sprocket positioned near a leading end of the conveyance carriage assembly in a conveyance direction and held in mesh with said gradient conveyance annular chain; and wherein after said conveyance carriage assembly is pushed out from said horizontal conveyance unit, said driven sprocket is brought into mesh with said gradient conveyance annular chain, and said conveyance carriage assembly is conveyed by said gradient conveyance annular chain along the shape of said gradient guide.

6. A conveyance system according to claim 5, wherein said conveyance carriage assembly comprises at least two conveyance carriages interconnected longitudinally by a vertically swingable or elastically deformable joint.

7. A conveyance system according to claim 5, wherein each of said horizontal conveyance units comprises:

a horizontal conveyance drive sprocket disposed closely to an end of the horizontal conveyance unit, said horizontal conveyance drive sprocket being rotatable by said driver;

a horizontal conveyance driven sprocket disposed closely to an opposite end of the horizontal conveyance unit, said horizontal conveyance driven sprocket being rotatable; and a horizontal conveyance annular chain held in mesh with said horizontal conveyance drive sprocket and said horizontal conveyance driven sprocket, said horizontal conveyance annular chain being circulatingly drivable and being disposed in a position different from said gradient conveyance annular chain in a transverse direction of said horizontal conveyance unit;

wherein said conveyance carriage assembly has a push-out driven sprocket positioned closely to a rear end of the conveyance carriage assembly, said push-out driven sprocket being positioned above said horizontal conveyance annular chain when no external force is applied thereto; and wherein as said conveyance carriage assembly moves, said driven sprocket is lowered into mesh with said horizontal conveyance annular chain by a push-out cam plate in said horizontal conveyance unit.

8. Conveyance system according to claim 7, wherein said driven sprocket is lowered by:

a force-bearing member for directly bearing a pressing force from said push-out cam plate; and a resilient member compressible in interlinked relation to said force-bearing member.

9. A conveyance system according to claim 5, wherein said conveyance carriage assembly comprises:

a lowering driven sprocket disposed closely to a rear end of the conveyance carriage assembly, said lowering driven sprocket being positioned above said gradient conveyance annular chain when no external force is applied thereto;

wherein as said conveyance carriage assembly moves, said driven sprocket is lowered into mesh with said gradient conveyance annular chain by a lowering cam plate disposed in a downgrade region of said gradient conveyance unit.

10. A conveyance system according to claim 9, wherein said driven sprocket is lowered by:

a force-bearing member for directly bearing a pressing force from said lowering cam plate; and a resilient member compressible in interlinked relation to said force-bearing member.

11. A conveyance system according to claim 1, further comprising:
- a drive gear rotatable by a rotational drive source;
- a first driven gear held in mesh with said drive gear, said first driven gear being rotatable by rotation transmitted from said drive gear;
- a second driven gear held in mesh with said drive gear, said second driven gear being rotatable by rotation transmitted from said drive gear in a direction opposite to said first driven gear;
- a first rotational shaft as a rotational shaft of said first driven gear;
- a second rotational shaft as a rotational shaft of said second driven gear;
- a first circulative driver for being circulatively drivable in response to rotation of said first rotational shaft; and
- a second circulative driver for being circulatively drivable in a direction opposite to said first circulative driver in response to rotation of said second rotational shaft;
- wherein said conveyance carriage assembly is conveyed by said first circulative driver and/or said second circulative driver.

12. A conveyance system according to claim 11, wherein each of said drive gear, said first driven gear, and said second driven gear comprises a bevel gear, and said first rotational shaft and said second rotational shaft are coaxial with each other and perpendicular to the axis of said drive gear.

13. A conveyance system according to claim 11, further comprising:
- a first inner bearing by which an end of said first rotational shaft is rotatably supported, and a second inner bearing by which an end of said second rotational shaft is supported, said first inner bearing and said second inner bearing being disposed between said first driven gear and said second driven gear; and
- a first outer bearing by which an end of said first rotational shaft is rotatably supported, and a second outer bearing by which an end of said second rotational shaft is supported, said first outer bearing and said second outer bearing being disposed on sides of said first driven gear and said second driven gear which are opposite to confronting faces thereof.

14. A conveyance system according to claim 11, wherein said first circulative driver is driven by a first drive sprocket mounted on said first rotational shaft;
- said second circulative driver is driven by a second drive sprocket mounted on said second rotational shaft; and
- said first circulative driver and said second circulative driver comprise annular chains, respectively, and are circulatingly drivable by rotatable driven sprockets.

15. A conveyance system according to claim 1, wherein said conveyance carriage assembly comprises:
- a retaining mechanism for retaining the workpiece;
- a retaining member operating mechanism for operating a retaining member of said retaining mechanism;
- a resilient member for pressing said retaining member in a direction opposite to the direction in which said retaining member is operated by said retaining member operating mechanism;
- a main body supporting said retaining mechanism and said retaining member operating mechanism; and
- a roller mounted on said main body and engaging said rail;
- wherein said retaining member operating mechanism operates said retaining member through operation of a drive mechanism disposed closely to said rail, and is displaced while being guided along said rail.

16. A conveyance system according to claim 15, wherein said retaining mechanism comprises:
- a clamp mechanism having a clamp operated by said retaining member operating mechanism; and
- a holding mechanism having a set of plate members including at least one movable plate, for holding a portion of said workpiece which is different from the portion thereof which is gripped by said clamp mechanism, with said set of plate members;
- wherein said clamp and said movable plate are displaced by said retaining member operating mechanism to hold or release said workpiece.

17. A conveyance system according to claim 15, wherein an engaging member engageable by a hook of a first lock mechanism disposed closely to said rail when said retaining member operating mechanism operates said retaining member through operation of said drive mechanism, is mounted on said main body.

18. A conveyance system according to claim 15, further comprising:
- a pocket for supporting an end of said workpiece inserted therein.

19. A conveyance system according to claim 18, wherein said pocket, said clamp mechanism, and said holding mechanism are mounted on said main body successively upwardly in the order named, and an elongate member as said workpiece is conveyed in an upstanding state.

20. A conveyance system according to claim 19, wherein the elongate member as said workpiece comprises a connecting rod for an internal combustion engine.

21. A conveyance system, comprising:
- a conveyance carriage assembly for carrying a workpiece thereon; and
- a plurality of conveyance units through which said conveyance carnage assembly is conveyed;
- wherein said conveyance carriage assembly comprises a plurality of driven members including a foremost driven member;
- and said conveyance units are separable into individual units, each of said individual units comprising:
- a rail for guiding said conveyance carriage assembly; and
- a driver, associated with said rail for driving said conveyance carriage assembly through said driven members; and
- wherein said system is configured so that during use, when the last one of said driven members is separated from a movable range of a driver with which it is associated, at least the foremost one of said driven members is relayed to a driver of an adjacent unit, and said conveyance carriage assembly is substantially continuously conveyed;
- said conveyance system further comprising:
- a conveyance carriage assembly stopping mechanism for stopping the conveyance carriage assembly for carrying and conveying the workpiece;
- said conveyance carriage assembly stopping mechanism comprising:
- a stopping engaging member mounted on said conveyance carriage assembly;
- a first arm and a second arm which extend in a conveyance direction of said conveyance carriage assembly and have respective shanks having pivotally supported ends;
- a displacing mechanism for alternately and selectively displacing said first arm and said second arm toward and away from each other; and an entry path defined between said first arm and said second arm for said stopping engaging member to enter, said entry path having a narrower portion having a width which is progressively smaller in a direction of travel of said stopping engaging member, and a wider portion which is wider than said narrower portion;

wherein said conveyance carriage assembly is decelerated when said first arm and said second arm slide against said stopping engaging member in said narrower portion; and said conveyance carriage assembly which has entered said wider portion after said narrower portion is spread by said stopping engaging member which presses said first arm and said second arm, is stopped by said first arm and said second arm which engage said stopping engaging member.

22. A conveyance system according to claim 21, wherein said first arm and said second arm have a support which supports said stopping engaging member.

23. A conveyance system according to claim 21, further comprising:

a second lock mechanism for positioning and fixing said conveyance carriage assembly which is stopped, said second lock mechanism having a stopper engaging member for engaging a stopper mounted on said conveyance carriage assembly.

24. A conveyance system according to claim 21, wherein said stopping engaging member comprises a rotatable cylinder.

25. A conveyance system according to claim 21, wherein said stopping engaging member doubles as a guided member which is guided by a direction-changing unit which is interposed between a first conveyance section for conveying said conveyance carriage assembly in one direction and a second conveyance section for conveying said conveyance carriage assembly in a direction different from said one direction.

26. A conveyance system according to claim 25, wherein each of conveyance carriages of said conveyance carriage assembly has two stopping engaging members, each of said stopping engaging members doubling as a guided member which is guided by said direction-changing unit which interconnects a forward path as said first conveyance section and a return path as said second conveyance section for guiding said conveyance carriage assembly in a direction opposite to said forward path.

* * * * *